US012608086B2

(12) United States Patent
Bae et al.

(10) Patent No.: US 12,608,086 B2
(45) Date of Patent: Apr. 21, 2026

(54) ELECTRONIC DEVICE, HEAD-MOUNTED DISPLAY DEVICE, WEARABLE DEVICE, AND METHOD FOR OPERATING THE SAME

(71) Applicant: Samsung Electronics Co., Ltd., Suwon-si (KR)

(72) Inventors: Jaesung Bae, Suwon-si (KR); Heechan Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/850,588

(22) Filed: Jun. 27, 2022

(65) Prior Publication Data

US 2023/0074476 A1 Mar. 9, 2023

Related U.S. Application Data

(63) Continuation of application No. PCT/KR2022/007691, filed on May 30, 2022.

(30) Foreign Application Priority Data

Aug. 26, 2021 (KR) ......................... 10-2021-0113191

(51) Int. Cl.
| | |
|---|---|
| *G06F 3/01* | (2006.01) |
| *G02B 27/00* | (2006.01) |
| | (Continued) |

(52) U.S. Cl.
CPC ......... *G06F 3/017* (2013.01); *G02B 27/0093* (2013.01); *G02B 27/0101* (2013.01);
(Continued)

(58) Field of Classification Search
CPC ...................................................... G06F 3/017
See application file for complete search history.

(56) References Cited

U.S. PATENT DOCUMENTS

| | | | |
|---|---|---|---|
| 10,656,720 B1 | 5/2020 | Holz | |
| 11,023,035 B1 | 6/2021 | Atlas et al. | |
| | (Continued) | | |

FOREIGN PATENT DOCUMENTS

| | | |
|---|---|---|
| KR | 10-2015-0137828 | 12/2015 |
| KR | 10-2016-0039939 | 4/2016 |
| | (Continued) | |

OTHER PUBLICATIONS

Search Report and Written Opinion dated Sep. 1, 2022 issued in International Patent Application No. PCT/KR2022/007691.
(Continued)

*Primary Examiner* — James J Debrow
(74) *Attorney, Agent, or Firm* — NIXON & VANDERHYE P.C.

(57) ABSTRACT

According to various embodiments, there may be provided an electronic device comprising: a communication circuit and at least one processor, wherein the at least one processor is configured to: establish a communication connection with a head-mounted display device and a wearable device through the communication circuit, receive information associated with at least one specific body part from the head-mounted display device through the communication circuit, and upon receiving a first signal from the wearable device through the communication circuit, transmit, to the head-mounted display device, an image including at least one graphic object associated with the first signal, generated based on the information associated with the at least one specific body part.

18 Claims, 31 Drawing Sheets

(51) Int. Cl.

| | |
|---|---|
| *G02B 27/01* | (2006.01) |
| *G06F 1/16* | (2006.01) |
| *G06F 3/04847* | (2022.01) |
| *G06V 40/10* | (2022.01) |
| *G06V 40/20* | (2022.01) |
| *H04W 4/80* | (2018.01) |

(52) U.S. Cl.

CPC ..... *G02B 27/0172* (2013.01); *G02B 27/0179* (2013.01); *G06F 1/163* (2013.01); *G06F 3/012* (2013.01); *G06F 3/013* (2013.01); *G06F 3/04847* (2013.01); *G06V 40/10* (2022.01); *G06V 40/28* (2022.01); *H04W 4/80* (2018.02); *G02B 2027/0138* (2013.01); *G02B 2027/014* (2013.01); *G02B 2027/0178* (2013.01); *G02B 2027/0187* (2013.01)

(56) References Cited

U.S. PATENT DOCUMENTS

| | | | |
|---|---|---|---|
| 11,531,389 B1 * | 12/2022 | Whitmire et al. ...... | G06F 3/011 |
| 12,061,339 B1 * | 8/2024 | Zimmerman et al. ...................... G02B 27/0149 |
| 2010/0079356 A1 * | 4/2010 | Hoellwarth .............. | G09G 5/00 |
| 2012/0194553 A1 * | 8/2012 | Osterhout et al. ........ | G06F 3/01 |
| 2015/0061842 A1 | 3/2015 | Yoon et al. | |
| 2015/0347080 A1 * | 12/2015 | Shin et al. ................ | G06F 3/16 |
| 2015/0358614 A1 * | 12/2015 | Jin ..................... | H04N 13/0436 |
| 2016/0054791 A1 * | 2/2016 | Mullins et al. ......... | G06F 3/011 |
| 2016/0196693 A1 | 7/2016 | Kobayashi et al. | |
| 2016/0291768 A1 | 10/2016 | Cho et al. | |
| 2017/0168566 A1 | 6/2017 | Osterhout et al. | |
| 2019/0146219 A1 | 5/2019 | Rodriguez | |
| 2020/0170522 A1 | 6/2020 | Kim et al. | |
| 2020/0241649 A1 * | 7/2020 | Stafford et al. ........... | G06F 3/01 |
| 2020/0322017 A1 | 10/2020 | Lee et al. | |

FOREIGN PATENT DOCUMENTS

| | | |
|---|---|---|
| KR | 10-2016-0137253 A | 11/2016 |
| KR | 10-2018-0113301 | 10/2018 |
| KR | 10-2019-0069773 A | 6/2019 |
| KR | 10-2020-0067592 | 6/2020 |
| KR | 10-2020-0117686 | 10/2020 |
| WO | WO 2017-222685 A1 | 12/2017 |

OTHER PUBLICATIONS

Extended European Search Report dated Sep. 6, 2024 for EP Application No. 22861515.9.
Office Action for KR Application No. 10-2021-0113191 issued Jan. 22, 2026 and English translation, 19 pages.

* cited by examiner

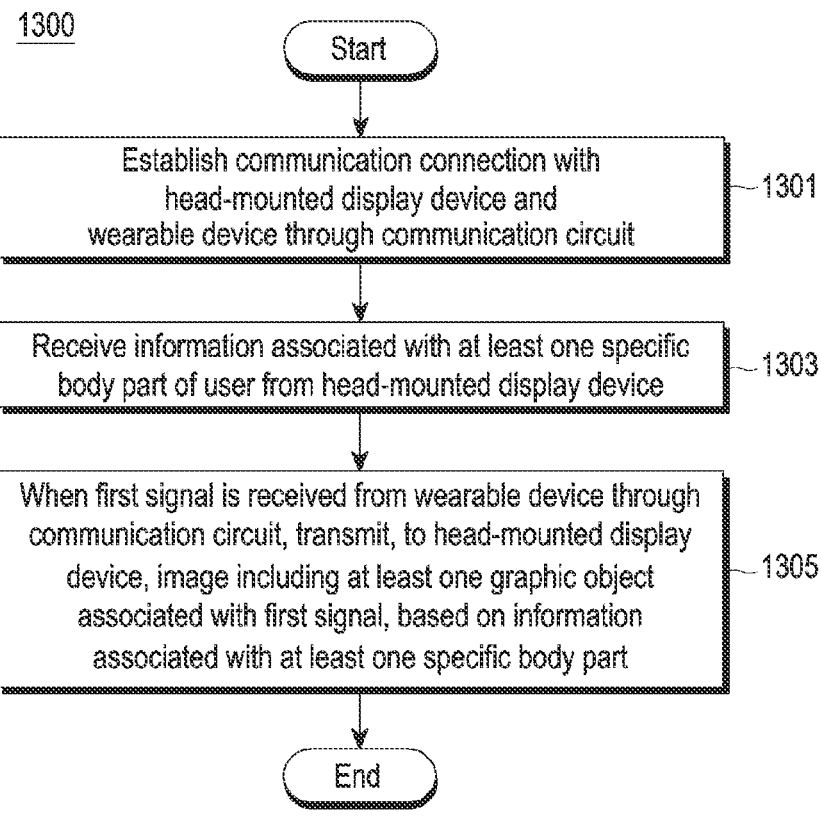

1300

Start

Establish communication connection with
head-mounted display device and
wearable device through communication circuit ~1301

Receive information associated with at least one specific
body part of user from head-mounted display device ~1303

When first signal is received from wearable device through
communication circuit, transmit, to head-mounted display
device, image including at least one graphic object
associated with first signal, based on information
associated with at least one specific body part ~1305

End

FIG. 13

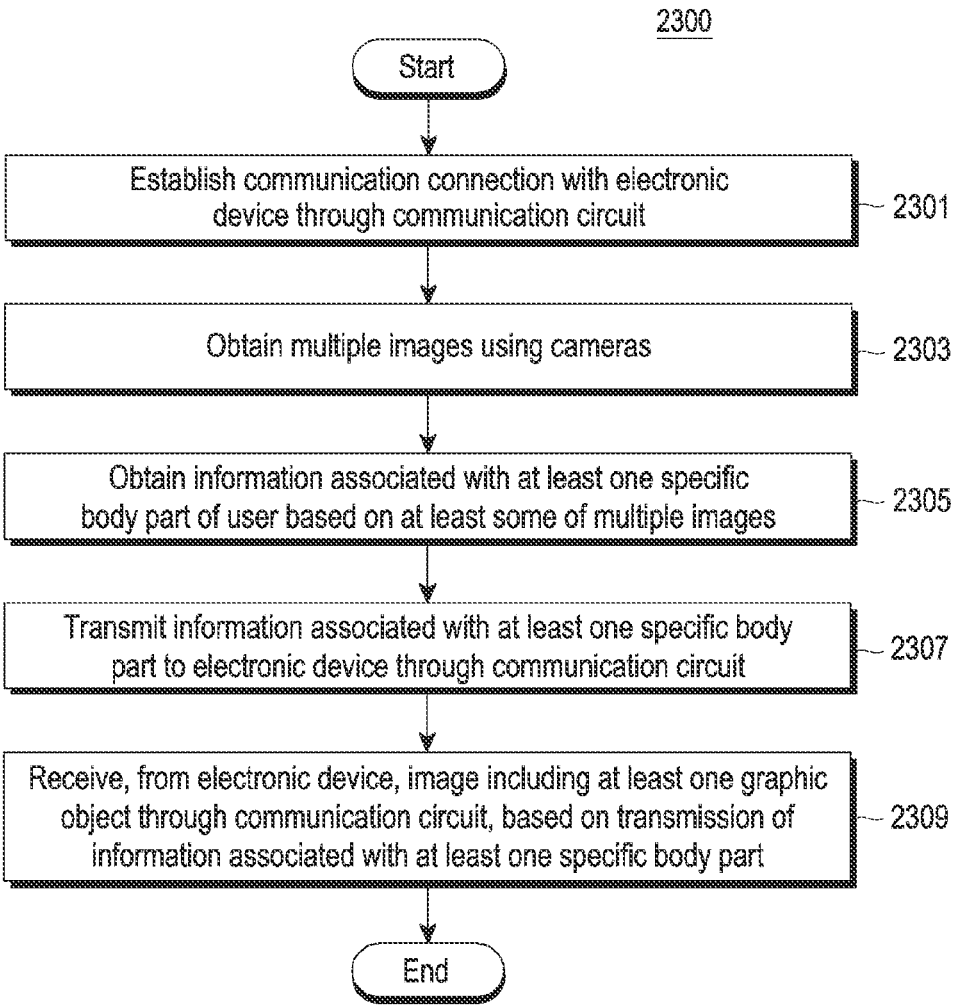

2300

Start

Establish communication connection with electronic device through communication circuit — 2301

Obtain multiple images using cameras — 2303

Obtain information associated with at least one specific body part of user based on at least some of multiple images — 2305

Transmit information associated with at least one specific body part to electronic device through communication circuit — 2307

Receive, from electronic device, image including at least one graphic object through communication circuit, based on transmission of information associated with at least one specific body part — 2309

End

FIG. 23

ELECTRONIC DEVICE, HEAD-MOUNTED DISPLAY DEVICE, WEARABLE DEVICE, AND METHOD FOR OPERATING THE SAME

CROSS-REFERENCE TO RELATED APPLICATIONS

This application is a continuation of International Application No. PCT/KR2022/007691 designating the United States, filed on May 30, 2022, in the Korean Intellectual Property Receiving Office, and claiming priority to Korean Patent Application No. 10-2021-0113191, filed on Aug. 26, 2021, in the Korean Intellectual Property Office, the disclosures of which are incorporated by reference herein in their entireties.

BACKGROUND

Field

The disclosure relates to an electronic device, a head-mounted display device, a wearable device, and a method for operating the same.

Description of Related Art

Recently, services providing extended reality (XR) encompassing augmented reality (AR), virtual reality (VR), or mixed reality (MR) are being developed.

Methods for providing user interaction in an environment that provides such an XR service include hand-gesture methods, controller methods, and hybrid methods.

An electronic device (e.g., a smartphone) may process information received from a head-mounted display device and/or a wearable device (e.g., a smart watch) available as a kind of controller, to provide an extended reality (XR)-based service. For example, an electronic device (e.g., a smartphone) may control immersive content (e.g., extended reality technology-based content) provided through a head-mounted display device, based on the signal received from a wearable device (e.g., a smart watch) when there is a user's input using the wearable device (e.g., a smart watch). The immersive content control method using a wearable device (e.g., a smart watch) may be referred to as a hybrid type method. The wearable device (e.g., a smart watch) may not only function as a controller for controlling immersive content (e.g., extended reality-based content) but also function to provide the wearable device's own functions (e.g., services for checking messages, call reception, or providing a watch screen). Thus, the wearable device may cause a malfunction corresponding to the received user input. For example, although the user makes an input to the wearable device to receive the wearable device's own service while using a mixed reality service, the wearable device may provide a function for controlling immersive content. As another example, although the user makes an input to the wearable device for controlling immersive content while using a mixed reality service, the wearable device may provide its own service.

SUMMARY

According to various embodiments, an electronic device, head-mounted display device, wearable device, and method for operating the same may address the issue that the wearable device malfunctions in an environment of providing a mixed reality service by managing a plurality of modes for providing the function of the wearable device and setting the mode of the wearable device to a specific mode meeting a designated condition among the plurality of modes.

Embodiments of the disclosure may provide an electronic device, head-mounted display device, wearable device, and method for operating the same that may set a mode of the wearable device agilely in an environment of providing a mixed reality service by determining whether to set the mode of the wearable device to a mode for controlling immersive content based on the probability that both hands are to be positioned.

According to various embodiments, there may be provided an electronic device comprising a communication circuit and at least one processor, wherein the at least one processor is configured to establish a communication connection with a head-mounted display device and a wearable device through the communication circuit, receive information associated with at least one specific body part from the head-mounted display device through the communication circuit, and upon receiving a first signal from the wearable device through the communication circuit, transmit, to the head-mounted display device, an image including at least one graphic object associated with the first signal, generated based on the information associated with the at least one specific body part.

According to various embodiments, there may be provided a method for operating an electronic device, comprising establishing a communication connection with a head-mounted display device and a wearable device through a communication circuit of the electronic device, receiving information associated with at least one specific body part from the head-mounted display device through the communication circuit, and upon receiving a first signal from the wearable device through the communication circuit, transmitting, to the head-mounted display device, an image including at least one graphic object associated with the first signal, generated based on the information associated with the at least one specific body part.

According to various embodiments, there may be provided a wearable electronic device comprising at least one sensor and a communication circuit, and at least one processor, wherein the at least one processor is configured to establish a communication connection with an electronic device through the communication circuit, receive a signal for setting a mode of the wearable device from the electronic device through the communication circuit, identify an input using the at least one sensor, based on the mode of the wearable device being set to a first mode based on the received signal, provide content corresponding to the input identified, and based on the mode of the wearable device being set to a second mode based on the received signal, transmit a first signal including information about the input identified, through the communication circuit to the electronic device.

According to various example embodiments, there may be provided a head mounted display (HMD) device comprising: a plurality of cameras, a communication circuit, and at least one processor, wherein the at least one processor is configured to: establish a communication connection with an electronic device through the communication circuit, obtain a plurality of images using the cameras, obtain information associated with at least one specific body part, based on at least some of the plurality of images, transmit the information associated with the at least one specific body part to the electronic device through the communication circuit, and receive an image including at least one graphic object from the electronic device through the communication circuit, based on the transmission of the information associated with the at least one specific body part.

Embodiments of the disclosure are not limited to the foregoing aspects, and other aspects would readily be appreciated by a skilled artisan from the following detailed description taken in conjunction with the accompanying drawings.

According to various embodiments, there may be provided an electronic device, head-mounted display device, wearable device, and method for operating the same which may address the issue that the wearable device malfunctions in an environment of providing a mixed reality service by managing a plurality of modes for providing the function of the wearable device and setting the mode of the wearable device to a specific mode meeting a designated condition among the plurality of modes.

According to various embodiments, there may be provided an electronic device, head-mounted display device, wearable device, and method for operating the same which may set a mode of the wearable device agilely in an environment of providing a mixed reality service by determining whether to set the mode of the wearable device to a mode for controlling immersive content based on the probability that both hands are to be positioned.

BRIEF DESCRIPTION OF THE DRAWINGS

FIG. 13 is a flowchart illustrating an example operation of an electronic device according to various embodiments;

FIG. 23 is a flowchart illustrating an example operation of an electronic device according to various embodiments.

DETAILED DESCRIPTION

Figure 1:
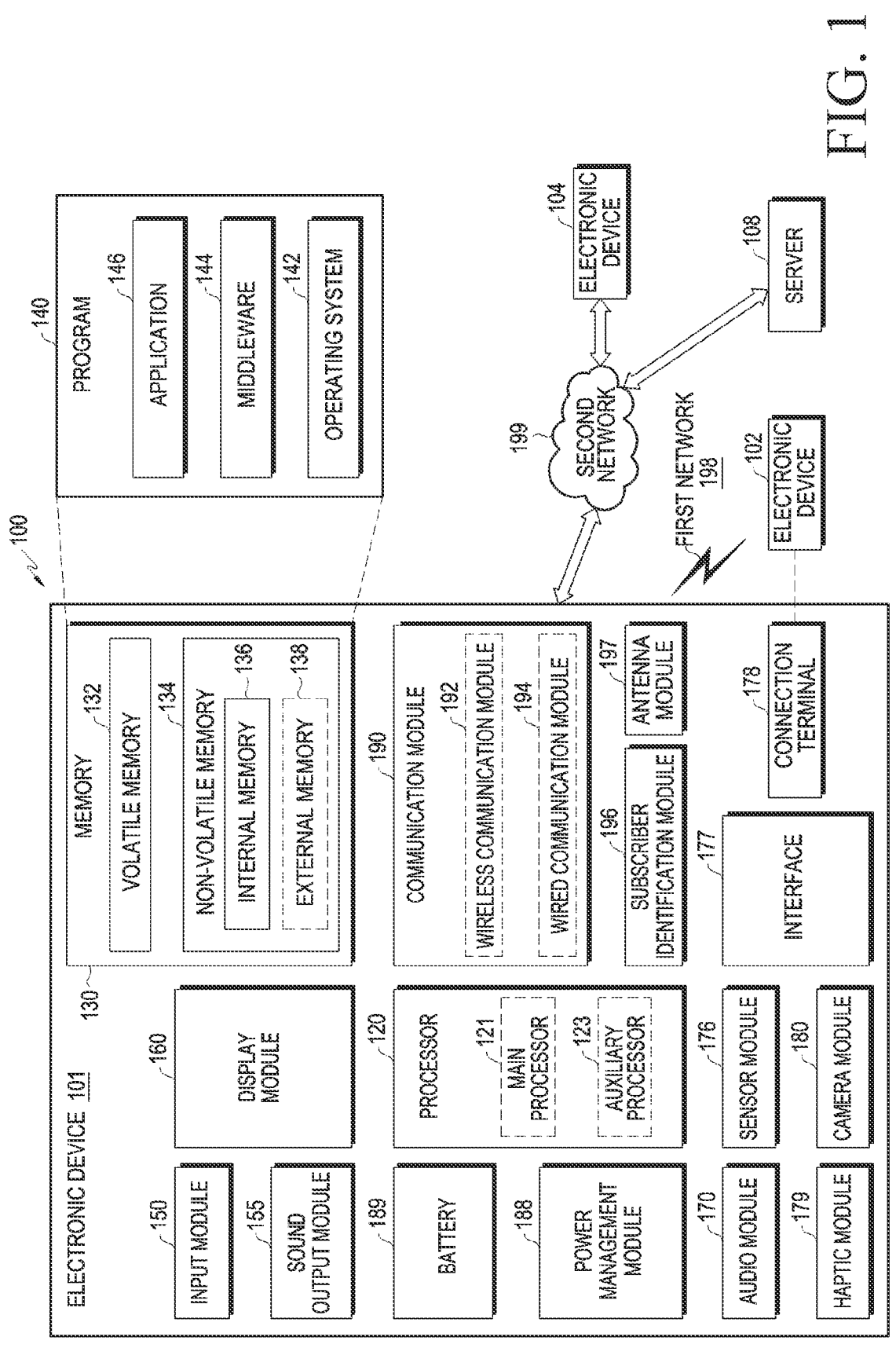
FIG. 1 is a view illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to various embodiments of the disclosure may be one of various types of electronic devices. The electronic devices may include, for example, a portable communication device (e.g., a smart phone), a computer device, a portable multimedia device, a portable medical device, a camera, an electronic device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The description of the electronic device 101 made in connection with FIG. 1 may be applied to the following descriptions of the electronic device 210, the head-mounted display device 221, and the control wearable device 223, and a duplicate description may not be given below.

Hereinafter, according to various embodiments, examples of electronic devices (e.g., electronic device 210 (e.g., a terminal) and wearable devices 220 (e.g., head-mounted display (HMD)), and control wearable device 223 (e.g., the smart watch 223*a*, wireless earphone 223*b*))), and a server 230) are described.

Figure 2A:
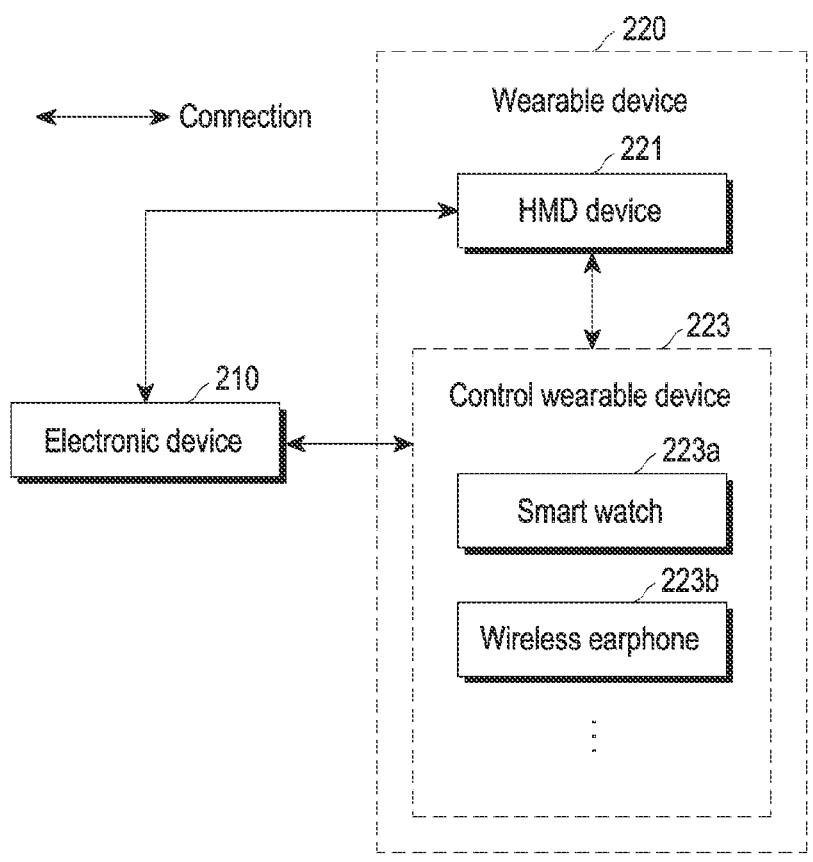
FIG. 2A is a diagram illustrating an example of electronic devices for using extended reality (XR) technology according to various embodiments.
Figure 2B:
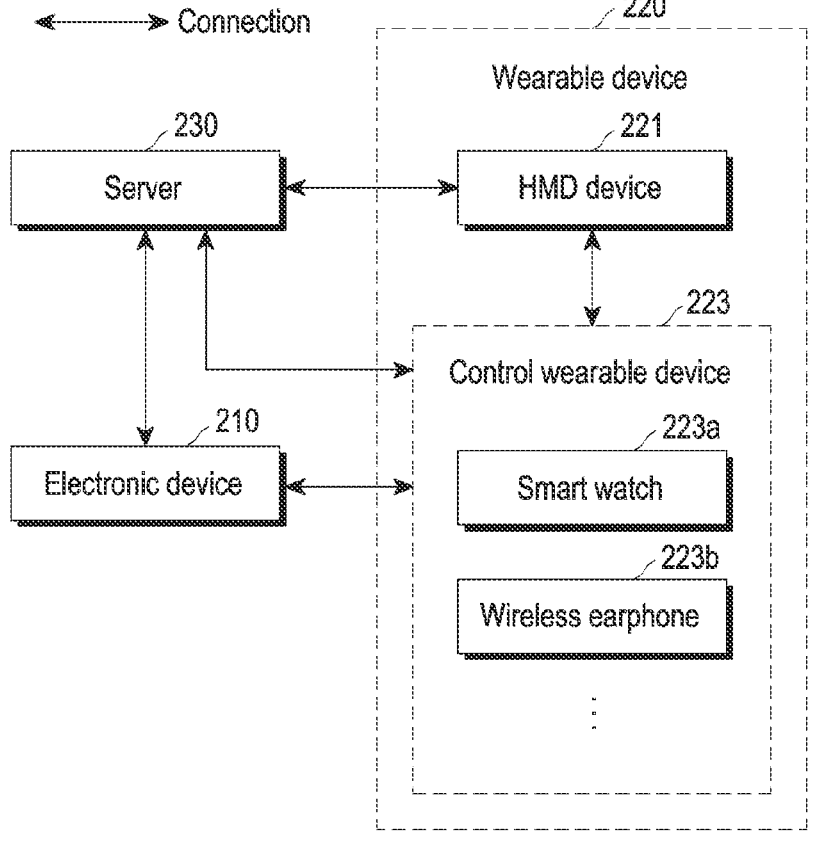
FIG. 2B is a diagram illustrating another example of electronic devices for using extended reality (XR) according to various embodiments.
Figure 2C:
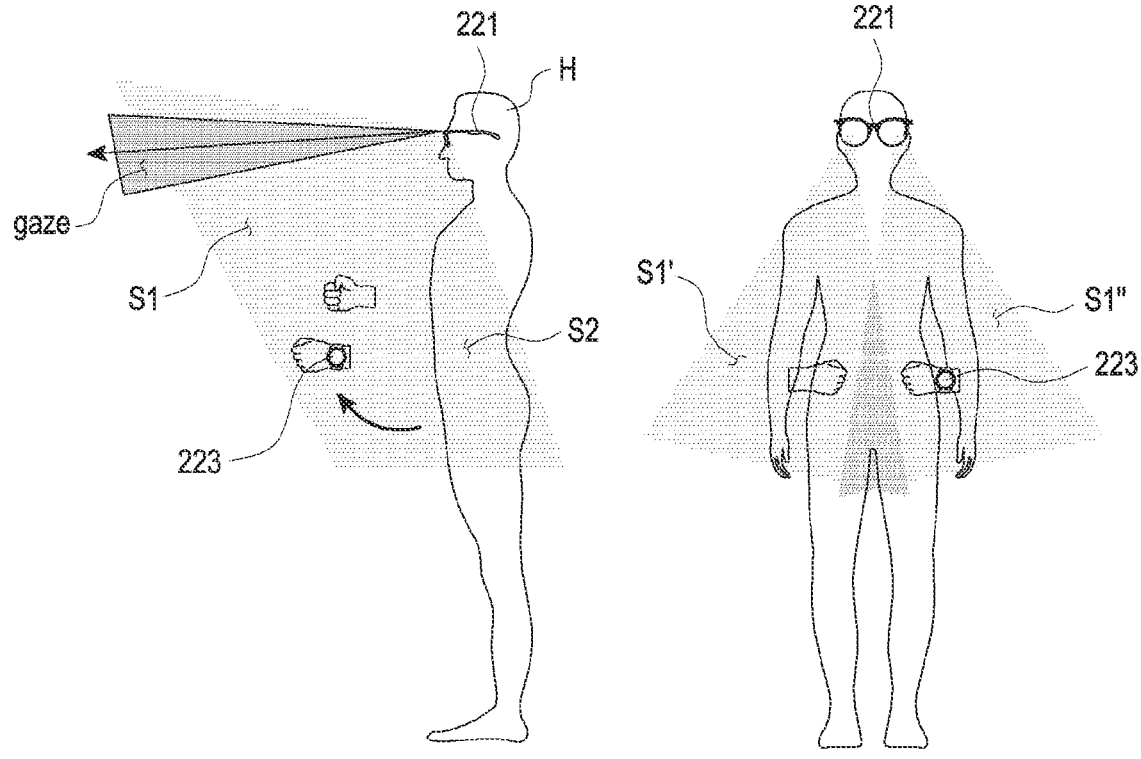
FIG. 2C is a diagram illustrating an example operation of controlling immersive content (or view) provided through a head-mounted display device using a wearable device (e.g., a smart watch or wireless earphone) according to various embodiments.

FIG. 2A is a diagram illustrating an example of electronic devices (e.g., the electronic device 210 and the wearable device 220) for using extended reality (XR) technology according to various embodiments. FIG. 2B is a diagram illustrating another example of electronic devices (e.g., the electronic device 210, wearable device 220, and server 230) for using extended reality (XR) according to various embodiments. FIG. 2C is a view illustrating an example of an operation of controlling immersive content (or view) provided through a head-mounted display device using a wearable device (e.g., the smart watch 223a or wireless earphone 223b) according to various embodiments.

According to various embodiments, referring to FIG. 2A, devices for using extended reality (XR) technology (or providing an extended reality service) may include an electronic device 210 and a wearable device 220. The extended reality technology may include a virtual reality (VR) technology, an augmented reality (AR) technology, and a mixed reality (MR) technology, but without limited thereto, may further include various types of technologies for providing the user with an immersive experience.

According to various embodiments, the electronic device 210 may include a terminal, such as a smartphone, a tablet, a notebook, or the like.

According to various embodiments, the wearable device 220 may include a head-mounted display device 221 and a control wearable device 223, or the like. The term "control wearable device 223" is a term for classifying wearable devices other than the head-mounted display device 221 among the wearable devices 220, and without limited to the description, other wearable devices than the head-mounted display device 221 may be defined by other terms than the "control wearable device 223." For example, the head-mounted display device 221 may include a glasses-type head-mounted display device, a 2D/3D head-mounted display device, an AR head-mounted display device, and a VR head-mounted display device, and without limited to the description, may further include devices that are worn on the user's head to be able to provide immersive content (e.g., XR technology-based content) to the user's eyes. Meanwhile, the head-mounted display device 221 may also be a face-mounted display (FMD) device. As another example, the control wearable device 223 may include other types of user body-wearable devices than the head-mounted display device 221, such as the smart watch 223a, wireless earphone 223b, or joystick device. Various examples of the head-mounted display device 221 and the control wearable device 223 are described below.

According to various embodiments, the devices (e.g., the electronic device 210, the head-mounted display device 221, and the control wearable device 223) may control the immersive content (e.g., XR technology-based content) provided to the user. For example, the devices (e.g., the electronic device 210, the head-mounted display device 221, and the control wearable device 223) may establish a communication connection with each other and control (e.g., update, change, or move) the immersive content (e.g., XR technology-based content) provided to the user by the head-mounted display device 221 based on the transmitted and/or received information. For example, the communication connection may be established by a short-range wireless communication scheme, such as Wi-Fi, Bluetooth, and BLE, and the communication connection may also be established by a wireless communication connection scheme other than the described communication connection scheme (e.g., 3G, 4G/LTE, NR, or other cellular communication or optical communication) and a wired communication connection scheme. For example, the electronic device 210 may control the immersive content (e.g., XR technology-based content)

to be displayed through the head-mounted display device 221 based on information received from the head-mounted display device 221 (e.g., information associated with the user's body part, e.g., hand, head, or gaze) and/or signal received from the control wearable device 223 (e.g., a smart watch). In an embodiment, the electronic device 210 may control the immersive content based on the movement of the control wearable device 223 (e.g., a smart watch) and the body part of the user wearing the control wearable device 223. For example, the electronic device 210 may control the immersive content based on the signal received from the control wearable device 223 (e.g., a smart watch). As another example, the electronic device 210 may also control the immersive content based on the body part (e.g., arm or hand) wearing the control wearable device 223 (e.g., a smart watch). Referring to FIG. 2C, a plurality of areas (forward area S1 and downward area S2 including sub areas S1' and S1") may be captured by the head-mounted display device 221, and the immersive content may be controlled based on the position of the control wearable device 223 and/or the position of the body part (e.g., both hands), identified based on the captured result. For example, among the spaces captured using the plurality of cameras included in the head-mounted display device 221, the space captured by at least some cameras having a field-of-view (FOV) for forward of the body part (e.g., head H) wearing the user's HMD device 221 may be referred to as a forward area S1, and the space captured by at least some cameras having an FOV for downward of the user's body part (e.g., head H) may be referred to as a downward area S2. In this case, the spaces captured by the cameras capturing the forward area S1 may be referred to as sub areas (e.g., S1' and S1"). A mode of the control wearable device 223 may be set based on the position of the control wearable device 223, the position of the user's gaze, and/or the position of the user's hands recognized within the captured space, which is described below. The technology of controlling immersive content by the electronic device 210 may be referred to as a hybrid-type content control technique. As at least part of the operation of providing the hybrid-type content control technique, the electronic device 210 may set the mode of the control wearable device 223 (e.g., a smart watch) to the mode for controlling immersive content and receive a signal for controlling the immersive content from the control wearable device 223 (e.g., a smart watch) based on the mode setting. The operation of the electronic device 210 is described below in greater detail. According to an embodiment, the electronic device 210 may control the immersive content based on the signal received from the control wearable device 223 (e.g., a smart watch). The technology of controlling immersive content by the electronic device 210 may be referred to as a controller-type content control technique. According to an embodiment, the electronic device 210 may control immersive content only based on the movement of the user's body part (e.g., hand). The technology of controlling immersive content by the electronic device 210 may be referred to as a hand gesture-type content control technique. The electronic device 210 may select a specific content control technique from among the content control techniques depending on whether the user wears the control wearable device 223 and the type of worn wearable device. For example, if the user wears a smart watch, the electronic device 210 may select the hybrid-type content control technique from among the content control techniques and control immersive content.

Meanwhile, without being limited thereto, a device other than the electronic device 210 may control the content displayed through the head-mounted display device 221. For example, referring to FIG. 2B, a remote server 230 other than the electronic device 210 may be implemented, and the server 230 may control the immersive content to be displayed through the head-mounted display device 221 based on the information received from the electronic device 210 and/or the wearable device. The operation of controlling the immersive content by the server 230 may be performed like the above-described operation by the electronic device 210, and a duplicate description thereof may not be given. As another example, among the devices, the HMD device 221 and/or the control wearable device 223, rather than the electronic device 210, may perform the above-described operation of controlling immersive content of the electronic device 210.

An example of the head-mounted display device 221 (hereinafter, an augmented reality device 300 (e.g., an AR head-mounted display device)) according to various embodiments is described in greater detail below with reference to FIGS. 3, 4 and 5. As described above, the head-mounted display device is not limited to the following examples (augmented reality device), and it may be implemented as various devices capable of providing immersive content (e.g., XR technology-based content) to the user's eyes (e.g., glasses-type head-mounted display device, 2D/3D head-mounted display device, and VR head-mounted display device).

Figure 3:
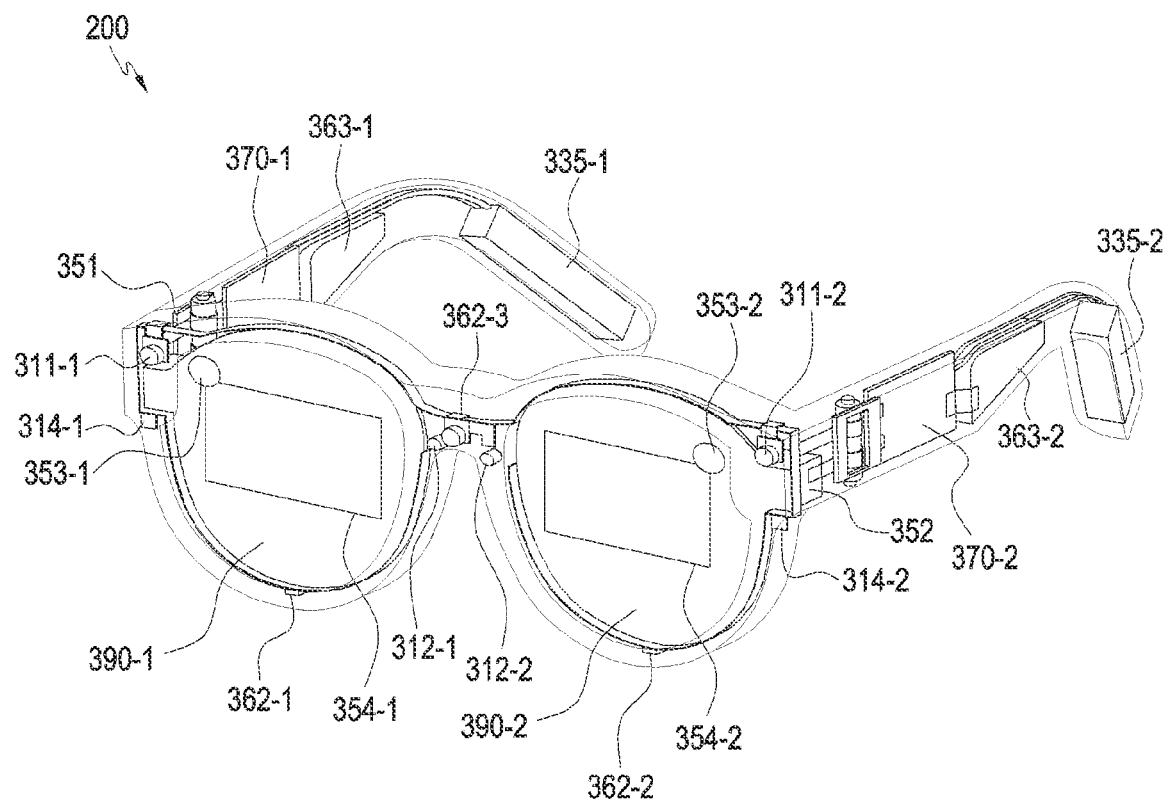
FIG. 3 is a diagram illustrating an example structure of an augmented reality device according to various embodiments.

FIG. 3 is a diagram illustrating an example structure of an augmented reality device according to various embodiments. According to various embodiments, an augmented reality device 300 may include one or more first cameras 311-1 and 311-2, one or more second cameras 312-1 and 312-2, and one or more third cameras 213. According to various embodiments, an image obtained through the one or more first cameras 311-1 and 311-2 may be used for detection of the user's hand gesture, tracking the user's head, and/or spatial recognition. According to various embodiments, the one or more first cameras 311-1 and 311-2 may be a global shutter (GS) camera or a rolling shutter (RS) camera. According to various embodiments, the one or more first cameras 311-1 and 311-2 may perform a simultaneous localization and mapping (SLAM) operation through depth capture. According to various embodiments, the one or more first cameras 311-1 and 311-2 may perform spatial recognition for 3DoF and/or 6DoF.

According to various embodiments, an image obtained through the one or more second cameras 312-1 and 312-2 may be used to detect and track the user's pupil. According to various embodiments, the one or more second cameras 312-1 and 312-2 may be GS cameras. According to various embodiments, the one or more second cameras 312-1 and 312-2 may correspond to the left eye and the right eye, respectively, and the one or more second cameras 312-1 and 312-2 may have the same performance.

According to various embodiments, the one or more third cameras 213 may be high-resolution cameras. According to various embodiments, the one or more third cameras 213 may perform an auto-focusing (AF) function and an OIS function. According to various embodiments, the one or more third cameras 313 may be a GS camera or an RS camera. According to various embodiments, the one or more third cameras 313 may be color cameras.

According to various embodiments, the augmented reality device 300 may include one or more light emitting elements 314-1 and 314-2. The light emitting elements 314-1 and 314-2 are different from a light source, which is described below, for irradiating light to a screen output area of the display. According to various embodiments, the light emitting devices 314-1 and 314-2 may irradiate light to facilitate pupil detection in detecting and tracking the user's pupils through the one or more second cameras 312-1 and 312-2. According to various embodiments, each of the light emitting devices 314-1 and 314-2 may include an LED. According to various embodiments, the light emitting devices 314-1 and 314-2 may irradiate light in an infrared band. According to various embodiments, the light emitting devices 314-1 and 314-2 may be attached around the frame of the augmented reality device 300. According to various embodiments, the light emitting devices 314-1 and 314-2 may be positioned around the one or more first cameras 311-1 and 311-2 and may assist in gesture detection, head tracking, and spatial recognition by the one or more first cameras 311-1 and 311-2 when the augmented reality device 300 is used in a dark environment. According to various embodiments, the light emitting devices 314-1 and 314-2 may be positioned around the one or more third cameras 313 and may assist in obtaining images by the one or more third cameras 313 when the augmented reality device 300 is used in a dark environment.

According to various embodiments, the augmented reality device 300 may include batteries 335-1 and 335-2. The batteries 335-1 and 335-2 may store power for operating the remaining components of the augmented reality device 300.

According to various embodiments, the augmented reality device 300 may include a first display 351, a second display 352, one or more input optical members 353-1 and 353-2, one or more transparent members 390-1 and 390-2, and one or more screen display portions 354-1 and 354-2. According to various embodiments, the first display 351 and the second display 352 may include, e.g., a liquid crystal display (LCD), a digital mirror device (DMD), a liquid crystal on silicon (LCoS), or an organic light emitting diode (OLED), or a micro light emitting diode (micro LED). According to various embodiments, when the first display 351 and the second display 352 are formed of one of a liquid crystal display device, a digital mirror display device, or a silicon liquid crystal display device, the augmented reality device 300 may include a light source for irradiating light to a screen output area of the display. According to various embodiments, when the first display 351 and the second display 352 may generate light on their own, e.g., when formed of either organic light emitting diodes or micro LEDs, the augmented reality device 300 may provide a virtual image of good quality to the user even when a separate light source is not included.

According to various embodiments, the one or more transparent members 390-1 and 390-2 may be disposed to face the user's eyes when the user wears the augmented reality device 300. According to various embodiments, the one or more transparent members 390-1 and 390-2 may include at least one of a glass plate, a plastic plate, and a polymer. According to various embodiments, the user may view the outside world through the one or more transparent members 390-1 and 390-2 when the user wears the augmented reality device 300. According to various embodiments, the one or more input optical members 353-1 and 353-2 may guide the light generated by the first display 351 and the second display 352 to the user's eyes. According to various embodiments, images based on the light generated by the first display 351 and the second display 352 may be formed on one or more screen display portions 354-1 and 354-2 on the one or more transparent members 390-1 and 390-2, and the user may view the images formed on the one or more screen display portions 354-1 and 354-2.

According to various embodiments, the augmented reality device 300 may include one or more optical waveguides (not shown). The optical waveguide may transfer the light generated by the first display 351 and the second display 352 to the user's eyes. The augmented reality device 300 may include one optical waveguide corresponding to each of the left eye and the right eye. According to various embodiments, the optical waveguide may include at least one of glass, plastic, or polymer. According to various embodiments, the optical waveguide may include a nano-pattern formed inside or on one outer surface, e.g., a polygonal or curved grating structure. According to various embodiments, the optical waveguide may include a free-form type prism, and in this case, the optical waveguide may provide incident light to the user through a reflective mirror. According to various embodiments, the optical waveguide may include at least one of at least one diffractive element (e.g., a diffractive optical element (DOE) or a holographic optical element (HOE)) or a reflective element (e.g., a reflective mirror) and guide the display light emitted from the light source to the user's eyes using at least one diffractive element or reflective element included in the optical waveguide. According to various embodiments, the diffractive element may include input/output optical elements. According to various embodiments, the reflective element may include a member causing total reflection.

According to various embodiments, the augmented reality device 300 may include one or more audio input devices 362-1, 362-2, and 362-3 and one or more audio output devices 363-1 and 363-2.

According to various embodiments, the augmented reality device 300 may include a first PCB 370-1 and a second PCB 370-2. The first PCB 370-1 and the second PCB 370-2 may transfer electrical signals to components included in the augmented reality device 300, such as a first camera 311, a second camera 312, a third camera 313, a display module 250, an audio module 261, and a sensor 280 described below with reference to FIG. 2. According to various embodiments, the first PCB 370-1 and the second PCB 370-2 may be FPCBs. According to various embodiments, the first PCB 370-1 and the second PCB 370-2 each may include a first substrate, a second substrate, and an interposer disposed between the first substrate and the second substrate.

Figure 4:
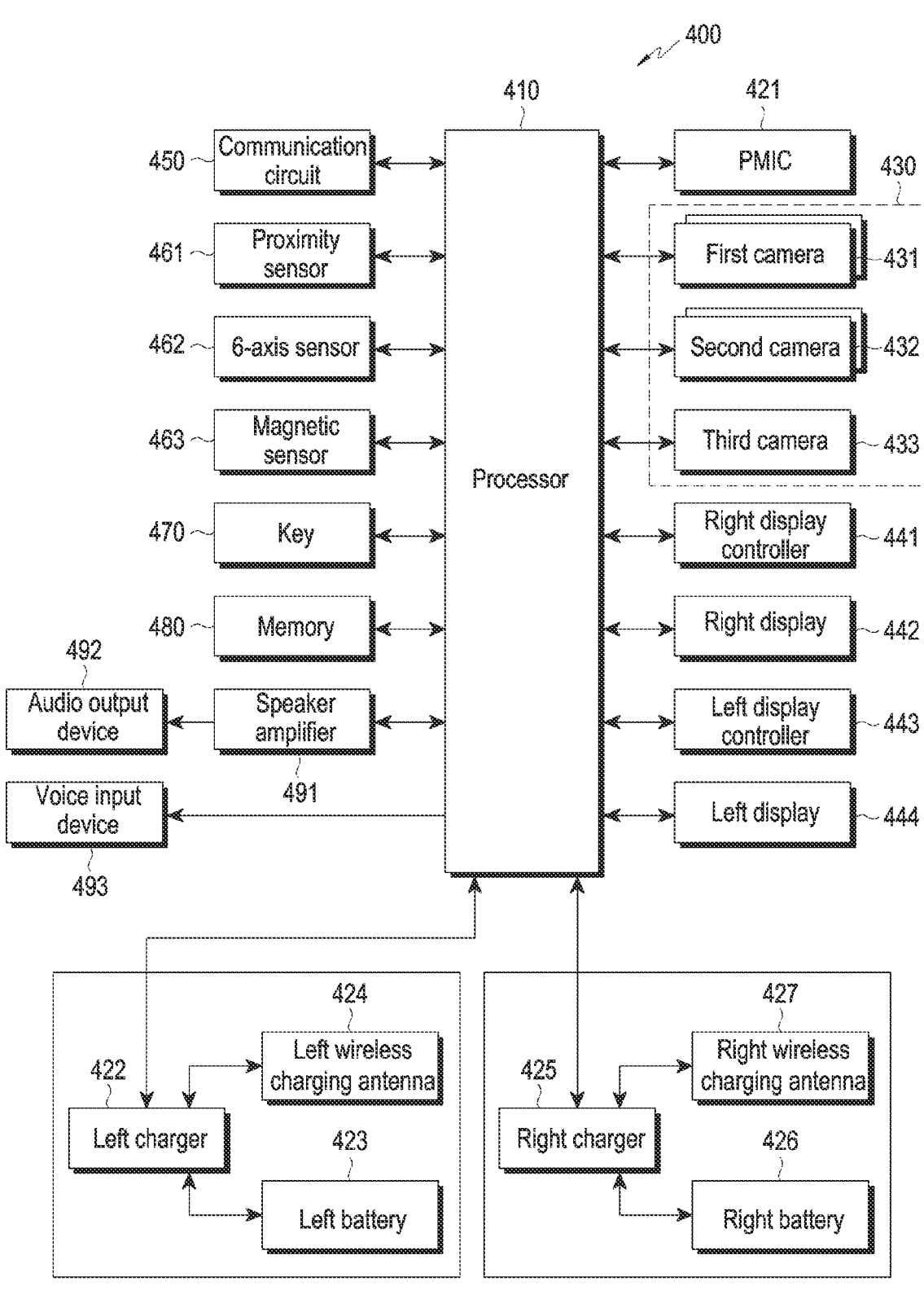
FIG. 4 is a block diagram illustrating an example configuration of an augmented reality device according to various embodiments.

FIG. 4 is a block diagram illustrating an example configuration of an augmented reality device according to various embodiments. An augmented reality device 400 may include a processor (e.g., including processing circuitry) 410, a plurality of cameras 430 including a first camera 431, a second camera 432, and a third camera 433, a power management integrated circuit (PMIC) 421, a left charger 422, a left wireless charging antenna 424, a left battery 423, a right charger 425, a right wireless charging antenna 427, a right battery 426, a right display controller (e.g., including circuitry) 441, a right display 442, a left display controller (e.g., including circuitry) 443, a left display 444, a communication circuit 450, a proximity sensor 461, a 6-axis sensor 462, a magnetic sensor 463, a key 470, a memory 480, a speaker amplifier 491, an audio output device (e.g., including audio output circuitry) 492, and a voice input device (e.g., including voice input circuitry) 493.

According to various embodiments, the processor 410 may control the other components of the augmented reality device 400, e.g., the first camera 431, the second camera 432, the third camera 433, the PMIC 421, the right display controller 441, the left display controller 443, the communication circuit 450, the memory 480, and the speaker amplifier 491 and may perform various data processing or computations.

According to various embodiments, the details of the one or more first cameras 311-1 and 311-2, one or more second cameras 312-1 and 312-2, and one or more third cameras 313 described above in connection with FIG. 3 may be equally applied to the first camera 431, the second camera 432, and the third camera 433, respectively. According to various embodiments, the augmented reality device 400 may include at least one of the first camera 431, the second camera 432, and the third camera 433, in plurality.

According to various embodiments, the PMIC 421 may convert the power stored in the left battery 423 and the right battery 426 to have the current or voltage required by the other components of the augmented reality device 400 and supply it to the other components of the augmented reality device 400. According to various embodiments, the right battery 426 may be implemented as the battery 335-1 of FIG. 3, and the left battery 423 may be implemented as the battery 335-2 of FIG. 2. According to various embodiments, the left charger 422 may charge the left battery 423 based on the wireless power received through the left wireless charging antenna 424. According to various embodiments, the right charger 425 may charge the right battery 426 based on the wireless power received through the right wireless charging antenna 427.

According to various embodiments, the right display controller 441 and the right display 442 may configure the first display 351 described above with reference to FIG. 3. According to various embodiments, the right display controller 441 may control a driver of the right display 442. According to various embodiments, the right display 442 may display a screen by transferring a light source. According to various embodiments, the left display controller 443 and the left display 444 may configure the second display 352 described above with reference to FIG. 2. According to various embodiments, the left display controller 443 may control a driver of the left display 444. According to various embodiments, the left display 444 may display a screen by transferring a light source.

According to various embodiments, the communication circuit 450 may support establishment of a wireless communication channel with an electronic device outside the augmented reality device 400 and performing communication through the established communication channel.

According to various embodiments, the augmented reality device 400 may further include other various types of sensors than the proximity sensor 461, the 6-axis sensor 462, and the magnetic sensor 463.

According to various embodiments, the memory 480 may store various data used by at least one component (e.g., the processor 410) of the augmented reality device 400.

According to various embodiments, the speaker amplifier 491 may be connected with the audio output device 492 to generate data to be transferred to the audio output device 492. According to various embodiments, the audio output device 492 may include a speaker.

Figure 5:
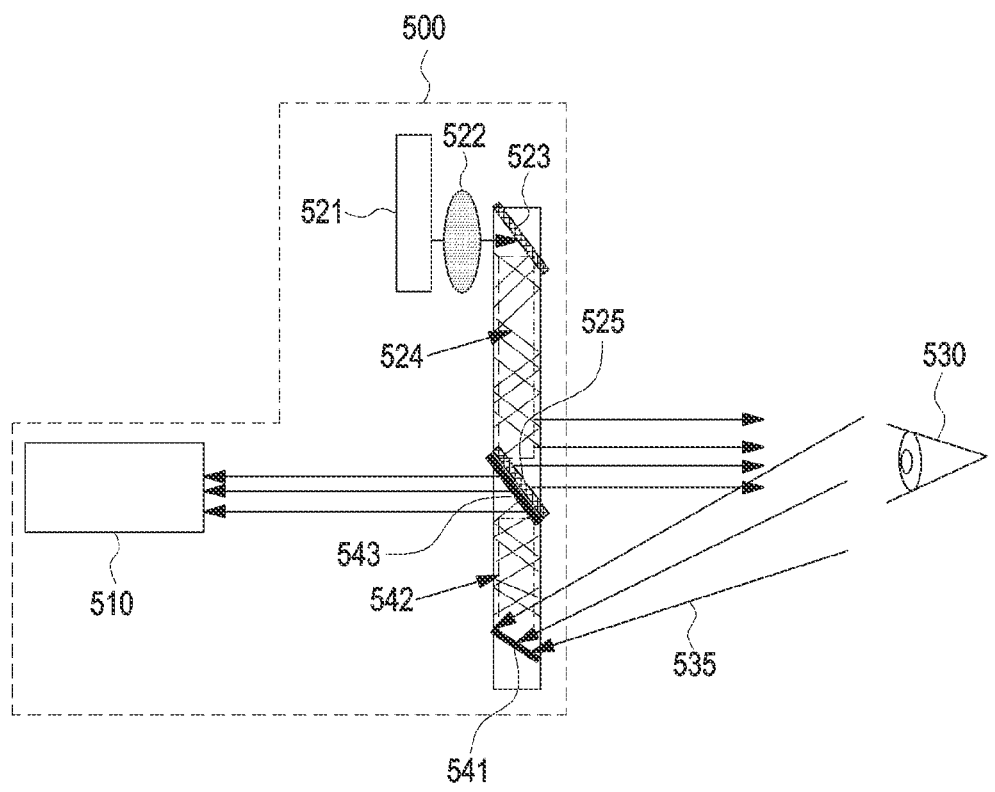
FIG. 5 is a diagram illustrating an example structure of a display and an eye tracking camera of an augmented reality device according to various embodiments.

FIG. 5 is a diagram illustrating an example structure of a display and an eye tracking camera of an augmented reality device according to various embodiments. An augmented reality device 500 (e.g., the augmented reality device 300 of FIG. 3) may include a display 521, a projection lens 522, an input optical member 523, a display optical waveguide 524, an output optical member 525, an eye tracking camera 510, a first splitter 541, an eye tracking optical waveguide 542, and/or a second splitter 543.

In the augmented reality device 500, the display 521 may be the first display 351 or the second display 352 illustrated in FIG. 3. The light output from the display 521 may be refracted by the projection lens 522 and converge into a smaller aperture area. The light refracted by the projection lens 522 may pass through the input optical member 523 (e.g., the input optical members 353-1 and 353-2 of FIG. 3) and be incident on the display optical waveguide 524, and then may pass through the display optical waveguide 524 and be output through the output optical member 525. The light output from the output optical member 525 may be seen by the user's eyes 530. Hereinafter, in the disclosure, the expression "displays an object on the display" may refer, for example, to light output from the display 521 being output through the output optical member 525, and the shape of the object is seen by the user's eyes 530 by the light output through the output optical member 525. Further, the expression "controls the display to display the object" may refer, for example, to the light output from the display 521 being output through the output optical member 525, and the display 521 is controlled so that the shape of the object is seen by the user's eyes 530 by the light output through the output optical member 525.

The light 535 reflected from the user's eye 530 may pass through the first splitter 541 and be incident on the eye-tracking optical waveguide 542, and may then pass through the eye tracking optical waveguide 542 and be output to the eye tracking camera 510 through the second splitter 543. According to various embodiments, the light 535 reflected from the user's eye 530 may be light output from the light emitting devices 314-1 and 314-2 of FIG. 3 and reflected from the user's eye 530. According to various embodiments, the eye tracking camera 510 may be one or more second cameras 312-1 and 312-2 illustrated in FIG. 3.

An example of the control wearable device 223 (hereinafter, a wearable device 600) according to various embodiments is described below with reference to FIGS. 6 to 8. As described above, the control wearable device 223 is not limited to the following example (the wearable device 600), but may rather be implemented as various types of electronic devices that may be worn on the user's body part.

Figure 6:
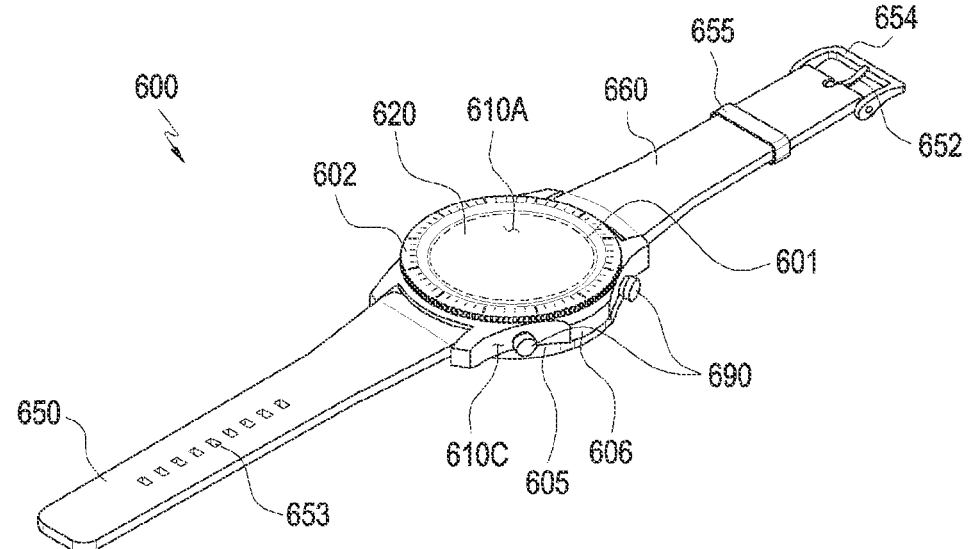
FIG. 6 is a front perspective view illustrating a wearable device according to various embodiments.

FIG. 6 is a front perspective view illustrating an example wearable device 600 according to various embodiments. FIG. 7 is a rear perspective view of the wearable device 600 of FIG. 6 according to various embodiments.

Figure 7:
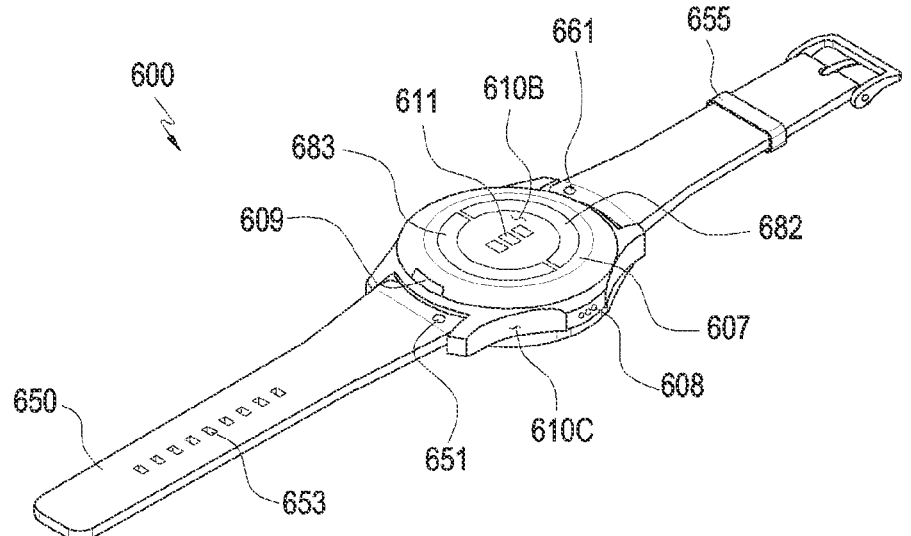
FIG. 7 is a rear perspective view illustrating the electronic device of FIG. 6 according to various embodiments.

Referring to FIGS. 6 and 7, according to an embodiment, the wearable device 600 (e.g., the electronic device of FIG. 1) may include a housing 610 including a first surface (or front surface) 610A, a second surface (or rear surface) 610B, and a side surface 610C surrounding the space between the first surface 610A and the second surface 610B and fastening members 650 and 660 connected to at least part of the housing 610 and configured to allow the wearable device 600 to be removably worn on the user's body part (e.g., his wrist or ankle). According to an embodiment (not shown), the housing may denote a structure forming part of the first surface 610A, the second surface 610B, and the side surfaces 610C of FIG. 6. According to an embodiment, at least part of the first surface 610A may have a substantially transparent front plate 601 (e.g., a glass plate or polymer plate including various coat layers). The second surface 610B may be formed by a rear cover 607 that is substantially opaque. The rear cover 607 may be formed of, e.g., laminated or colored glass, ceramic, polymer, metal (e.g., aluminum, stainless steel (STS), or magnesium), or a combination of at least two thereof. The side surface 610C may be formed by a side bezel structure (or a "side member") 606 that couples to the front plate 601 and the rear cover 607 and includes a metal and/or polymer. According to an embodiment, the rear cover 607 and the side bezel plate 606 may be integrally formed together and include the same material (e.g., a metal, such as aluminum). The fastening members 650 and 660 may be formed of various materials in various shapes. A uni-body structure or multiple unit links which is flexible may be formed of fabric, leather, rubber, urethane, metal, ceramic, or a combination of at least two thereof.

According to an embodiment, electrodes 682 and 683 formed of a conductive material may be formed in one area of the rear cover 607 of the wearable device 600.

According to an embodiment, the wearable device 600 may include at least one or more of a display 620, audio modules 605 and 608, a sensor module 611, key input devices 602 and 690, and a connector hole 609. According to an embodiment, the electronic device 600 may exclude at least one (e.g., the key input devices 602 and 690, connector hole 609, or sensor module 611) of the components or may add other components.

The display 620 may be visible through a significant portion of the front plate 601. The display 620 may have a shape corresponding to the shape of the front plate 601, e.g., a circle, ellipse, or polygon. The display 620 may be coupled with, or disposed adjacent, a touch detection circuit, a pressure sensor capable of measuring the strength (pressure) of touches, and/or fingerprint sensor.

The audio modules 605 and 608 may include a microphone hole 605 and a speaker hole 608. The microphone hole 605 may have a microphone inside to obtain external sounds. According to an embodiment, there may be a plurality of microphones to be able to detect the direction of a sound. The speaker hole 608 may be used for an external speaker or a receiver for phone talks. According to an embodiment, the speaker hole 608 and the microphone hole 605 may be implemented as a single hole, or speaker may be included without the speaker hole 608 (e.g., piezo speaker).

The sensor module 611 may produce an electrical signal or data value corresponding to the internal operation state or external environment state of the wearable device 600. The sensor module 611 may include, e.g., a biometric sensor module 611 (e.g., a heartrate monitor (HRM) sensor) disposed on the second surface 610B of the housing 610. The wearable device 600 may include a sensor module not shown, e.g., at least one of a gesture sensor, a gyro sensor, a barometric sensor, a magnetic sensor, an acceleration sensor, a grip sensor, a color sensor, an infrared (IR) sensor, a biometric sensor, a temperature sensor, a humidity sensor, or an illuminance sensor.

The key input devices 602 and 690 may include a wheel key 602 (or a bezel key) disposed on the first surface 610A of the housing 610 to be rotatable in at least one direction and/or a key button 690 disposed on the side surface 610C of the housing 610. The wheel key may have a shape corresponding to the shape of the front plate 601. According to an embodiment, the wearable device 600 may exclude all or some of the above-mentioned key input devices 602 and 690 and the excluded key input devices 602 and 690 may be implemented in other forms, e.g., as soft keys on the display 620. The connector hole 609 may receive a connector (e.g., a universal serial bus (USB) connector) for transmitting and receiving power and/or data to/from an external electronic device. Another connector hole (not shown) may be included for receiving a connector for transmitting and receiving audio signals to/from the external electronic device. The wearable device 600 may further include a connector cover (not shown) to cover at least part of, e.g., the connector hole 609 and preventing and/or reducing undesirable materials from entering the connector hole.

The fastening members 650 and 660 may detachably be fastened to at least portions of the housing 610 via locking members 651 and 661. The fastening members 650 and 660 may include one or more of a fastening member 652, fastening member coupling holes 653, a band guide member 654, and a band fastening ring 655.

The fastening member 652 may be configured to allow the housing 610 and the fastening members 650 and 660 to be fastened to the user's body part (e.g., wrist or ankle). The fastening member coupling holes 653 may fasten the housing 610 and the fastening members 650 and 660 to the user's body part, corresponding to the fastening member 652. The band guide member 654 may be configured to restrict movement of the fastening member 652 to a certain range when the fastening member 652 fits into one of the fastening member coupling holes 653, thereby allowing the fastening members 650 and 660 to be tightly fastened onto the user's body part. The band fastening ring 655 may limit the range of movement of the fastening members 650 and 660, with the fastening member 652 fitted into one of the fastening member coupling holes 653.

Figure 8A:
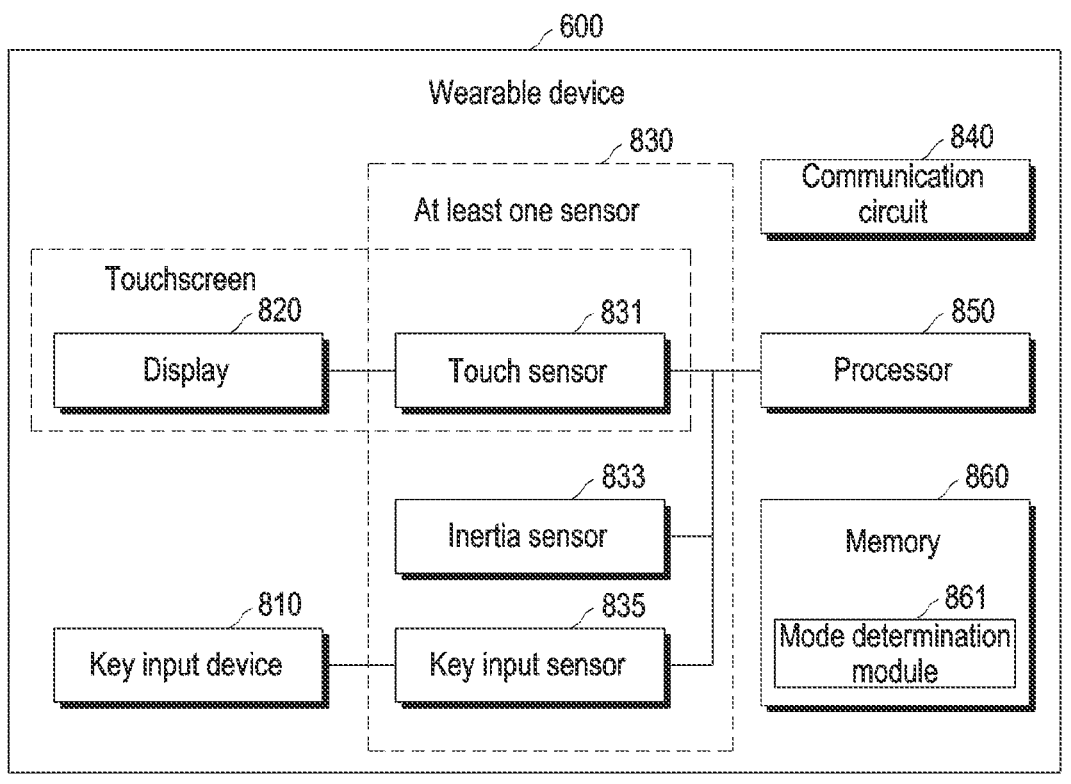
FIG. 8A is a block diagram illustrating a wearable device according to various embodiments.
Figure 8B:
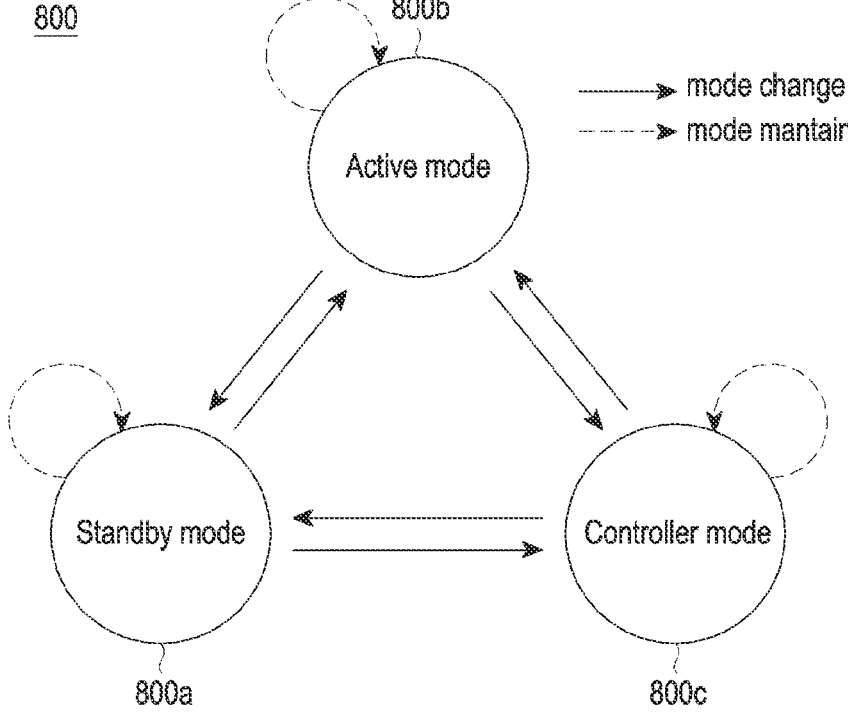
FIG. 8B is a diagram illustrating an example of a mode of a wearable device according to various embodiments.

FIG. 8A is a block diagram illustrating an example configuration of a wearable device 600 according to various embodiments. FIG. 8B is a diagram illustrating an example of a mode of a wearable device 600 according to various embodiments.

Referring to FIG. 8A, the wearable device 600 may include a display 820, a key input device 810, at least one sensor 830, a communication circuit 840, a processor 850, and a memory 860. The display 820 may be implemented like the display 600 described in FIG. 6, and the key input device 810 may be implemented like the key input devices 602 and 690 described in FIG. 6, and thus, a description may not be repeated.

According to various embodiments, the sensor 830 may be implemented to identify the user input received by the wearable device 600. For example, as shown in FIG. 8A, the sensor 830 may include a touch sensor 831 for sensing the user's input (e.g., a touch) received on the display 820, an inertial sensor 833 for sensing the movement of the wearable device 600, and a key input sensor 835 for sensing the user input (e.g., key button pressing or wheel key (or bezel key) rotating) using the key input device 810. The touch sensor 831 may be implemented as a touchscreen included in the display 820, but is not limited thereto. The key input sensor 835 may be implemented to include an electrical element (e.g., a capacitor and/or a switch) electrically connected to the key input device 810 so that the electrical value is changed when the key button is pressed or the wheel key is rotated. Without limited to those described and/or shown, the sensor 830 may further include various types of sensors 830 for sensing the user's input received by the wearable device 600.

According to various embodiments, the communication circuit 840 may establish a communication connection with devices (e.g., the electronic device 210, the HMD device 221, and the server 230). The communication circuit 840 may support a short-range wireless communication scheme, such as Wi-Fi, Bluetooth, and BLE, and the communication circuit 840 may also support a wireless communication connection scheme other than the described communication connection scheme (e.g., 3G, 4G/LTE, NR, or other cellular communication or optical communication) and a wired communication connection scheme. The communication circuit 840 may be implemented as the communication module 190 of FIG. 1, so a redundant description thereof is omitted.

According to an embodiment, the processor 850 may control the overall operation of the wearable device 600. The processor 850 may include at least one of an application processor (AP), a central processing unit (CPU), a graphic processing unit (GPU), a display processing unit (DPU), or a neural processing unit (NPU). The operation of the processor 850 described below may be performed according to the execution of a module (e.g., a mode determination module 861) stored in the memory 860. At least some of the modules (e.g., the mode determination module 861) included in the memory 860 may be implemented (e.g., executed) in software, firmware, or a combination of at least two or more thereof. For example, the modules may be implemented in the form of an application, program, computer code, instructions, routines, or processes, which are executable by the processor 850. Thus, when the modules (e.g., the mode determination module 861) are executed by the processor 850, the modules (e.g., the mode determination module 861) may trigger the processor 850 to perform operations associated with the modules (or functions that the modules may provide). Therefore, when it is described below that a specific module performs an operation, it may be interpreted as the processor 850 performing the operation as the specific module is executed. Alternatively, the modules (e.g., the mode determination module 861) may be implemented as portion of a specific application. Or, without being limited to what is described and/or shown, each module may be implemented as a separate hardware device (e.g., a processor or control circuit) from the processor 850. Meanwhile, at least some of the operations of the modules described below may be implemented as a separate module instead of the corresponding module. Each module is described below. The operation of the module described below may be understood as the operation of the processor 850 triggered when the module is executed as described above.

According to various embodiments, the mode determination module 861 may perform an operation based on the mode of the wearable device 600. For example, referring to FIG. 8B, the modes of the wearable device 600 may include a standby mode 800a, an active mode 800b, and a controller mode 800c. In an embodiment, the mode of the wearable device 600 may control the operation of the wearable device 600 and/or the state of the wearable device 600. For example, the wearable device 600 may perform an operation as shown in Table 1 below according to the mode 800 of the wearable device 600 or may control the state of the wearable device 600.

TABLE 1

| modes of wearable device | standby mode | active mode | controller mode |
|---|---|---|---|
| display states | inactive state (or off state) | active state (or on state) | inactive state (or off state) |
| touch sensor state | inactive state (or off state) | active state (or on state) | inactive state (or off state) |
| locked state | locked state | unlocked state | unlocked state |

In an embodiment, the mode of the wearable device 600 may determine whether to control immersive content (e.g., XR technology-based content). The wearable device 600 may determine whether to control the immersive content according to whether the mode of the wearable device 600 is the controller mode 800c. For example, when the mode of the wearable device 600 is the standby mode 800*a* or the active mode 800*b*, the wearable device 600 may refrain from transmitting a signal for controlling immersive content to the electronic device 210 (e.g., a smartphone). If the wearable device 600 identifies the user' input using the sensor 830 in a state in which the mode of the wearable device 600 is the standby mode 800*a* or the active mode 800*b*, the wearable device 600 may perform the operation corresponding to the user's input and refrain from transmitting a signal to the electronic device 210 (e.g., a smartphone) (or control not to perform operation). As an example, if the home key among the key input devices 810 is pressed by the user in a state in which the mode of the wearable device 600 is the active mode 800*b*, the wearable device 600 may display a home screen on the display 820 and refrain from transmitting a signal indicating that the home key is pressed to the electronic device 210 (e.g., a smartphone). Without limited to those described, the operation of providing a message check service, the operation of providing a call service, or the operation of displaying a specific screen (e.g., watch screen or body information screen) may be performed based on the user input, which is well known art and is thus omitted from detailed description. As another example, if the mode of the wearable device 600 is the controller mode 800*c*, the wearable device 600 may transmit a signal for controlling immersive content to the electronic device 210 (e.g., a smartphone). If the wearable device 600 identifies the user's input using the sensor 830 in a state in which the mode of the wearable device 600 is the controller mode 800*c*, the wearable device 600 may refrain from performing the operation corresponding to the user input and transmit the signal corresponding to the identified input to the electronic device 210 (e.g., a smartphone). For example, if the home key among the key input devices 810 is pressed by the user in a state in which the mode of the wearable device 600 is the controller mode 800*c*, the wearable device 600 may refrain from the operation of displaying the home screen on the display 820 and transmit a signal indicating that the home key is pressed to the electronic device 210 (e.g., a smartphone). According to various embodiments, the mode determination module 861 may determine the mode of the wearable device 600 based on the user input received from the wearable device 600 and/or signal received from another external device (e.g., the electronic device 210). Each embodiment is described below.

In an embodiment, the mode determination module 861 may identify a specific input (e.g., the user's input) and may determine the mode (e.g., standby mode 800*a*, active mode 800*b*, or controller mode 800*c*) of the wearable device 600 corresponding to the identified specific input. For example, the wearable device 600 may store information about a specific input for each mode of the wearable device 600 and, if the identified user input corresponds to the specific input, set the mode of the wearable device 600 to the specific mode. As an example, when a palm touch is identified, the wearable device 600 may change (or switch or set) the mode of the wearable device 600 from the current mode (e.g., the active mode 800*b* or the controller mode 800*c*) to the standby mode 800*a*. As another example, if an input (e.g., a touch on the touchscreen, wheel key rotation, or key button press (e.g., double press)) using the key input device 810, other than the palm touch, is identified, the wearable device 600 may change (or switch or set) the mode of the wearable device 600 from the standby mode 800*a* to the active mode 800*b* and/or controller mode 800*c*. Meanwhile, if the wearable device 600 identifies a specific input in a state in which the mode of the wearable device 600 is the controller mode

800*c*, the wearable device 600 may disregard the specific input (may instead transmit a control signal corresponding to the specific input to the electronic device 210 (e.g., a smartphone)). However, without limited to those described, if the wearable device 600 receives a specific input for switching from the controller mode 800*c* to the active mode 800*b* even in a state in which the mode of the wearable device 600 is the controller mode 800*c*, the wearable device 600 may change (or switch or set) the mode of the wearable device 600 from controller mode 800*c* to the active mode 800*b*. In other words, the wearable device 600 may perform mode switching upon receiving a specific input in the controller mode 800*c*, but may refrain from performing mode switching on the other inputs than the specific input, but is not limited thereto. Further, in this case, the wearable device 600 may manage a designated input for each of the standby mode 800*a* and the active mode 800*b* (e.g., switches to the standby mode 800*a* or active mode 800*b* upon identifying an input corresponding to the standby mode 800*a* or active mode 800*b*) and may not manage the designated input for the controller mode 800*c* (e.g., no designated input for switching to the controller mode 800*c*), but is not limited thereto.

Further, according to an embodiment, the mode determination module 861 may set the mode of the wearable device 600 to the standby mode 800*a* if a designated time elapses. For example, if no input is identified for a designated time after the mode of the wearable device 223 is set to the active mode 800*b* or controller mode 800*c*, the wearable device 600 may set the mode of the wearable device 223 to the standby mode 800*a*.

Further, in an embodiment, the mode determination module 861 may set the mode of the wearable device 600 to the active mode 800*b* if a call is received or a notification message is received.

Further, in an embodiment, if a preset condition is identified using a sensor, the mode determination module 861 may set the mode of the wearable device 600 from the controller mode 800*c* to another mode (e.g., the standby mode 800*a* or active mode 800*b*).

Further, in an embodiment, the mode determination module 861 may receive a signal for mode setting from an external device (e.g., the electronic device 210 (e.g., a smartphone)) and set the mode of the wearable device 600 to the mode corresponding to the received signal. For example, upon receiving a signal (e.g., a signal indicating checkglance=Y) for setting to the active mode 800*b* from the electronic device 210 (e.g., a smartphone), the wearable device 600 may set the mode of the wearable device 223 to the active mode 800*b* and, upon receiving a signal (e.g., a signal indicating checkcontrol=Y) for setting to the controller mode 800*c*, set the mode of the wearable device 223 to the controller mode 800*c*.

Hereinafter, an example of a configuration of the electronic device 210 according to various embodiments is described in greater detail with reference to FIGS. 9A and 9B. The configuration of the head-mounted display device 221 and the configuration of the wearable device 223 to be described below may be implemented as described above, and a duplicate description may not be given below.

Figure 9A:
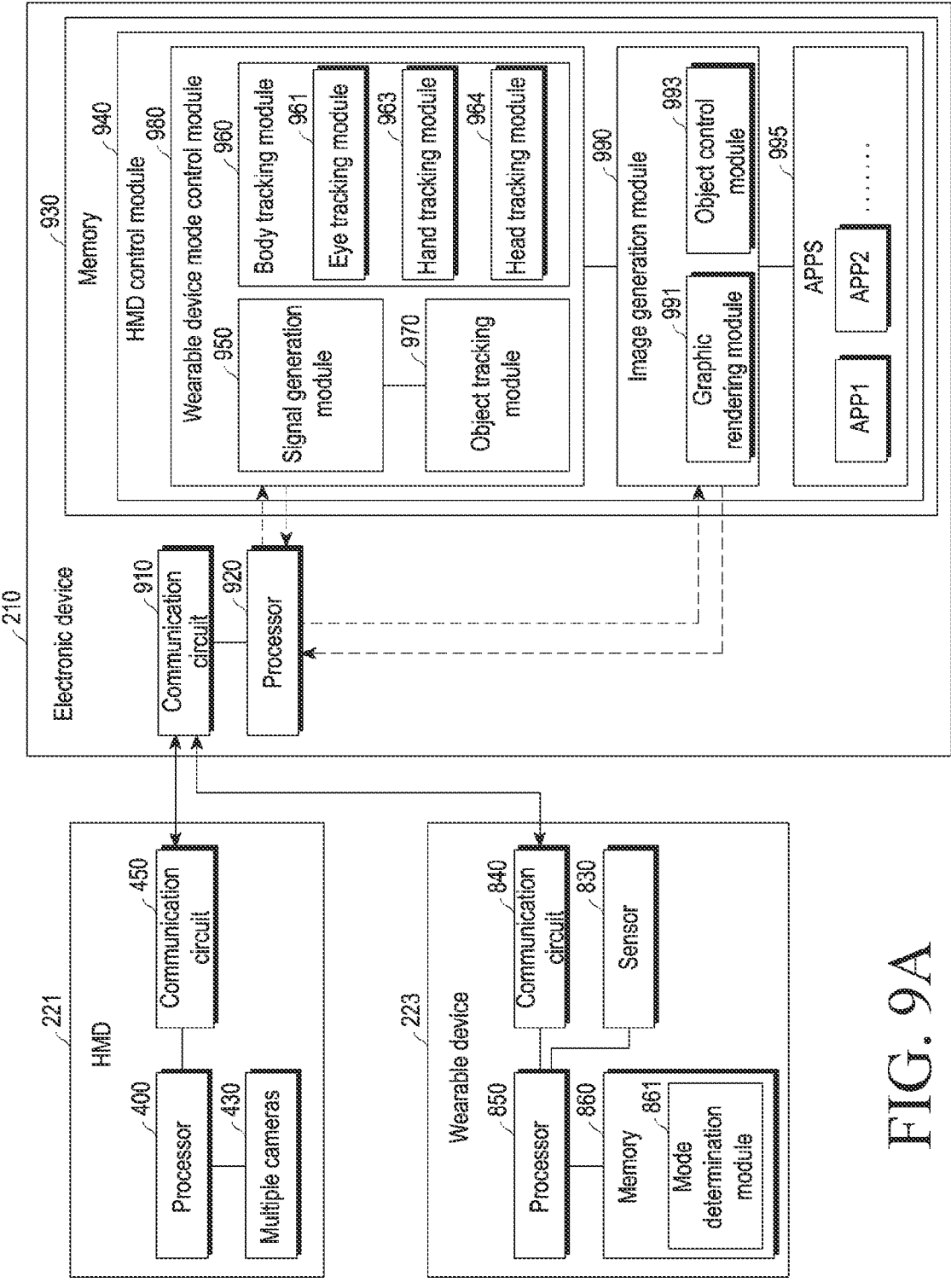
FIG. 9A is a diagram illustrating an example configuration of an electronic device according to various embodiments.
Figure 9B:
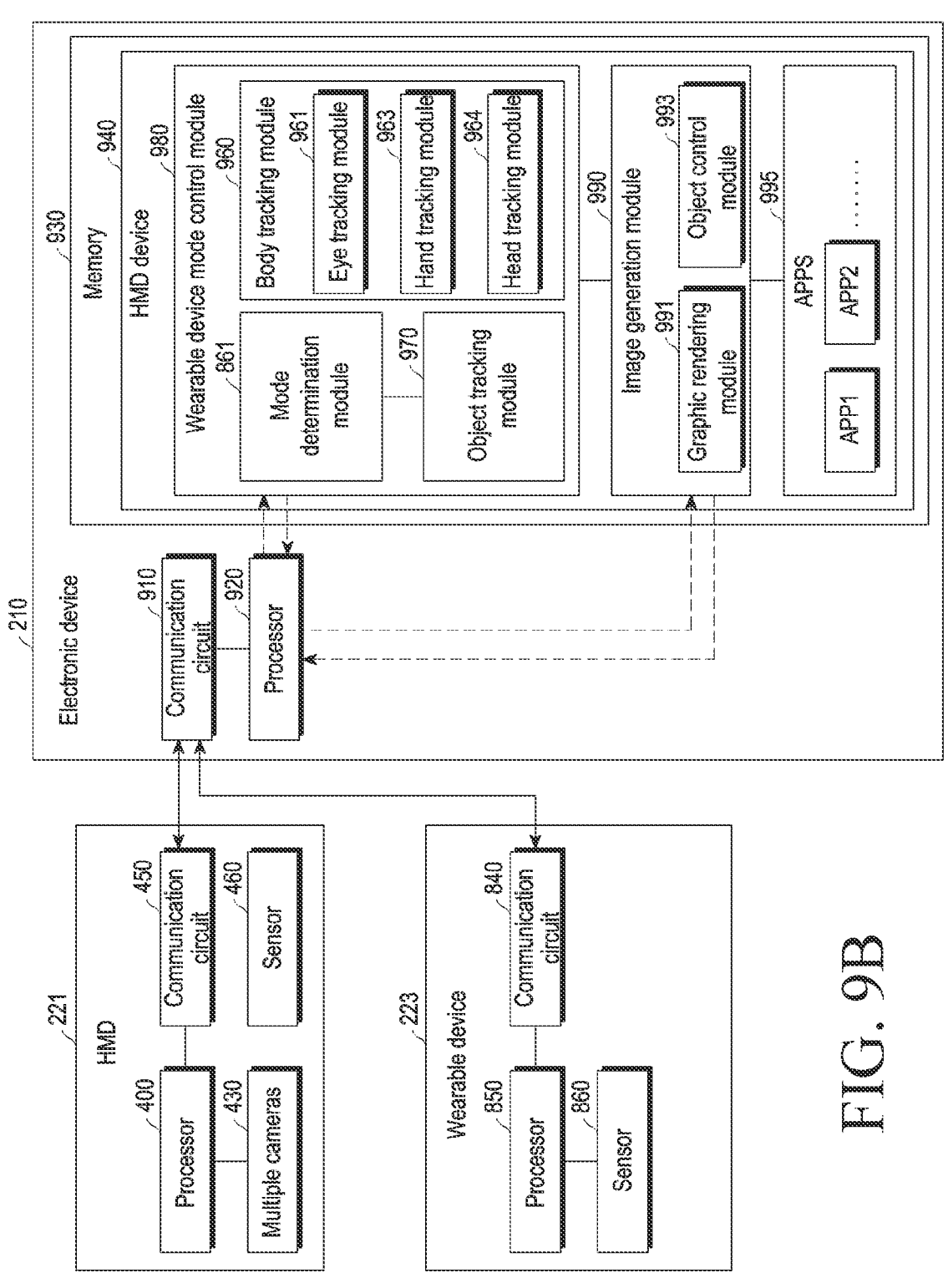
FIG. 9B is a diagram illustrating another example configuration of an electronic device according to various embodiments.

FIG. 9A is a diagram illustrating an example configuration of an electronic device 210 according to various embodiments. FIG. 9B is a diagram illustrating another example configuration of an electronic device 210 according to various embodiments.

According to various embodiments, referring to FIG. 9A, the electronic device 210 may include a communication circuit 910, a processor 920, and a memory 930. Meanwhile, the electronic device 210 may be implemented to include the components of the electronic device 101 described in FIG. 1, without being limited to that illustrated in FIG. 9A, and a duplicate description thereof may not be given below.

According to various embodiments, the communication circuit 910 may establish a communication connection with devices (e.g., the HMD device 223, wearable device 223, and the server 230). The communication circuit 910 may support a short-range wireless communication scheme, such as Wi-Fi, Bluetooth, and BLE, and the communication circuit 840 may also support a wireless communication connection scheme other than the described communication connection scheme (e.g., 3G, 4G/LTE, NR, or other cellular communication or optical communication) and a wired communication connection scheme. The communication circuit 910 may be implemented as the communication module 190 of FIG. 1, so a redundant description thereof is omitted.

According to an embodiment, the processor 920 may control the overall operation of the electronic device 210. The processor 920 may include at least one of an AP, a CPU, a GPU, a DPU, or an NPU. The operation of the processor 920 described below may be performed according to the execution of a modules (e.g., an HMD control module 940) stored in the memory 930. At least some of the modules (e.g., the HMD control module 940) included in the memory 930 may be implemented (e.g., executed) in software, firmware, or a combination of at least two or more thereof. For example, the modules may be implemented in the form of an application, program, computer code, instructions, routines, or processes, which are executable by the processor 920. Thus, when the modules (e.g., the HMD control module 940) are executed by the processor 920, the modules (e.g., the HMD control module 940) may trigger the processor 920 to perform operations associated with the modules (or functions that the modules may provide). Therefore, when it is described below that a specific module performs an operation, it may be interpreted as the processor 920 performing the operation as the specific module is executed. Alternatively, the modules (e.g., the HMD control module 940) may be implemented as portion of a specific application. Or, without being limited to what is described and/or shown, each module may be implemented as a separate hardware device (e.g., a processor or control circuit) from the processor 920. Meanwhile, at least some of the operations of the modules described below may be implemented as a separate module instead of the corresponding module. Each module is described below. The operation of the module described below may be understood as the operation of the processor 920 triggered when the module is executed as described above.

According to various embodiments, the HMD control module 940 may perform at least one processing operation for controlling the head-mounted display device 221 and may transmit the processed result to the head-mounted display device 221. For example, the HMD control module 940 may receive information (e.g., information associated with the user's body and/or app information) from the head-mounted display device 221 and may process the received information and transmit the processed result to the head-mounted display device 221. The information may include information about a 3D coordinate system (or surrounding 3D environment data) associated with the head-mounted display device 221 (or centered on the head-mounted display device 221), information associated with the position of a body part or information associated with the position of an object (e.g., the wearable device 223). The information about the 3D coordinate system may include information about the 3D coordinate system (x, y, z) for the surrounding space identified based on images captured by a plurality of cameras of the head-mounted display device 221. As is described below, the electronic device 210 may manage integrated 3D information about the surrounding space, generated by reflecting the position and/or direction of the body part in the 3D coordinate system (e.g., the 3D coordinates of a hand, the angle in the yaw, roll, and/or pitch direction of the head, or the 3D vector of the gaze) and the position (e.g., 3D coordinates) of the object (e.g., the wearable device 223). As another example, the HMD control module 940 may generate an extended reality (XR) technology-based image based on the 3D information and may transmit the generated image to the head-mounted display device 221. Hereinafter, the operation of each module included in the HMD control module 940 is further described.

According to various embodiments, the wearable device mode control module 980 may generate a signal for setting the mode (e.g., the standby mode 800*a*, active mode 800*b*, and controller mode 800*c*) of the wearable device 223 (e.g., a smart watch) based on information received from the head-mounted display device 221. The electronic device 210 (e.g., the processor 920) may transmit the generated signal to the wearable device 223 (e.g., a smart watch) through the communication circuit 910. As described above, the wearable device 223 (e.g., the mode determination module 861) may set the mode of the wearable device 223 (e.g., the mode determination module 861) to the active mode 800*b* or controller mode 800*c*. Meanwhile, referring to FIG. 9B, the electronic device 210 may be implemented to determine the mode of the wearable device 223 and transmit information about the determined mode to the wearable device 223. For example, the electronic device 210 may include the mode determination module 861 of the wearable device 223, instead of the signal generation module 950, and may determine the mode of the wearable device 223 based on the mode determination module 861 and transfer information about the determined mode to the wearable device 223.

According to various embodiments, the body tracking module 960 may identify (or manage or update) position information (e.g., 3D coordinate value or vector value) about a specific body part in the 3D coordinate system (or surrounding 3D environmental data) associated with the head-mounted display device 221 (or centered on the head-mounted display device 221), based on information associated with at least one specific body part of the user (e.g., information associated with the position of the at least one specific body part) received from the head-mounted display device 221. The information associated with the specific body part received from the head-mounted display device 221 may include information associated with the position and/or direction of at least one of both hands, gaze, or head analyzed by the head-mounted display device 221 based on the images captured by the head-mounted display device 221. The electronic device 210 may identify the position (e.g., the 3D coordinates in the 3D coordinate system) and/or direction (e.g., the angle in the roll, yaw, or pitch direction in the 3D coordinate system) of the body part based on the information associated with the position and/or direction. In other words, the position- and/or direction-associated information may be used as raw data for identifying the position and/or direction of the body in the 3D coordinate system for the surrounding space. For example, the eye tracking module 961 may obtain the 3D coordinate value and/or 3D vector value indicating the gaze position in the 3D coordinate system (or surrounding 3D environmental data) associated with the head-mounted display device 221 (or centered on the head-mounted display device 221). As an example, the eye tracking module 961 may obtain the 3D coordinate value and/or 3D vector value in the 3D coordinate system based on the position of the camera of the HMD device 221 capturing the image to track the gaze position, and the coordinate value or vector value indicating the gaze position received from the HMD device 221. For example, the eye tracking module 961 may identify the 3D coordinate value corresponding to the position of the camera in the 3D coordinate system and apply the direction vector indicating the gaze direction to the identified 3D coordinate value, thereby obtaining the 3D vector value indicating the gaze direction in the 3D coordinate system. As another example, the hand tracking module 963 may obtain the 3D coordinate value indicating the position of at least one hand of the user in the 3D coordinate system (or surrounding 3D environmental data) associated with the head-mounted display device 221 (or centered on the head-mounted display device 221) based on the received hand position-associated information (e.g., data for the hand moving direction and data for the hand-identified image and the position of the camera having captured the image). As another example, the head tracking module 964 may obtain the 3D coordinate value indicating the position of the head and/or the rotation angle (e.g., yaw, pitch, and roll angles) of the head in the 3D coordinate system (or surrounding 3D environmental data) associated with the head-mounted display device 221 (or centered on the head-mounted display device 221).

According to various embodiments, the object tracking module 970 may obtain the 3D coordinate value indicating the position of the wearable device 223 (e.g., a smart watch) in the 3D coordinate system (or surrounding 3D environmental data) associated with the head-mounted display device 221 (or centered on the head-mounted display device 221).

According to various embodiments, the signal generation module 950 may generate a signal for setting the mode (e.g., the active mode 800 and controller mode 800c) of the wearable device 223 (e.g., a smart watch) based on information obtained from the body tracking module 960 and the object tracking module 970. According to an embodiment, the signal generation module 950 may generate a signal for setting the mode of the wearable device 223 to the active mode 800b. For example, upon determining that the user has an intent to activate the wearable device 223 (or an intent to use the wearable device 223 (e.g., a smart watch)), the signal generation module 950 may generate a signal for setting the mode of the wearable device 223 to the active mode 800b. As an example, if the value (e.g., 3D vector) indicating the position of the user's gaze in the 3D coordinate system and the value (e.g., 3D coordinates) indicating the position of the wearable device 223 (e.g., a smart watch) correspond to each other (e.g., the 3D vector passes through the 3D coordinates), the signal generation module 950 may generate a signal for setting the mode of the wearable device 223 to the active mode 800b. According to an embodiment, the signal generation module 950 may generate a signal for setting the mode of the wearable device 223 to the controller mode 800c. Meanwhile, without limited to those described, other examples are described below. For example, upon determining that the user has an intent to control immersive content using the wearable device 223 (e.g., a smart watch), the signal generation module 950 may generate a signal for setting the mode of the wearable device 223 to the controller mode 800c. The signal generation module 950 may determine whether the positions of both hands meet a designated condition as part of the operation of determining whether the user has an intent to control immersive content using the wearable device 223 (e.g., a smart watch). As an example, the signal generation module 950 may identify the probability that the positions of the user's hands are to be moved to a specific area in the 3D coordinate system and, if the identified probability exceeds a threshold, determines that the user has an intent to control immersive content and/or generate a signal for setting the mode of the wearable device 223 to the active mode 800b. Meanwhile, without limited to those described, other examples are described below.

Meanwhile, the signal generation module 950 may be implemented as part of the object tracking module 970.

According to various embodiments, the image (or view) generation module 990 may obtain the integrated 3D information obtained by the HMD control module 940 and generate immersive content based on the 3D information. The immersive content may include an image including at least one graphic object generated based on extended reality (XR) technology. The image (or view) generation module 990 may obtain the above-described integrated 3D information in which the positions of the objects (e.g., the user's body part and/or object) have been synchronized in the 3D coordinate system around the HMD device 221 and render the graphic object obtained based on execution of an application (or program) 995 onto the obtained 3D information, thereby generating the image. For example, the image (or view) generation module 990 may transfer the 3D information to running applications 995 and perform the rendering operation based on graphic object, screen, and coordinate information received from the applications 995. In this case, the image (or view) generation module 990 may generate an image based on the signal for controlling immersive content received from the wearable device 223 (e.g., a smart watch), as part of the operation of generating the immersive content. The electronic device 210 (e.g., the processor 920) may transmit the image including the graphic object rendered by the image (or view) generation module 990 to the head-mounted display device 221 through the communication circuit 910. The head-mounted display device 221 may display the received image.

According to various embodiments, as described above, the graphic rendering module 991 may obtain the integrated 3D information obtained by the HMD control module 940 and generate an image including at least one graphic object based on the 3D information. For example, the graphic rendering module 991 may transfer the 3D information to running applications 995 and perform the rendering operation based on graphic object, screen, and coordinate information received from the applications 995. In this case, the graphic rendering module 991 may receive information for controlling (e.g., control the visual attributes, such as moving, transforming, or recoloring) the object received from the object control module 993 and control and render at least one object included in the image based on the received information.

According to various embodiments, the object control module 993 may control at least one object based on the signal for controlling immersive content received from the wearable device 223 (e.g., a smart watch). The controlling operation may include controlling the visual attributes, such as moving, transforming, or recoloring the object, but without limited to those described, may include various types of operations for controlling the visual attributes. Meanwhile, if the provided object includes other attributes (e.g., auditory or tactile attributes) than the visual attributes, it may control the other attributes (e.g., auditory or tactile attributes) based on the received signal.

Hereinafter, examples of operations of the electronic device 210, the head-mounted display device 221 (hereinafter, the HMD device 221), and the control wearable device 223 (hereinafter, the wearable device 223) for using extended reality (XR) technology according to various embodiments are described.

According to various embodiments, the electronic device 210 may generate a signal for setting the mode of the wearable device 223 based on information (e.g., information associated with the position, posture, and/or direction of the user's body part or information about the position of the wearable device 223) received from the HMD device 221 and transmit the generated signal to the wearable device 223. The wearable device 223 may set the mode of the wearable device 223 corresponding to the signal received from the electronic device 210 and, if the set mode is the controller mode 800c, transmit a control signal corresponding to the identified input to the electronic device 210. The electronic device 210 may generate an image based on extended reality technology based on the received control signal and transmit the generated image to the HMD device 221.

Figure 10:
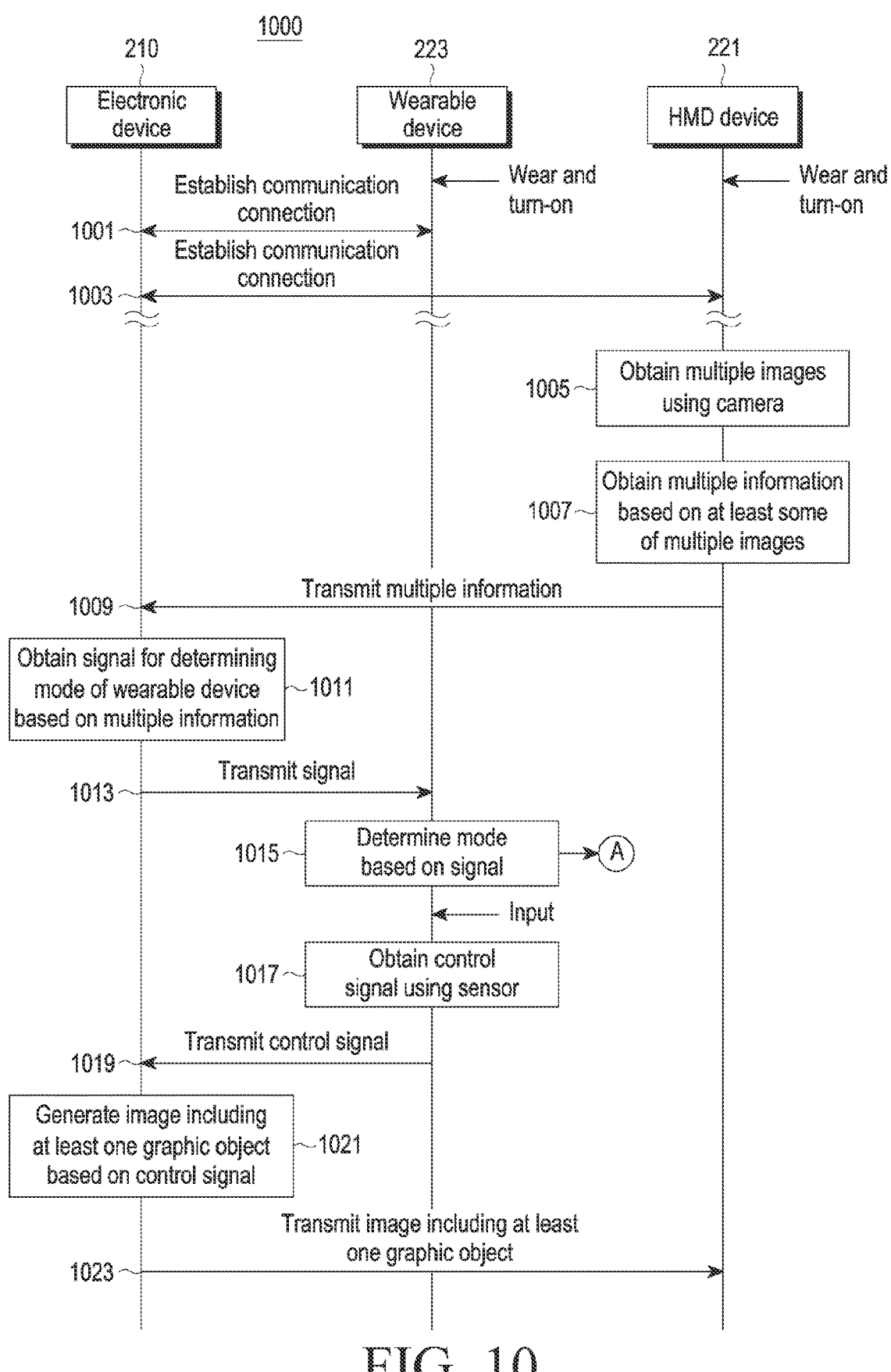
FIG. 10 is a flowchart illustrating example operations of an electronic device, an HMD device, and a wearable device according to various embodiments.

FIG. 10 is a flowchart 1000 illustrating example operations of an electronic device 210, an HMD device 221, and a wearable device 223 according to various embodiments. According to various embodiments, the operations shown in FIG. 10 are not limited to the shown order but may rather be performed in other various orders. According to various embodiments, more or less operations than those of FIG. 10 may be performed. Hereinafter, FIG. 10 is described in connection with FIGS. 11A, 11B, 12A and 12B.

Figure 11A:
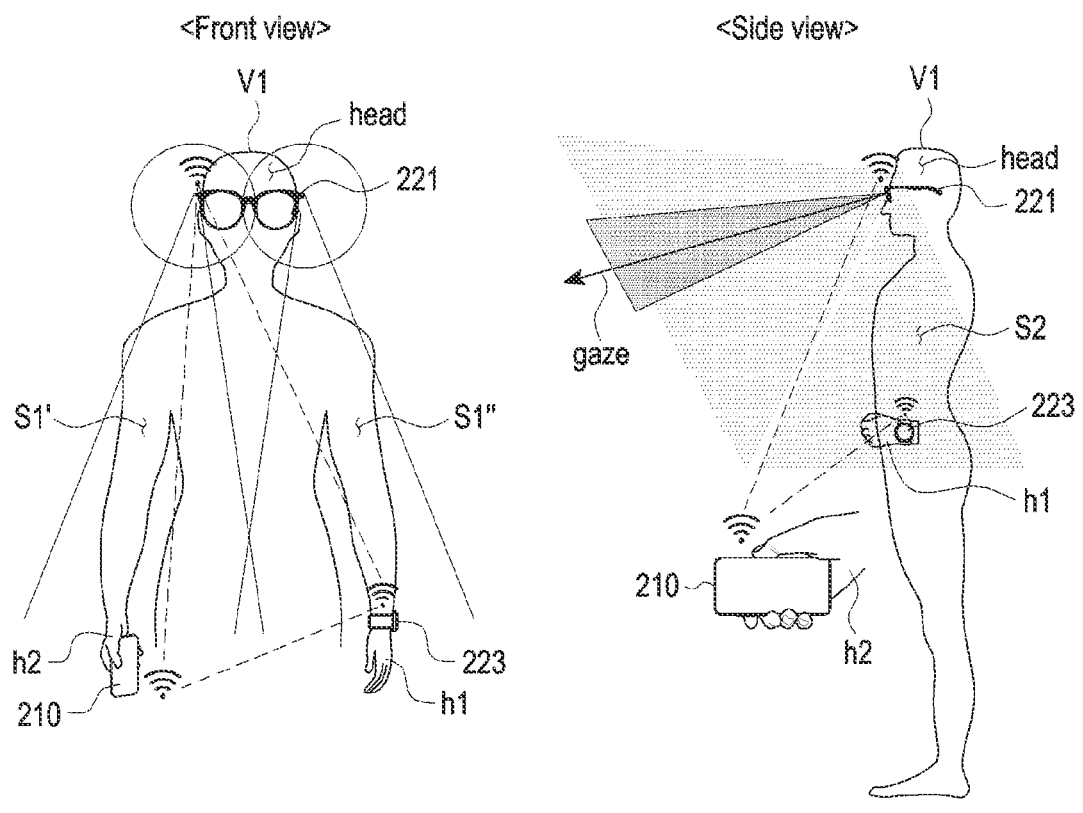
FIG. 11A is a diagram illustrating example operations of an electronic device, an HMD device, and a wearable device according to various embodiments.
Figure 11B:
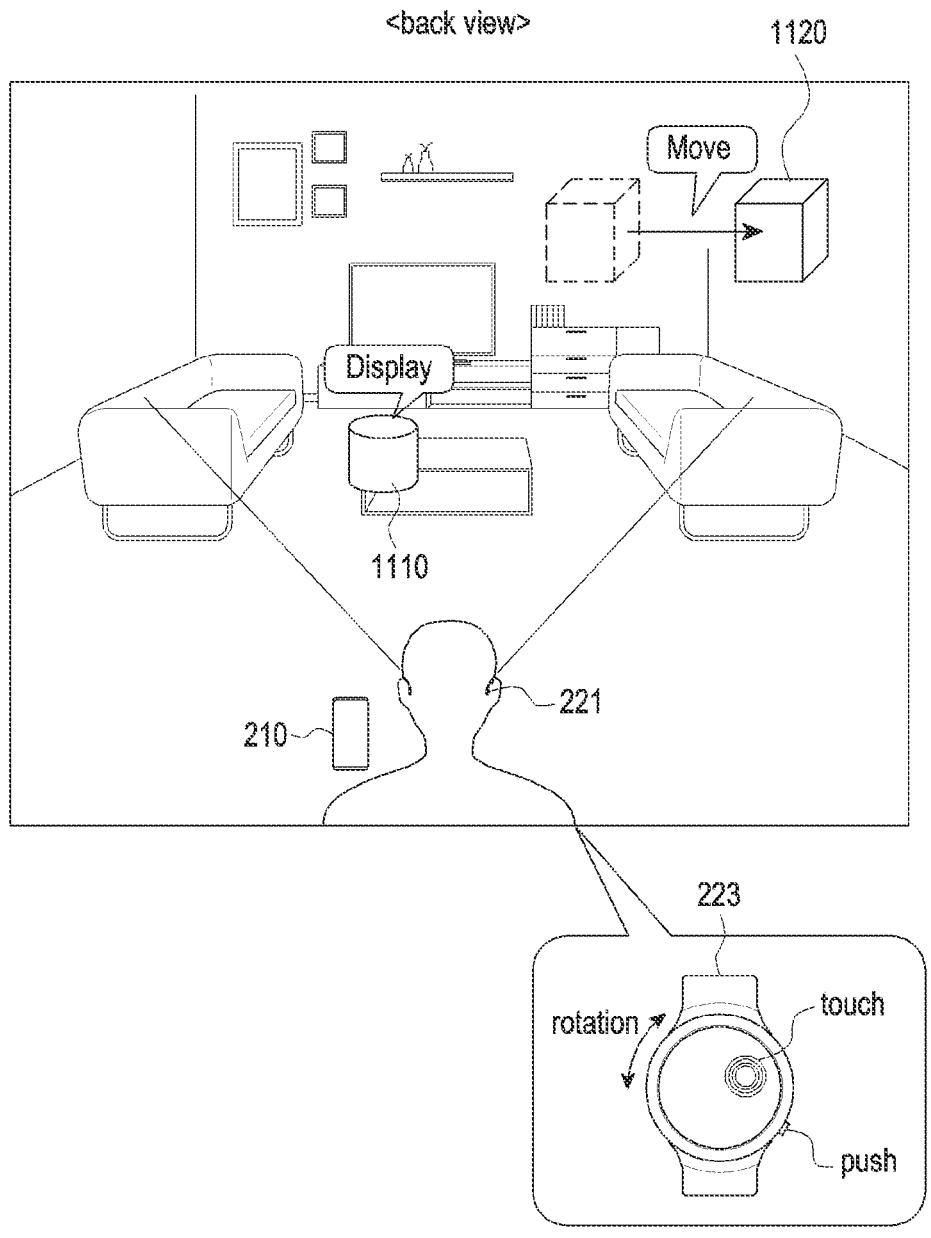
FIG. 11B is a diagram illustrating an example operation of displaying an extended reality (XR) technology-based image generated based on an input using a wearable device by an HMD device according to various embodiments.
Figure 12A:
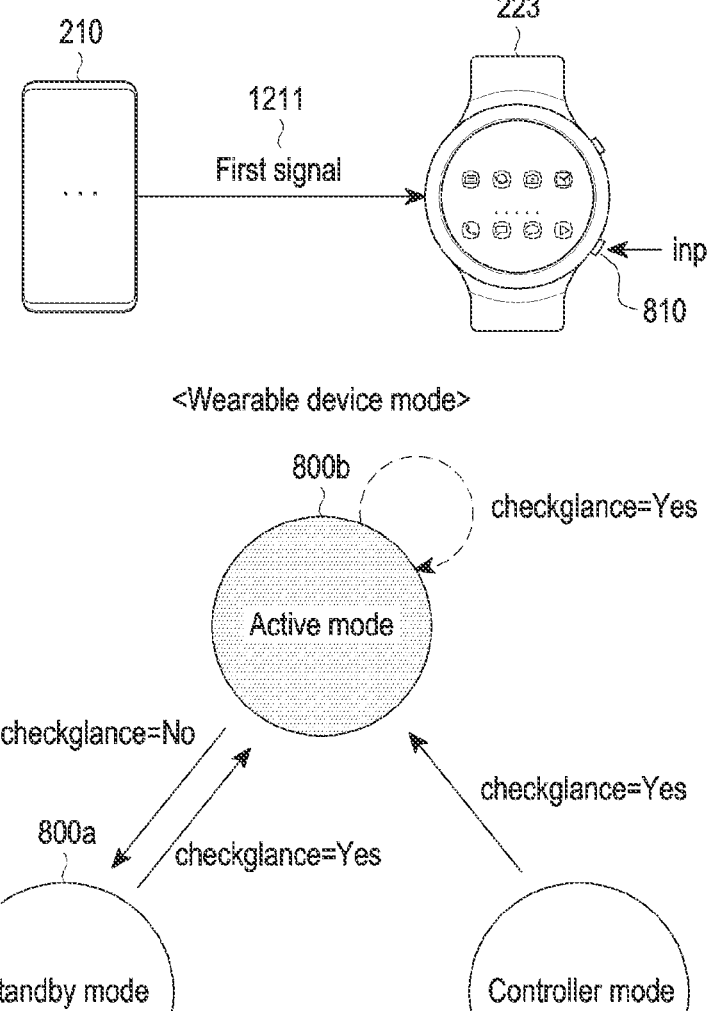
FIG. 12A and FIG. 12B are diagrams illustrating examples of an operation of setting a mode of a wearable device by an electronic device according to various embodiments.
Figure 12B:
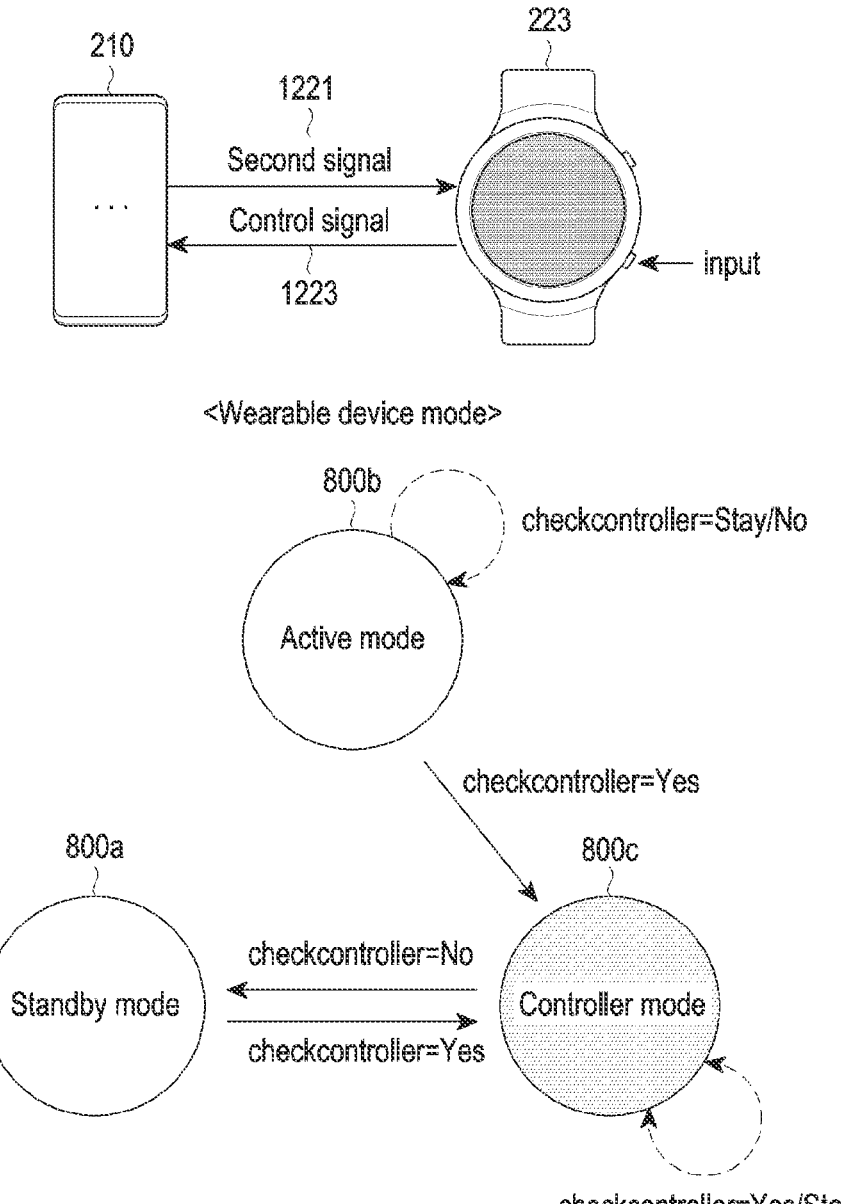

FIG. 11A is a diagram illustrating example operations of an electronic device 210, an HMD device 221, and a wearable device 223 according to various embodiments. FIG. 11B is a diagram illustrating an example operation of displaying an extended reality (XR) technology-based image generated based on an input using a wearable device 223 by an HMD device 221 according to various embodiments. FIG. 12A and FIG. 12B are diagrams illustrating examples of an operation of setting a mode of a wearable device 223 by an electronic device 210 according to various embodiments.

According to various embodiments, after the wearable device 223 and HMD device 221 are worn by the user V1 and turned on, the electronic device 210 may establish a communication connection with the wearable device 223 in operation 1001 and establish a communication connection with the HMD device 221 in operation 1003. As described above, the electronic device 210 may establish the communication connection with the wearable device 223 and HMD device 221 using a short-range wireless communication scheme, such as Wi-Fi, Bluetooth, and BLE, and it may also establish the communication connection using a wireless communication connection scheme other than the described communication connection scheme (e.g., 3G, 4G/LTE, NR, or other cellular communication or optical communication) and a wired communication connection scheme.

According to various embodiments, the electronic device 210 may receive information indicating whether the wearable device 223 and/or the HMD device 221 is worn based on the communication connection configuration. For example, the wearable device 223 and/or the HMD device 221 may detect whether the wearable device is worn by the user V1 through a sensor and may transmit the detected information to the electronic device 210. As described above, the electronic device 210 may select the hybrid-type content control technique from among the content control techniques (e.g., the controller-type, hand-gesture type, or hybrid-type described in connection with FIGS. 2A to 2C) based on extended reality technology based on identifying that the wearable device 223 and HMD device 221 are worn. The electronic device 210 may perform operations 1011 to 1013 described below, based on selection of the hybrid-type content control technique.

According to various embodiments, the HMD device 221 may obtain (or capture) a plurality of images using a plurality of cameras 430 in operation 1005. According to various embodiments, in operation 1007, the HMD device 221 may obtain a plurality of information based on at least some of the plurality of images. According to various embodiments, the HMD device 221 may transmit the plurality of information to the electronic device 210 in operation 1009. As described above for the HMD control module 940, the plurality of information may include at least one of information about the 3D coordinates for the surrounding space of the HMD device 221, information (e.g., the positions of both hands h1 and h2, the rotation angle of the head H, and/or the direction of the gaze) associated with the position and/or posture of body parts, or information associated with the position of the wearable device 223. In an embodiment, the HMD device 221 may recognize the surrounding space (e.g., the actual surrounding space of the HMD device 221) of the HMD device 221 based on the image captured by each of the plurality of cameras 430 and the respective positions of the plurality of cameras 430 and identify the position of the HMD device 221 in the recognized surrounding space. As at least part of the operation of identifying the position of the HMD device 221 and the surrounding space, the HMD device 221 may compare the objects (or land marks) in the images captured by the plurality of cameras and, if the identical objects are detected as the result of comparison, calculate the coordinate values (e.g., 3D coordinate values) of the captured images based on the position and/or depth information about the cameras having captured the images in which the identical objects have been detected. The operation of the HMD device 221 may include a SLAM operation. Further, in an embodiment, as shown in FIG. 11A, the HMD device 221 may identify the rotation angle of the yaw, pitch, and/or roll direction of the head H of the user V1 based on the images captured using the cameras (not shown) facing the forward area (S1 including S1' and S1") (or having the FOV for the forward area S1) among the plurality of cameras 430. Further, in an embodiment, as shown in FIG. 11A, the HMD device 221 may detect both the hands h1 and h2 and/or wearable device 223 from the images captured using the cameras (not shown) facing the downward area S2 (or having the FOV for the downward area S2) among the plurality of cameras 430 and identify the 3D moving direction (e.g., the 3D vector) of each of the hands h1 and h2 or the 3D position (e.g., 3D coordinates) of the wearable device 223 and/or each of the detected hands h1 and h2. Further, in an embodiment, as shown in FIG. 11A, the HMD device 221 may identify the gaze direction (e.g., 3D vector) of the user V1 based on the images captured by the cameras which capture the eyes of the user V1 and/or the cameras facing the forward area.

Meanwhile, without limited to those described, the HMD device 221 may transmit the plurality of images obtained using the plurality of cameras 430 to the electronic device 210, and the electronic device 210 may perform the operation for obtaining information about the body parts of the user V1 and 3D information associated with the HMD device 221 like the above-described operation of the HMD device 221.

According to various embodiments, in operation 1011, the electronic device 210 may obtain (or generate) a signal for determining the mode of the wearable device 223 based on a plurality of information. According to various embodiments, in operation 1013, the electronic device 210 may transmit the obtained signal to the wearable device 223. For example, the electronic device 210 may generate a signal for setting the mode of the wearable device 223 to the active mode 800*b* or controller mode 800*c* based on the plurality of information received from the HMD device 221 (e.g., at least one of information about the 3D coordinates for the surrounding space of the HMD device 221, information about the 3D coordinate of the HMD device 221 in the surrounding space, information associated with the position and/or posture of the body parts (e.g., the positions of the hands h1 and h2, the rotation angle of the head H, and/or the direction of the gaze), or information associated with the position of the wearable device 223). For example, the electronic device 210 may identify information about the position of the body part and/or information about the position of the wearable device 223 associated with the same coordinate system (e.g., the 3D coordinate system for the surrounding space of the HMD device 221) (or in the same coordinate system) based on the plurality of received information and may generate a signal for setting the mode of the wearable device 223 based on the identified information about the position. As an example, the electronic device 210 may identify the rotation angle and/or the 3D coordinates of the body parts based on information associated with the position and/or posture of the body parts in the 3D coordinates for the surrounding space of the HMD device 221 received from the HMD device 221 and identify the 3D coordinates of the wearable device 223 based on the information associated with the position of the wearable device 223. The electronic device 210 may generate a signal for setting the mode of the wearable device 223 based on the information about the identified 3D coordinates of the wearable device 223 and/or rotation angle and/or the 3D coordinates of the body parts. Examples of the operation of generating a signal by the electronic device 210 are described below.

According to various embodiments, the electronic device 210 may generate a signal associated with setting the active mode 800*b* of the wearable device 223 (e.g., a smart watch) depending on the result of determining whether the user V1 has an intent to activate the wearable device 223 (or an intent to use the wearable device 223 (e.g., a smart watch)). The signal may include a specific value (e.g., a value indicating no or yes) (or specific information) of a parameter (e.g., checkglance) indicating the result of determination. The operation of setting the specific value of the parameter (e.g., checkglance) including a first signal by the electronic device 210 is described below in detail with reference to FIG. 15. Upon determining that the user V1 has the intent, the electronic device 210 may generate a first signal (e.g., checkglance=Yes as described below) for setting to the active mode 800*b*. For example, the electronic device 210 may determine whether the gaze of the user V1 is detected on the wearable device 223 and, if the gaze is detected, generate the first signal for setting the active mode 800*b*. As at least part of the operation of determining whether the gaze of the user V1 is detected on the wearable device 223, the electronic device 210 may determine whether in the same coordinate system (e.g., in the 3D coordinate system), the coordinate value indicating the position of the gaze of the user V1 corresponds to the coordinate value indicating the position of the wearable device 223 (e.g., a smart watch). As another example, the electronic device 210 may determine whether the distance between the wearable device 223 and the electronic device 210 is within a designated distance and, if within the designated distance, generate a first signal for setting the active mode 800*b*. As at least part of the operation of identifying the distance between the wearable device 223 and the electronic device 210, the electronic device 210 may identify the distance from the wearable device 223 using a sensor (e.g., an angle-of-arrival (AOA) communication circuit 910) for measuring the distance from the wearable device 223.

According to various embodiments, the electronic device 210 may generate a signal associated with setting the controller mode 800*c* of the wearable device 223 (e.g., a smart watch) depending on the result of determining whether the user V1 has an intent to control immersive content (e.g., extended reality technology-based content) using the wearable device 223 (e.g., a smart watch) based on the plurality of information. The signal may include a specific value (e.g., a value indicating no, stay, or yes) (or specific information) of a parameter (e.g., checkcontroller) indicating the result of determination. The operation of setting the specific value of the parameter (e.g., checkcontroller) including a signal by the electronic device 210 is described below in detail with reference to FIG. 15. Upon determining that the user V1 has the intent, the electronic device 210 may generate a second signal (e.g., checkglance=Yes as described below) for setting the mode of the wearable device 223 to the controller mode 800*c*. In an embodiment, the electronic device 210 may generate the second signal based on the positions of the hands h1 and h2 of the user V1. For example, when the probability that the hands h1 and h2 enter the specific area is larger than a threshold, the electronic device 210 may generate a second signal for setting the mode of the wearable device 223 to the controller mode 800*c*. The specific area may be preset as a partial area in which the user V1 is expected to control immersive content using the wearable device 223 (or optimal area for control) among the plurality of areas (e.g., S1 and S2 described above) of the user V1, but is not limited thereto. The specific area is further described below with reference to FIGS. 19 and 20. As at least part of the operation of identifying the probability that the hands h1 and h2 are to move to (or enter) the specific area, the electronic device 210 may identify the probability corresponding to the rotation angle of the head H and the 3D positions of the hands h1 and h2 in the 3D coordinate system from information about the probabilities to be moved to the specific area, as pre-stored. The operation of identifying the probability by the electronic device 210 is described below in connection with FIGS. 19 and 20. For example, when the hands h1 and h2 are positioned in the specific area, the electronic device 210 may generate a second signal for setting the mode of the wearable device 223 to the controller mode 800*c*. As at least part of the operation of determining whether the hands h1 and h2 are positioned in the specific area, the electronic device 210 may perform the operation of comparing the 3D coordinates of the specific area with the 3D coordinates of each of the hands h1 and h2. According to an embodiment, upon detecting a designated gesture associated with the body part (e.g., arm or hand) wearing the wearable device 223 of the user V1, the electronic device 210 may generate a second signal for setting the mode of the wearable device 223 to the controller mode 800*c*.

According to various embodiments, in operation 1015, the wearable device 223 may determine (or set) the mode corresponding to the received signal in operation 1015. According to various embodiments, when an input is received by the wearable device 223, the wearable device 223 may obtain a control signal using the sensor in operation 1017. According to various embodiments, in operation 1019, the wearable device 223 may transmit the control signal to the electronic device 210. For example, as shown in FIG. 12A, upon receiving a first signal 1211 (e.g., a signal including checkglance=Yes), the wearable device 223 may set the mode of the wearable device 223 to the active mode 800*b* or, as shown in FIG. 12B, upon receiving a second signal 1221 (e.g., a signal including checkcontroller=Yes), set the mode of the wearable device 223 to the controller mode 800*c*. In this case, as is described below with reference to FIG. 15, the second signal 1221 may include a specific value (e.g., checkglance=No) for another parameter, as well as the specific value (e.g., checkcontroller=Yes) for the specific parameter. For example, if the specific value (e.g., checkglance=No) for another parameter is included, the wearable device 223 may change the mode of the wearable device 223 from the active mode 800*b* to the controller mode 800*c* according to the specific value (e.g., checkcontroller=Yes) for the specific parameter. Without limited to those described, as described above, the wearable device 223 may set the mode of the wearable device 223 based on a gesture or input identified from the wearable device 223, not the signal 1211 or 1221 received from the electronic device 210. With the mode set, the wearable device 223 may identify the input of the user V1. For example, the wearable device 223 may identify the input of the user V1 (e.g., an input of pushing the key of FIG. 11B (push), an input of rotating the wheel key (rotation), or an input of touching on the touchscreen (touch)) received using the above-described key input device 810 (e.g., the key button, wheel key, or touchscreen), using the sensor 830, and a duplicate description thereof may not be given below. According to an embodiment, as shown in FIG. 12A, if an input of the user V1 is identified in a state in which the mode of the wearable device 223 is the active mode 800*b*, the wearable device 223 may perform a control operation corresponding to the user's input (e.g., an input of pushing the key of FIG. 11B (push), an input of rotating the wheel key (rotation), or an input of touching on the touchscreen (touch)). As an example, if the home key among the key input devices 810 is pressed by the user V1 in a state in which the mode of the wearable device 223 is the active mode 800*b*, the wearable device 223 may display a home screen on the display (e.g., the display 820) and refrain from transmitting a signal indicating that the home key is pressed to the electronic device 210. Further, in an embodiment, as shown in 1202 of FIG. 12, upon identifying an input of the user V1 in a state in which the mode of the wearable device 223 is the controller mode 800*c*, the wearable device 223 may transmit a signal (e.g., a control signal 1223) for controlling immersive content to the electronic device 210 (e.g., a smartphone). As an example, if the home key among the key input devices 810 is pressed by the user V1 in a state in which the mode of the wearable device 223 is the controller mode 800*c*, the wearable device 223 may refrain from displaying the home screen on the display and transmit a control signal 1223 including information indicating that the home key is pressed to the electronic device 210.

According to various embodiments, in operation 1021, the electronic device 210 may generate an image including at least one graphic object based on the control signal.

According to various embodiments, in operation 1023, the electronic device 210 may transmit the generated image to the HMD device 221. For example, the electronic device 210 may generate an image corresponding to the information included in the control signal 1223 and transmit the generated image to the HMD device 221. The electronic device 210 may associate each information for the input of the user V1 received by the wearable device 223 with a specific function and previously store them and perform a specific function based on comparison between the information about the input of the user V1 included in the received signal and pre-stored information. The specific function may include a function of invoking a specific screen and a function of controlling the screen being currently displayed (e.g., a function of controlling the displayed graphic object or a function of switching in the screen). According to an embodiment, the electronic device 210 may generate an image by rendering the graphic object (1110 of FIG. 11B) based on the control signal 1223 and transmit the generated image to the HMD device 221. For example, if the information included in the control signal 1223 is information indicating that the home button is pressed, the electronic device 210 may identify a function of invoking an app tray corresponding to the information indicating that the home button is pressed, generate an image by rendering the app tray, and transmit the image including the app tray to the HMD device 221. Further, in an embodiment, the electronic device 210 may control (e.g., move, change, or select) at least one graphic object (e.g., 1120 of FIG. 11B) included in the image displayed (or rendered) through the HMD device 221 based on the control signal 1223, generate an image reflecting the result of control (or rendered for the controlled graphic object), and transmit the generated image to the HMD device 221. For example, if the information included in the control signal 1223 is information indicating that the wheel key is rotated, the electronic device 210 may identify a function of moving the selected object corresponding to the information indicating that the wheel key is rotated, generate an image by rendering at least one object in the changed position, and transmit the at least one position-changed object image to the HMD device 221. The object may move right in proportion to the distance of the clockwise rotation of the wheel key, and the object may move left in proportion to the distance of the counterclockwise rotation of the wheel key, but is not limited thereto.

An example of an operation of an electronic device 210 is described below according to various embodiments. Since at least some of the above-described operations of the devices (e.g., the operations of the flowchart 1000 of FIG. 10) may be performed in combination with the operations described below, and thus, a duplicate description may not be provided.

According to various embodiments, the electronic device 210 may transmit a signal for setting the mode of the wearable device 223 to the wearable device 223 based on information associated with the body part (e.g., the positions of the hands h1 and h2 and/or the rotation angle of the head H (e.g., the rotation angle in the pitch direction). Upon receiving a first signal (e.g., the control signal 1223 described in connection with operation 1019 of FIG. 10 and FIG. 12B) from the wearable device 223 based on setting the mode of the wearable device 223 to the controller mode 800*c*, the electronic device 210 may generate an image associated with the first signal (e.g., the control signal 1223 described in connection with operation 1019 of FIG. 10 and FIG. 12B) and transmit the generated image to the HMD device 221.

FIG. 13 is a flowchart 1300 illustrating an example operation of an electronic device 210 according to various embodiments. According to various embodiments, the operations shown in FIG. 13 are not limited to the shown order but may rather be performed in other various orders. According to various embodiments, more or less operations than those of FIG. 13 may be performed.

According to various embodiments, in operation 1301, the electronic device 210 may establish a communication connection with the head-mounted display device 221 and the wearable device 223 through the communication circuit 910. For example, after the wearable device 223 and HMD device 221 are worn by the user V1 and turned on, the electronic device 210 may establish a communication connection with the wearable device 223 and HMD device 221 using a short-range wireless communication scheme, such as Wi-Fi, Bluetooth, or BLE. Operation 1301 of the electronic device 210 may be performed like operations 1001 and 1003 of the electronic device 210 as described above, and a duplicate description thereof may not be given below.

According to various embodiments, in operation 1303, the electronic device 210 may receive information associated with at least one specific body part of the user V1 from the head-mounted display device 221. For example, as described above, the electronic device 210 may receive, from the HMD device 221, at least one of information about the 3D coordinates for the surrounding space of the HMD device 221, information about the 3D coordinate of the HMD device 221 in the surrounding space, information associated with the position and/or posture of the body parts (e.g., the positions of the hands h1 and h2, the rotation angle of the head H, or the direction of the gaze), or information associated with the position of the wearable device 223). Operation 1303 of the electronic device 210 may be performed like the operation of receiving information by the electronic device 210 as described in connection with operation 1009 of the HMD device 221, and a duplicate description thereof may not be given below.

According to various embodiments, in operation 1305, if a first signal is received from the wearable device 223 through the communication circuit 910, the electronic device 210 may transmit an image including a 3D graphic object associated with the first signal to the head-mounted display device 221 based on information associated with the at least one specific body part. The electronic device 210 may receive the first signal (e.g., the control signal 1223 described in connection with operation 1019 of FIG. 10 and FIG. 12B) from the wearable device 223 based on setting the wearable device 223 to the controller mode 800c and transmit immersive content corresponding to the received first signal to the head-mounted display device 221. The electronic device 210 may identify information (e.g., the coordinates of the hands h1 and h2 and/or the rotation angle of the head H) about the body part associated with the same coordinate system (e.g., the 3D coordinate system for the surrounding space of the HMD device 221) (or in the same coordinate system) and transmit, to the wearable device 223, a signal for setting the mode of the wearable device 223 to the controller mode 800c based on the identified body part position-related information (e.g., the coordinates of the hands h1 and h2 and/or rotation angle of the head H). As an example, as described above, if the probability that the hands h1 and h2 are to be positioned in a specific area, calculated based on the coordinates of the hands h1 and h2 and/or the rotation angle of the head H, is larger than a threshold, the electronic device 210 may generate a signal (e.g., a signal including controllercheck=Yes) for setting the mode of the wearable device 223 to the controller mode 800c and transmit the generated signal to the wearable device 223. Upon receiving an input of the user V1 by the wearable device 223 after the electronic device 210 sets the wearable device 223 to the controller mode 800c based on the signal, the wearable device 223 may transmit, to the electronic device 210, a first signal (e.g., the control signal 1223 described in connection with operation 1019 of FIG. 10 and FIG. 12B) corresponding to the input of the user V1 to the electronic device 210. The electronic device 210 may generate an image based on the information included in the received first signal (e.g., the control signal 1223 described in connection with operation 1019 of FIG. 10 and FIG. 12B) and transmit the generated image to the HMD device 221. Operation 1305 of the electronic device 210 may be performed like operations 1011, 1013, and 1021 of the electronic device 210 as described above, and a duplicate description thereof may not be given below.

An example of an operation of an electronic device 210 is described below according to various embodiments. Since at least some of the above-described operations of the devices (e.g., the operations of the flowchart 1000 of FIG. 10 and the operations of the flowchart 1300 of FIG. 13) may be performed in combination with the operations described below, and thus, a duplicate description may not be provided.

According to various embodiments, the electronic device 210 may set values (or information) of parameters (e.g., checkglance or checkcontroller) for setting the mode of the wearable device 223 based on information associated with the body part (e.g., the positions of the hands h1 and h2 and/or the rotation angle of the head H (e.g., the rotation angle in the pitch direction) and transmit a signal including the set values of parameters to the wearable device 223. The wearable device 223 may set the mode of the wearable device 223 to the mode (e.g., the active mode 800b or controller mode 800c) corresponding to the values of the parameters included in the signal.

Figure 14:
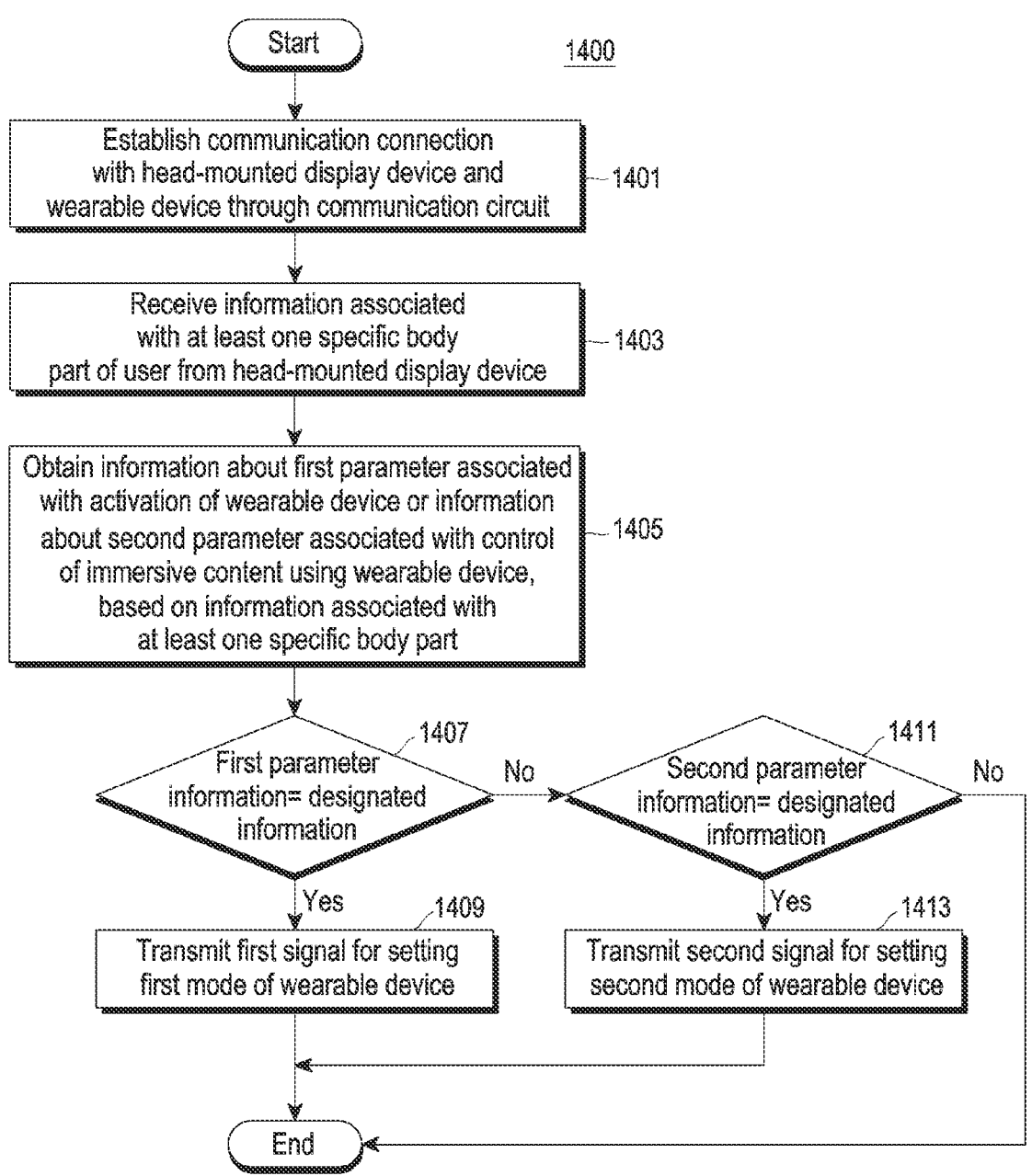
FIG. 14 is a flowchart illustrating an example operation of an electronic device according to various embodiments.

FIG. 14 is a flowchart 1400 illustrating an example operation of an electronic device 210 according to various embodiments. According to various embodiments, the operations shown in FIG. 14 are not limited to the shown order but may rather be performed in other various orders. According to various embodiments, more or less operations than those of FIG. 14 may be performed. FIG. 14 is described below with reference to FIGS. 15, 16A and 16B, and 17A and 17B.

Figure 15:
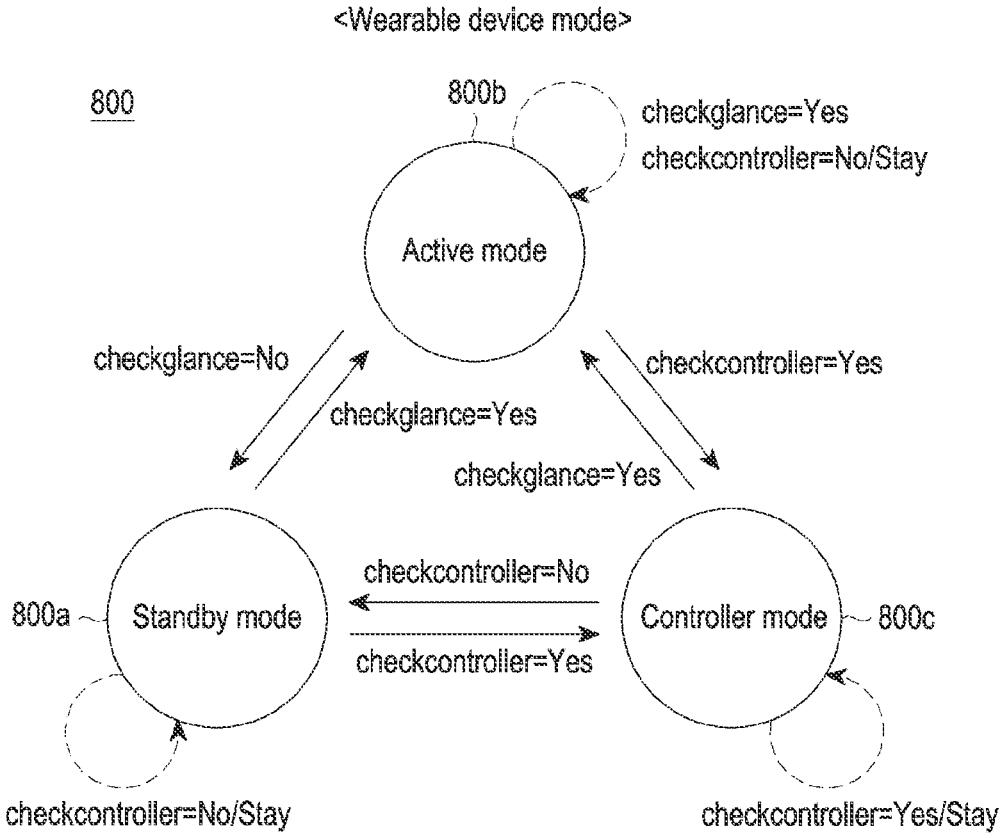
FIG. 15 is a diagram illustrating an example of a parameter value for setting a mode of a wearable device according to various embodiments.
Figure 16A:
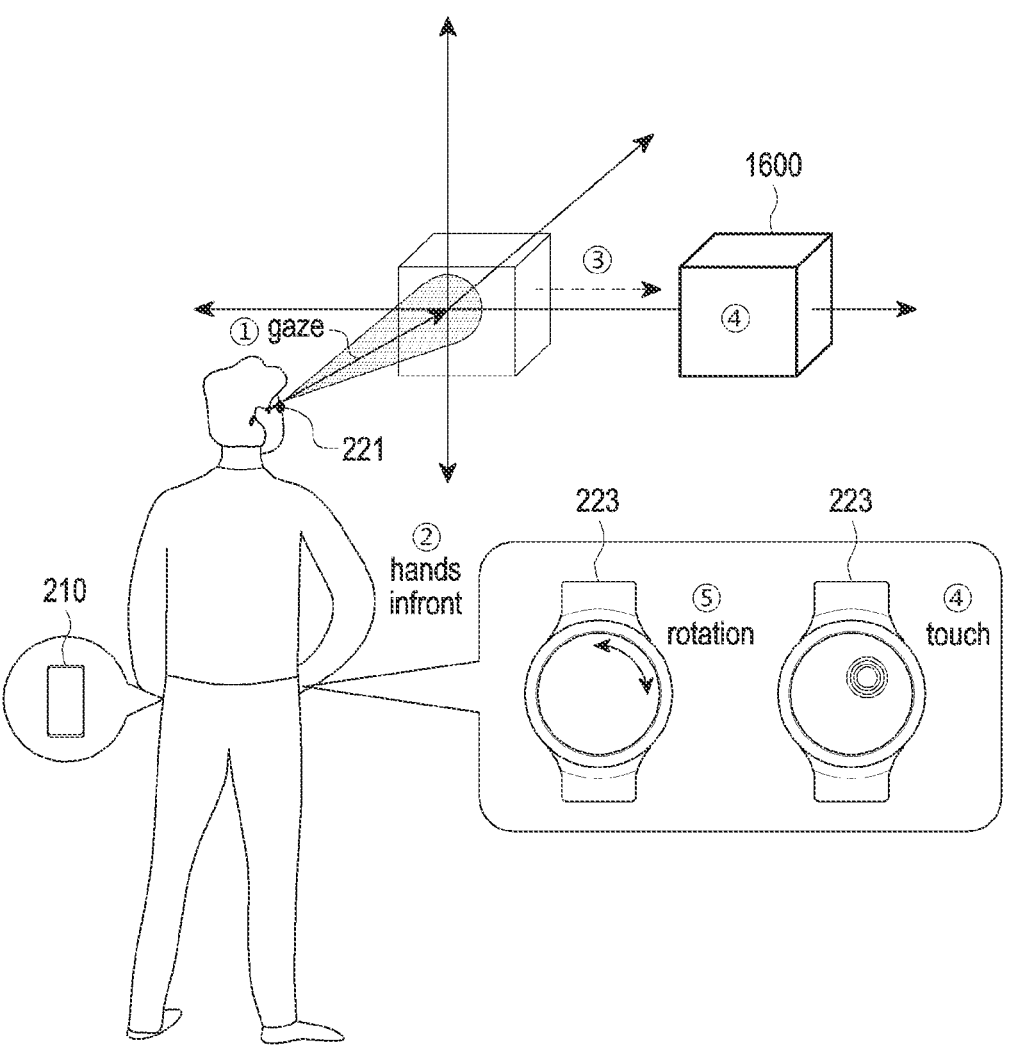
FIG. 16A is a diagram illustrating an example operation for moving an object displayed through an HMD device based on a control signal received from a wearable device by an electronic device according to various embodiments.
Figure 16B:
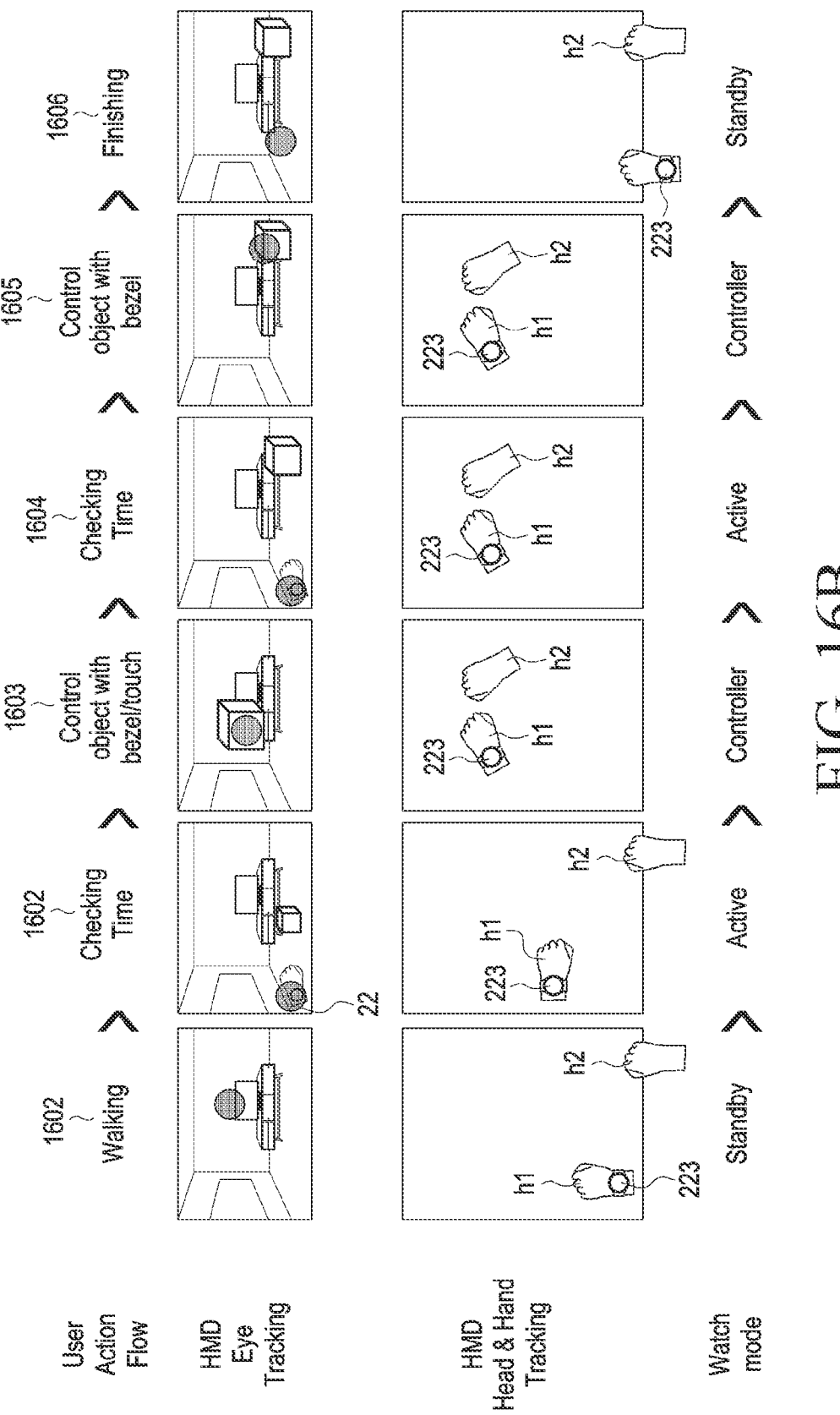
FIG. 16B is a diagram illustrating operations for moving an object to be displayed through an HMD device and a mode of a wearable device for each operation according to various embodiments.
Figure 17A:
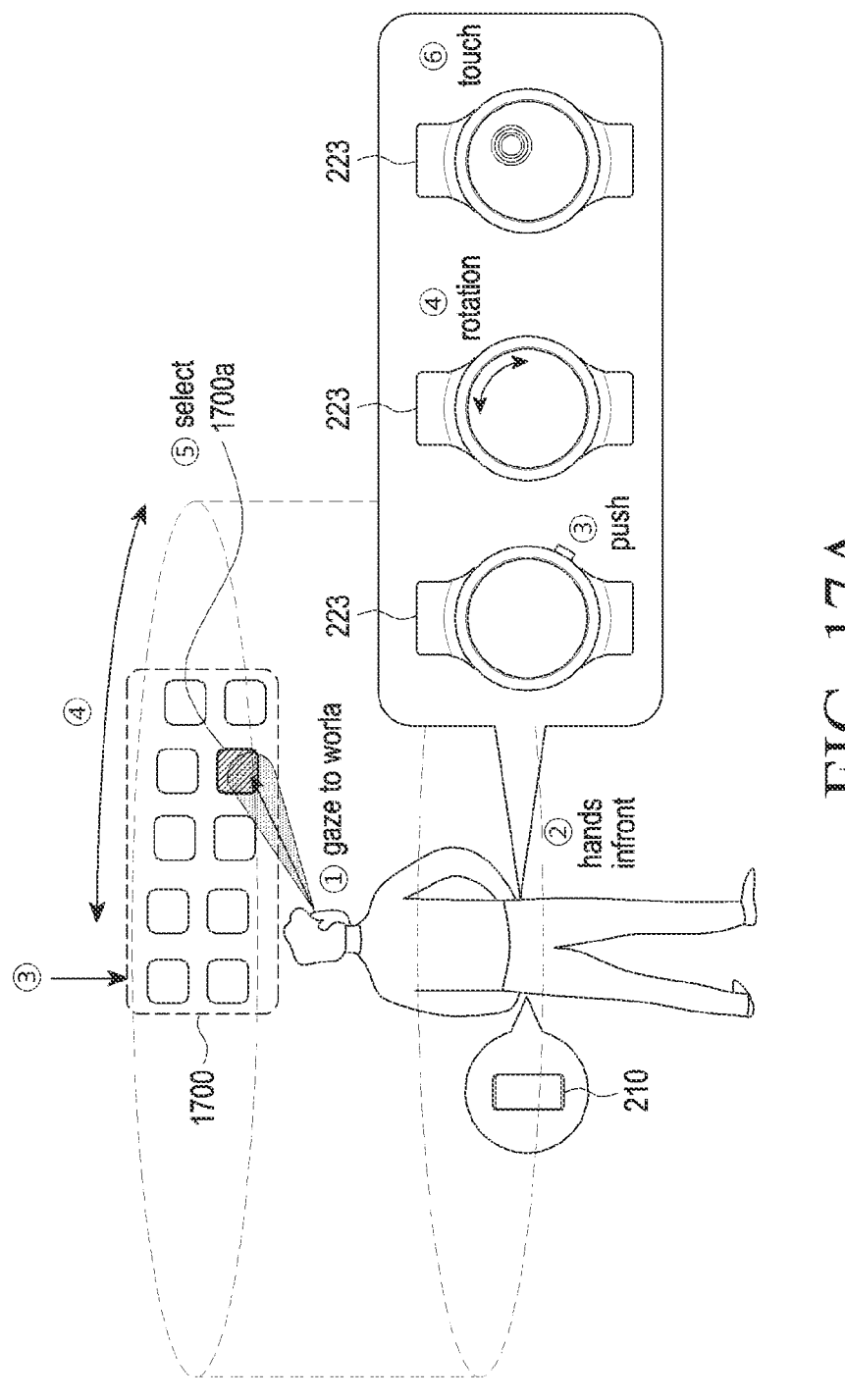
FIG. 17A is a diagram illustrating an example operation for displaying a specific screen through an HMD device based on a control signal received from a wearable device by an electronic device according to various embodiments.
Figure 17B:
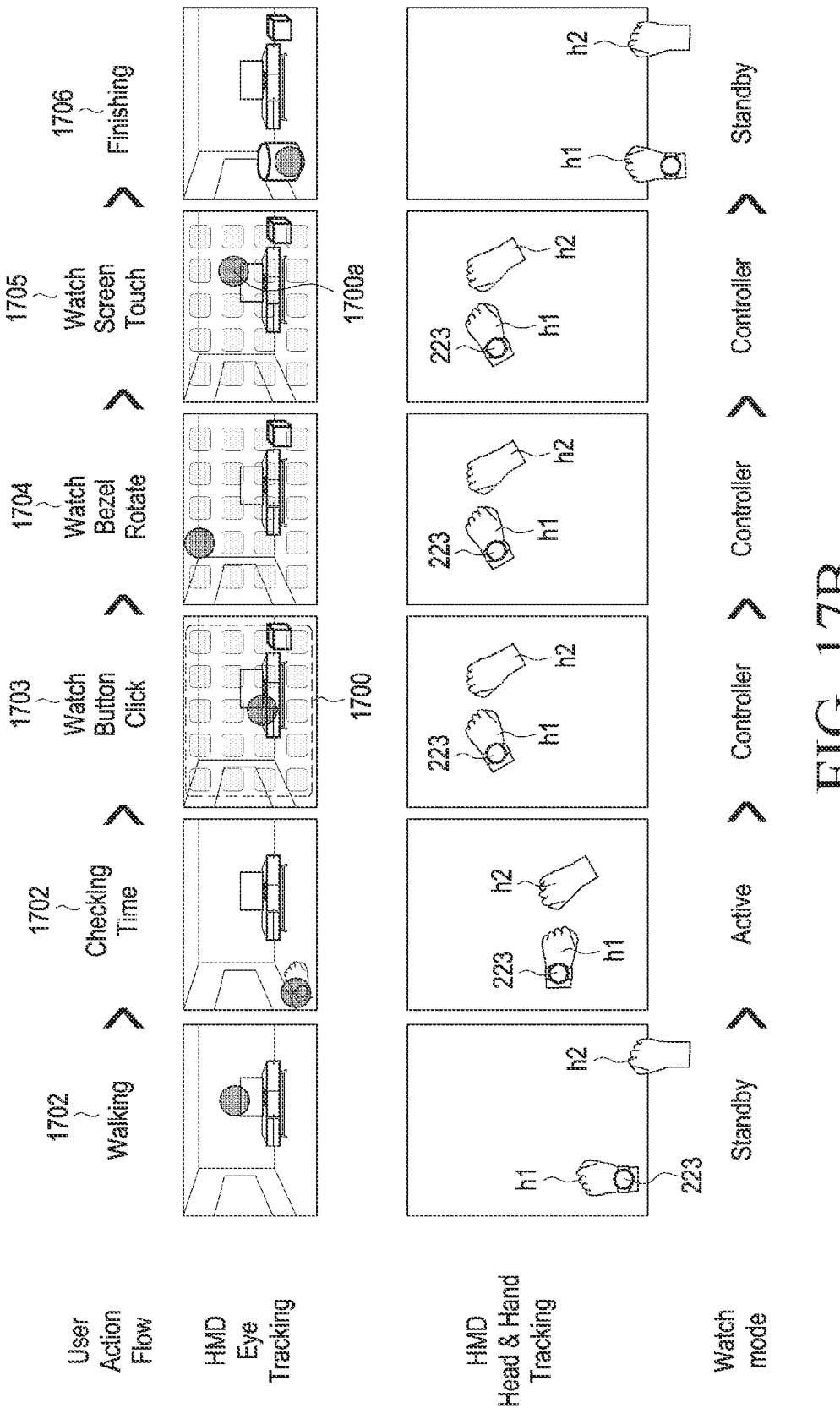
FIG. 17B is a diagram, illustrating operations for displaying a specific screen through an HMD device and a mode of a wearable device for each operation according to various embodiments.

FIG. 15 is a diagram illustrating an example of a parameter value for setting a mode of a wearable device 223 according to various embodiments. FIG. 16A is a diagram illustrating an example operation for moving an object displayed through an HMD device 221 based on a control signal received from a wearable device 223 by an electronic device 210 according to various embodiments. FIG. 16B is a diagram illustrating example operations for moving an object to be displayed through an HMD device 221 and a mode of a wearable device 223 for each operation according to various embodiments. FIG. 17A is a diagram illustrating an example operation for displaying a specific screen through an HMD device 221 based on a control signal received from a wearable device 223 by an electronic device 210 according to various embodiments. FIG. 17B is a diagram illustrating example operations for displaying a specific screen through an HMD device 221 and a mode of a wearable device 223 for each operation according to various embodiments.

According to various embodiments, in operation 1401, the electronic device 210 may establish a communication connection with the head-mounted display device 221 and the wearable device 223 through the communication circuit 910 and, in operation 1403, receive information associated with at least one specific body part of the user from the head-mounted display device 221. For example, after the wearable device 223 and HMD device 221 are worn by the user and turned on, the electronic device 210 may establish a communication connection with the wearable device 223 and HMD device 221 using a short-range wireless communication scheme, such as Wi-Fi, Bluetooth, or BLE. As described above, based on the communication connection, the electronic device 210 may receive, from the HMD device 221, at least one of information about the 3D coordinates for the surrounding space of the HMD device 221, information about 3D coordinates of the HMD device 221 in the surrounding space, information associated with the position and/or posture of body parts (e.g., the positions of the hands h1 and h2, the rotation angle of the head H, and/or the direction of the gaze), or information associated with the position of the wearable device 223. Operation 1401 of the electronic device 210 may be performed like operations 1001 and 1003 of the electronic device 210 as described above, and operation 1403 of the electronic device 210 may be performed like the operation of receiving information by the electronic device 210 as described in connection with operation 1009 of the HMD device 221, and a duplicate description thereof may not be given below.

According to various embodiments, in operation 1405, the electronic device 210 may obtain information (or value) about a first parameter associated with the intent to use the wearable device 223 or information (or value) about a second parameter associated with the intent to control immersive content using the wearable device 223, based on the information associated with the at least one specific body part. For example, the electronic device 210 may determine whether there is the intent to use the wearable device 223 (e.g., a smart watch) and/or the intent to control immersive content using the wearable device 223 (e.g., a smart watch) based on the received information associated with the at least one specific body part and determine the information (or value) about the first parameter (e.g., checkglance) and/or the second parameter (e.g., checkcontroller) based on the result of determination. The electronic device 210 may transmit a signal including at least one of the determined value of the first parameter (e.g., checkglance) or value of the second parameter (e.g., checkcontroller)) to the wearable device 223. The wearable device 223 may setting the mode of the wearable device 223 based on the value of the first parameter (e.g., checkglance) or the value of the second parameter (e.g., checkcontroller) included in the signal. Hereinafter, the operation of determining the values of the parameters of the electronic device 210 and examples of setting the mode of the wearable device 223 based on the determined values of parameters are described.

According to various embodiments, the electronic device 210 may determine the value of the first parameter (e.g., checkglance) depending on the result of determination of whether the user has the intent to activate the wearable device 223 (or intent to use the wearable device 223 (e.g., a smart watch)). Upon determining that the user has the intent, the electronic device 210 may set the value for the first parameter (e.g., checkglance) to a first value (e.g., a value indicating yes) or, upon determining that the user does not have the intent, set the value for the first parameter (e.g., checkglance) to a second value (e.g., a value indicating no).

For example, as at least part of the operation of determining the user's intent to use the wearable device 223, the electronic device 210 may determine whether the user's gaze is detected on the wearable device 223 and, if the gaze is detected, determine the first value (e.g., a value indicating yes), as the value of the first parameter (e.g., checkglance) and, if the gaze is not detected, determine the second value (e.g., a value indicating no) as the value of the first parameter (e.g., checkglance). Other operations for determining the user's intent to use the wearable device 223 by the electronic device 210 may be performed as described above, and a duplicate description thereof may not be given below.

According to various embodiments, the electronic device 210 may determine the value of the second parameter (e.g., checkcontroller) depending on the result of determining whether the user has an intent to control immersive content (e.g., extended reality technology-based content) using the wearable device 223 (e.g., a smart watch) based on the plurality of information. Upon determining that there is the intent to control immersive content, the electronic device 210 may set the value for the second parameter (e.g., checkcontroller) to the first value (e.g., a value indicating yes) or, upon determining that there is no intent to control immersive content, set the value for second parameter (e.g., checkcontroller) to the second value (e.g., a value indicating no). For example, as at least part of the operation of determining whether there is the intent to control immersive content, the electronic device 210 may determine whether the probability that the hands h1 and h2 are positioned in a specific area is larger than a threshold. For example, if the probability is larger than the threshold, the electronic device 210 may set the value for the second parameter (e.g., checkcontroller) to the first value (e.g., a value indicating yes) and, if the probability is smaller than the threshold, set the value for the second parameter to the second value (e.g., a value indicating no) or a third value (e.g., a value indicating stay). The operation of setting the value for the second parameter (e.g., checkcontroller) based on the probability is further described below with reference to FIGS. 19 and 20.

Hereinafter, an example of setting the mode of the wearable device 223 based on the value of at least one of the first parameter (e.g., checkglance) or the second parameter (e.g., checkcontroller) included in the signal transmitted to the wearable device 223 according to various embodiments is described with reference to FIG. 15.

According to various embodiments, the mode of the wearable device 223 may be set to the standby mode 800a based on the value of at least one of the first parameter (e.g., checkglance) or the second parameter (e.g., checkcontroller) included in the signal. For example, referring to FIG. 15, if the value of the first parameter (e.g., checkglance) included in the signal received by the wearable device 223 from the electronic device 210 is the second value (e.g., a value indicating no), and the value of the second parameter (e.g., checkcontroller) is the second value (e.g., a value indicating no) or the third value (e.g., a value indicating stay) in a state in which the mode of the wearable device 223 is the standby mode 800a, the mode of the wearable device 223 may remain in the standby mode 800a. As another example, referring to FIG. 15, if the value of the first parameter (e.g., checkglance) included in the signal received by the wearable device 223 from the electronic device 210 is the second value (e.g., a value indicating no), and the value of the second parameter (e.g., checkcontroller) is the second value (e.g., a value indicating no) in a state in which the mode of the wearable device 223 is the active mode 800b, the mode of the wearable device 223 may be changed from the active mode 800*b* to the standby mode 800*a*. As another example, referring to FIG. 15, if the value of the first parameter (e.g., checkglance) included in the signal received by the wearable device 223 from the electronic device 210 is the second value (e.g., a value indicating no), and the value of the second parameter (e.g., checkcontroller) is the second value (e.g., a value indicating no) in a state in which the mode of the wearable device 223 is the controller mode 800*c*, the mode of the wearable device 223 may be changed from the controller mode 800*c* to the standby mode 800*a*.

According to various embodiments, the mode of the wearable device 223 may be set to the active mode 800*b* based on the value of at least one of the first parameter (e.g., checkglance) or the second parameter (e.g., checkcontroller) included in the signal. As an example, referring to FIG. 15, if the value of the first parameter (e.g., checkglance) included in the signal received by the wearable device 223 from the electronic device 210 is the first value (e.g., a value indicating yes) in a state in which the mode of the wearable device 223 is the standby mode 800*a*, the mode of the wearable device 223 may be changed from the standby mode 800*a* to the active mode 800*b*. In this case, although not shown, the mode of the wearable device 223 may be changed from the standby mode 800*a* to the active mode 800*b* based on the value of the first parameter (e.g., checkglance) being the first value (e.g., a value indicating yes) regardless of the value of the second parameter (e.g., checkcontroller). As another example, referring to FIG. 15, in a state in which the mode of the wearable device 223 is the active mode 800*b*, if the value of the first parameter (e.g., checkglance) is the first value (e.g., a value indicating yes) regardless of the value of the second parameter (e.g., checkcontroller) included in the signal received by the wearable device 223 from the electronic device 210, or if the value of the first parameter (e.g., checkglance) is the second value (e.g., a value indicating no) but the value of the second parameter (e.g., checkcontroller) is the third value (e.g., a value indicating stay), the mode of the wearable device 223 may remain in the active mode 800*b*. As an example, referring to FIG. 15, if the value of the first parameter (e.g., checkglance) included in the signal received by the wearable device 223 from the electronic device 210 is the first value (e.g., a value indicating yes) in a state in which the mode of the wearable device 223 is the controller mode 800*c*, the mode of the wearable device 223 may be changed from the controller mode 800*c* to the active mode 800*b*. In this case, although not shown, the mode of the wearable device 223 may be changed from the controller mode 800*c* to the active mode 800*b* based on the value of the first parameter (e.g., checkglance) being the first value (e.g., a value indicating yes) regardless of the value of the second parameter (e.g., checkcontroller).

According to various embodiments, the mode of the wearable device 223 may be set to the controller mode 800*c* based on the value of at least one of the first parameter (e.g., checkglance) or the second parameter (e.g., checkcontroller) included in the signal. As an example, referring to FIG. 15, if the value of the first parameter (e.g., checkglance) included in the signal received by the wearable device 223 from the electronic device 210 is the second value (e.g., a value indicating no), and the value of the second parameter (e.g., checkcontroller) is the first value (e.g., a value indicating yes) in a state in which the mode of the wearable device 223 is the standby mode 800*a*, the mode of the wearable device 223 may be changed from the standby mode 800*a* to the controller mode 800*c*. As another example, referring to FIG. 15, if the value of the first parameter (e.g., checkglance) included in the signal received by the wearable device 223 from the electronic device 210 is the second value (e.g., a value indicating no), and the value of the second parameter (e.g., checkcontroller) is the first value (e.g., a value indicating yes) in a state in which the mode of the wearable device 223 is the active mode 800*b*, the mode of the wearable device 223 may be changed from the active mode 800*b* to the controller mode 800*c*. As another example, referring to FIG. 15, if the value of the first parameter (e.g., checkglance) included in the signal received by the wearable device 223 from the electronic device 210 is the second value (e.g., a value indicating no), and the value of the second parameter (e.g., checkcontroller) is the first value (e.g., a value indicating yes) or the third value (e.g., a value indicating stay) in a state in which the mode of the wearable device 223 is the controller mode 800*c*, the mode of the wearable device 223 may remain in the controller mode 800*c*.

According to various embodiments, in operation 1407 and/or operation 1411, the electronic device 210 may transmit a signal including information (or value) about the first parameter and/or information (or value) about the second parameter and, in operation 1409 and/or operation 1413, perform at least one operation based on the transmission of the signal. For example, the electronic device 210 may transmit, to the wearable device 223, a signal including the value (e.g., a value indicating yes, stay, or no) for the first parameter (e.g., checkglance) and/or value (e.g., a value indicating yes, stay, or no) for the second parameter (e.g., checkcontroller). According to an embodiment, the at least one operation may include the operation of controlling immersive content to be displayed through the HMD device 221. For example, the electronic device 210 may receive a control signal from the wearable device 223 based on the transmission of the signal, or generate an image by moving at least one object being displayed through the HMD based on the control signal as shown in FIGS. 16A and 16B, or generate an image including at least one image and transmit the generated image to the HMD device 221 as shown in FIGS. 17A and 17B. Each example is described below.

According to various embodiments, based on transmission of a signal including information (or value) about the first parameter and/or information (or value) about the second parameter, the electronic device 210 may receive a control signal from the wearable device 223 and control (e.g., move, transform, or select) the object 1600 to be displayed through the HMD device 221 based on the received control signal. For example, as shown in 1601 and 1602 of FIGS. 16A and 16B, the electronic device 210 may generate an image including the graphic object 1600 by rendering at least one graphic object 1600 at specific coordinates and transmit the generated image to the HMD device 221. The HMD device 221 may provide (e.g., display) the at least one object 1600 to the user. In this case, as shown in 1602 of FIG. 16B, the user may gaze at the wearable device 223 with her specific hand h1 wearing the wearable device 223 stretched forward. The electronic device 210 may identify that the position (e.g., 3D coordinates) of the wearable device 223 corresponds to the position (e.g., 3D vector) of the user's gaze based on information received from the HMD device 221 and transmit a signal including the first value (e.g., a value indicating yes) for the first parameter (e.g., checkglance) to the wearable device 223. Based on reception of the signal, the wearable device 223 may set the mode of the wearable device 223 from the standby mode 800*a* to the active mode 800*b*. In this case, although, after the mode of the wearable device 223 is set to the active mode 800*b*, the user's gaze is moved so that the position (e.g., 3D coordinates) of the wearable device 223 does not correspond to the position (e.g., 3D vector) of the user's gaze, and thus, the value of the first parameter (e.g., checkglance), included in the signal received by the wearable device 223, is the second value (e.g., a value indicating no), if the value of the second parameter (e.g., checkcontroller) is the third value (e.g., a value indicating stay), the mode of the wearable device 223 may remain in the active mode 800*b*. Thereafter, as shown in ① of FIG. 16A and 1603 of FIG. 16B, if the user gazes at at least one object, the electronic device 210 may identify that the position (e.g., 3D coordinates) of the object corresponds to the position (e.g., 3D vector) of the user's gaze based on the information received from the HMD device 221 and select an object based on the identification. As shown in ② of FIG. 16A and 1603 of FIG. 16B, after selecting the object, the electronic device 210 may determine that the probability that the position (e.g., 3D coordinates) of the wearable device 223 does not correspond to the position (e.g., 3D vector) of the user's gaze, and the positions of the hands h1 and h2 are to be positioned in the specific area is larger than the threshold based on the information received from the HMD device 221, the electronic device 210 may transmit, to the wearable device 223, a signal including the second value (e.g., a value indicating no) for the first parameter (e.g., checkglance) and the first value (e.g., a value indicating yes) for the second parameter (e.g., checkcontroller). Based on reception of the signal, the wearable device 223 may set the mode of the wearable device 223 from the active mode 800*b* to the controller mode 800*c*. Meanwhile, as shown in 1604 of FIG. 16B, if the user gazes back at the wearable device 223, the electronic device 210 may transmit a signal including the first value (e.g., a value indicating yes) for the first parameter (e.g., checkglance) to the wearable device 223. In this case, the mode of the wearable device 223 may be changed from the controller mode 800*c* back to the active mode 800*b*. As shown in ③ and ④ of FIG. 16A and 1605 of FIG. 16B, if an input (e.g., rotation of the wheel key or touch on the touchscreen) is received by the wearable device 223 in a state in which the mode of the wearable device 223 is the active mode 800*b*, the electronic device 210 may receive a control signal including information corresponding to the input from the wearable device 223. Accordingly, the electronic device 210 may move the selected object 1600 by the distance corresponding to the wheel key rotation and render it to thereby generate an image, and fix the position of the moved object 1600 based on a touch on the touchscreen. As shown in 1606 of FIG. 16B, if the hands h1 and h2 are moved backward, the electronic device 210 may determine that the probability that the hands h1 and h2 are to be positioned in the specific area is smaller than the threshold based on information received from the HMD device 221 and transmit, to the wearable device 223, a signal including the second value (e.g., a value indicating no) for the second parameter (e.g., checkcontroller). Thus, the mode of the wearable device 223 may be set from the controller mode 800*c* to the standby mode 800*a*.

According to various embodiments, based on transmission of a signal including information (or value) about the first parameter and/or information (or value) about the second parameter, the electronic device 210 may receive a control signal from the wearable device 223 and generate an image including the specific object 1700 to be displayed through the HMD device 221 based on the received control signal. For example, as shown in ① of FIG. 17A and 1701 of FIG. 17B, the electronic device 210 may generate no image to be displayed through the HMD device 221. Accordingly, the HMD device 221 may not display an image either. However, without limited to those described and/or shown, as described above in connection with FIGS. 16A and 16B, the electronic device 210 may generate an image including a graphic object by rendering at least one graphic object at specific coordinates and transmit the generated image to the HMD device 221. In this case, as shown in ② of FIG. 17A and 1702 of FIG. 17B, the user may gaze at the wearable device 223 with her hand h1 wearing the wearable device 223 stretched forward. The electronic device 210 may identify that the position (e.g., 3D coordinates) of the wearable device 223 corresponds to the position (e.g., 3D vector) of the user's gaze based on information received from the HMD device 221 and transmit a signal including the first value (e.g., a value indicating yes) for the first parameter (e.g., checkglance) to the wearable device 223. Based on reception of the signal, the wearable device 223 may set the mode of the wearable device 223 from the standby mode 800*a* to the active mode 800*b*. Thereafter, as shown in 1703 of FIG. 17B, the electronic device 210 may determine that the probability that the hands h1 and h2 are to be positioned in the specific area is larger than the threshold based on information received from the HMD device 221 and transmit, to the wearable device 223, a signal including the first value (e.g., a value indicating yes) for the second parameter (e.g., checkcontroller). Based on reception of the signal, the wearable device 223 may set the mode of the wearable device 223 from the active mode 800*b* to the controller mode 800*c*. As shown in ③ to ⑤ of FIG. 17A and 1703 to 1705 of FIG. 17B, if an input (e.g., key input, rotation of the wheel key or touch on the touchscreen) is received by the wearable device 223 in a state in which the mode of the wearable device 223 is the active mode 800*b*, the electronic device 210 may receive a control signal including information corresponding to the input from the wearable device 223. Accordingly, the electronic device 210 may obtain an image including objects (or icons for executing applications) 1700 (e.g., an app tray) corresponding to the key input and transmit part of the obtained image to the HMD device 221. The HMD device 221 may provide (e.g., display) the image including the objects as shown in FIGS. 1703 to 1705 of FIGS. 17A and 17B. The electronic device 210 may obtain the other part of the image to be transmitted to the HMD device 221 based on a wheel key rotation and transmit the obtained image part to the HMD device 221. Accordingly, as shown in ④ of FIG. 17A and 1704 of FIG. 17B, the HMD device 221 may switch the image including the app tray and provide it. As illustrated in ⑤ of FIG. 17A, the electronic device 210 may select a specific object 1700*a* corresponding to the user's gaze from among the objects 1700 being displayed and may execute an application corresponding to the selected object 1700*a* (or icon) based on a touch on the touchscreen as shown in ⑥ of FIG. 17A and 1705 of FIG. 17B, obtain the screen of the executed application, render the obtained screen, and transmit it to the HMD device 221. As shown in 1706 of FIG. 17B, if the hands h1 and h2 are moved backward, the electronic device 210 may determine that the probability that the hands h1 and h2 are to be positioned in the specific area is smaller than the threshold based on information received from the HMD device 221 and transmit, to the wearable device 223, a signal including the second value (e.g., a value indicating no) for the second parameter (e.g., checkcontroller). Thus, the mode of the wearable device 223 may be set from the controller mode 800*c* to the standby mode 800*a*.

Meanwhile, without limited to those described, when the mode of the wearable device 223 is set to the standby mode 800a or controller mode 800c based on the value included in the parameter in the signal transmitted to the wearable device 223, the at least one operation may not be performed.

An example of an operation of an electronic device 210 is described below according to various embodiments. Since at least some of the above-described operations of the devices (e.g., the operations of the flowchart 1000 of FIG. 10, the operations of the flowchart 1300 of FIG. 13, and the operations of the flowchart 1400 of FIG. 14) may be performed in combination with the operations described below, and thus, a duplicate description may not be provided.

According to various embodiments, as at least part of the operation of determining the intent to control immersive content using the wearable device 223, the electronic device 210 may recognize a gesture using one hand and, if no gesture using one hand is recognized, determine that the user has the intent to control immersive content using the wearable device 223 based on the positions of the hands h1 and h2.

Figure 18:
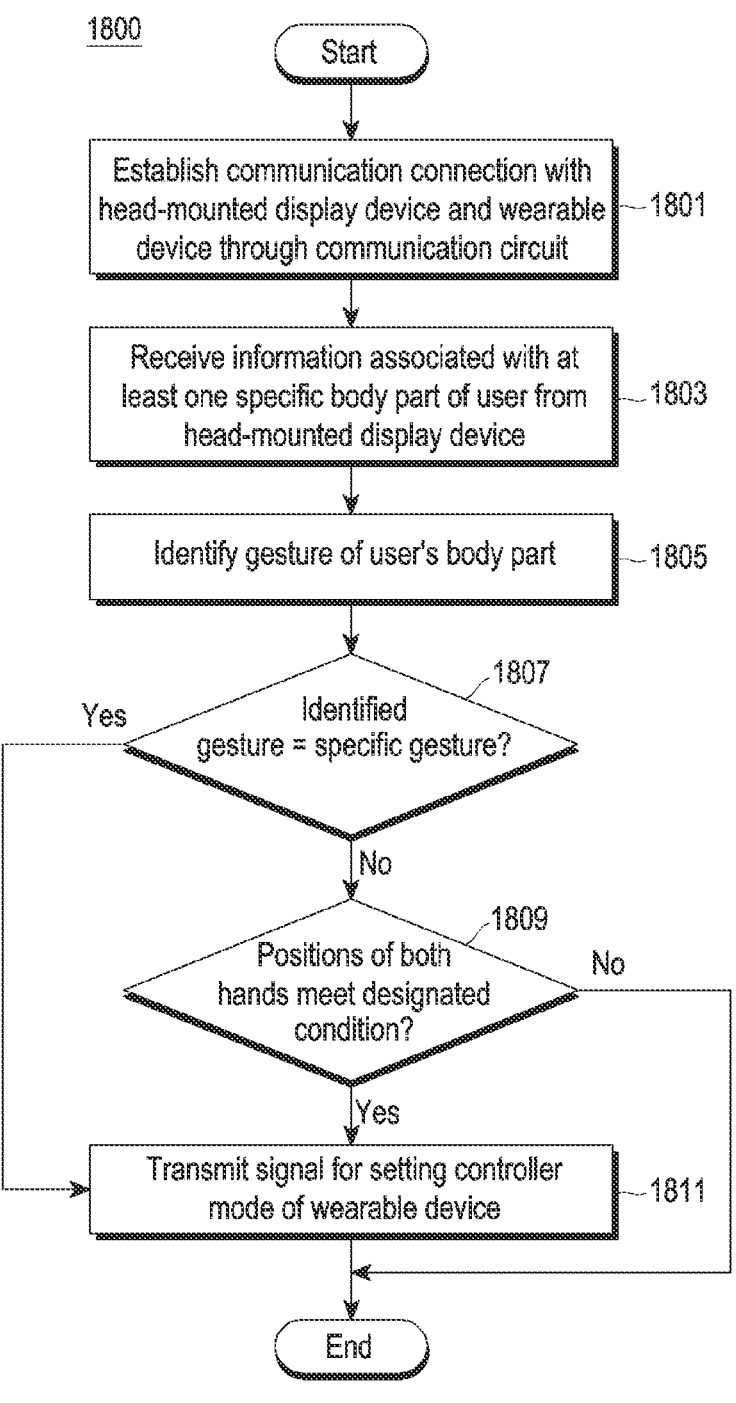
FIG. 18 is a flowchart illustrating an example operation of an electronic device according to various embodiments.

FIG. 18 is a flowchart 1800 illustrating an example operation of an electronic device 210 according to various embodiments. According to various embodiments, the operations shown in FIG. 18 are not limited to the shown order but may rather be performed in other various orders. According to various embodiments, more or less operations than those of FIG. 18 may be performed.

According to various embodiments, in operation 1801, the electronic device 210 may establish a communication connection with the head-mounted display device 221 and the wearable device 223 through the communication circuit 910 and, in operation 1803, receive information associated with at least one specific body part of the user from the head-mounted display device 221. For example, after the wearable device 223 and HMD device 221 are worn by the user and turned on, the electronic device 210 may establish a communication connection with the wearable device 223 and HMD device 221 using a short-range wireless communication scheme, such as Wi-Fi, Bluetooth, or BLE. As described above, based on the communication connection, the electronic device 210 may receive, from the HMD device 221, at least one of information about the 3D coordinates for the surrounding space of the HMD device 221, information about 3D coordinates of the HMD device 221 in the surrounding space, information associated with the position and/or posture of body parts (e.g., the positions of the hands h1 and h2, the rotation angle of the head H, and/or the direction of the gaze), or information associated with the position of the wearable device 223. Operation 1801 of the electronic device 210 may be performed like operations 1001 and 1003 of the electronic device 210 as described above, and operation 1803 of the electronic device 210 may be performed like the operation of receiving information by the electronic device 210 as described in connection with operation 1009 of the HMD device 221, and a duplicate description thereof may not be given below.

According to various embodiments, in operation 1805, the electronic device 210 may recognize a gesture of the user's body part. According to various embodiments, in operation 1807, the electronic device 210 may determine whether the identified gesture is a specific gesture. For example, the electronic device 210 may determine whether the gesture of the body part (e.g., arm or hand h1) wearing the wearable device 223 corresponds to the specific gesture (e.g., a pinch gesture). The specific gesture may be a predefined gesture to set the mode of the wearable device 223 to the controller mode 800c. Without limited to the described pinch gesture, the specific gesture may include various types of gestures, and the specific gesture may be set to various gestures by the user's settings.

According to various embodiments, if the identified gesture does not correspond to the specific gesture, the electronic device 210 may determine whether the positions of the hands h1 and h2 meet a designated condition in operation 1809. For example, as described above, the electronic device 210 may determine whether the probability that the positions of the hands h1 and h2 are to be positioned in the specific area is larger than the threshold and/or the positions of the hands are positioned in the specific area. If the probability is larger than the threshold and/or both hands are positioned in the specific area, the electronic device 210 may determine that the designated condition is met. If the probability is smaller than the threshold and/or both hands are positioned outside the specific area (or when not positioned in the specific area), the electronic device 210 may determine that the designated condition is not met. The operation of determining the probability by the electronic device 210 is described below with reference to FIGS. 19 and 20.

According to various embodiments, if the identified gesture corresponds to the specific gesture or the positions of both hands h1 and h2 meet the designated condition, the electronic device 210 may transmit, to the wearable device 223, a signal for setting the mode of the wearable device 223 to the controller mode 800c (e.g., a signal including a value indicating yes for checkcontroller)) in operation 1811. Meanwhile, upon determining that the positions of both hands h1 and h2 do not meet the designated condition, the electronic device 210 may set the value of the second parameter (e.g., checkcontroller) to a value indicating "stay" or a value indicating "no" and transmit a signal including the value to the wearable device 223 as described above.

Meanwhile, without limited to those described, the electronic device 210 may set a value for a single parameter (e.g., checkmode), rather than the first parameter (e.g., checkglance) and the second parameter (e.g., checkcontroller) and transmit, to the wearable device 223, a signal including the set value for the single parameter (e.g., checkmode). A plurality of values settable for the single parameter (e.g., checkmode) may include a value for setting the mode of the wearable device 223 to at least one of the standby mode 800a, active mode 800b or controller mode 800c. The wearable device 223 may set the mode of the wearable device 223 based on the value for the single parameter (e.g., checkmode) included in the received signal and perform operations as described above, and a duplicate description thereof may not be given below.

An example of an operation of an electronic device 210 is described below according to various embodiments. Since at least some of the above-described operations of the devices (e.g., the operations of the flowchart 1000 of FIG. 10, the operations of the flowchart 1300 of FIG. 13, the operations of the flowchart 1400 of FIG. 14, and the operations of the flowchart 1500 of FIG. 18) may be performed in combination with the operations described below, and thus, a duplicate description may not be provided.

According to various embodiments, as at least part of the operation of determining the user's intent to control immersive content using the wearable device 223 (e.g., a smart watch), the electronic device 210 may perform the operation of comparing the probability that the user's hands h1 and h2 are to be positioned in specific areas of a plurality of areas. As at least part of the operation of identifying the probability that both hands h1 and h2 are to be positioned in the specific areas, the electronic device 210 may perform the operation of identifying the probability corresponding to the rotation angle of the head H and the positions of hands h1 and h2 currently identified among probability information corresponding to the rotation angle of the head H and hand positions previously stored in the electronic device 210.

Figure 19:
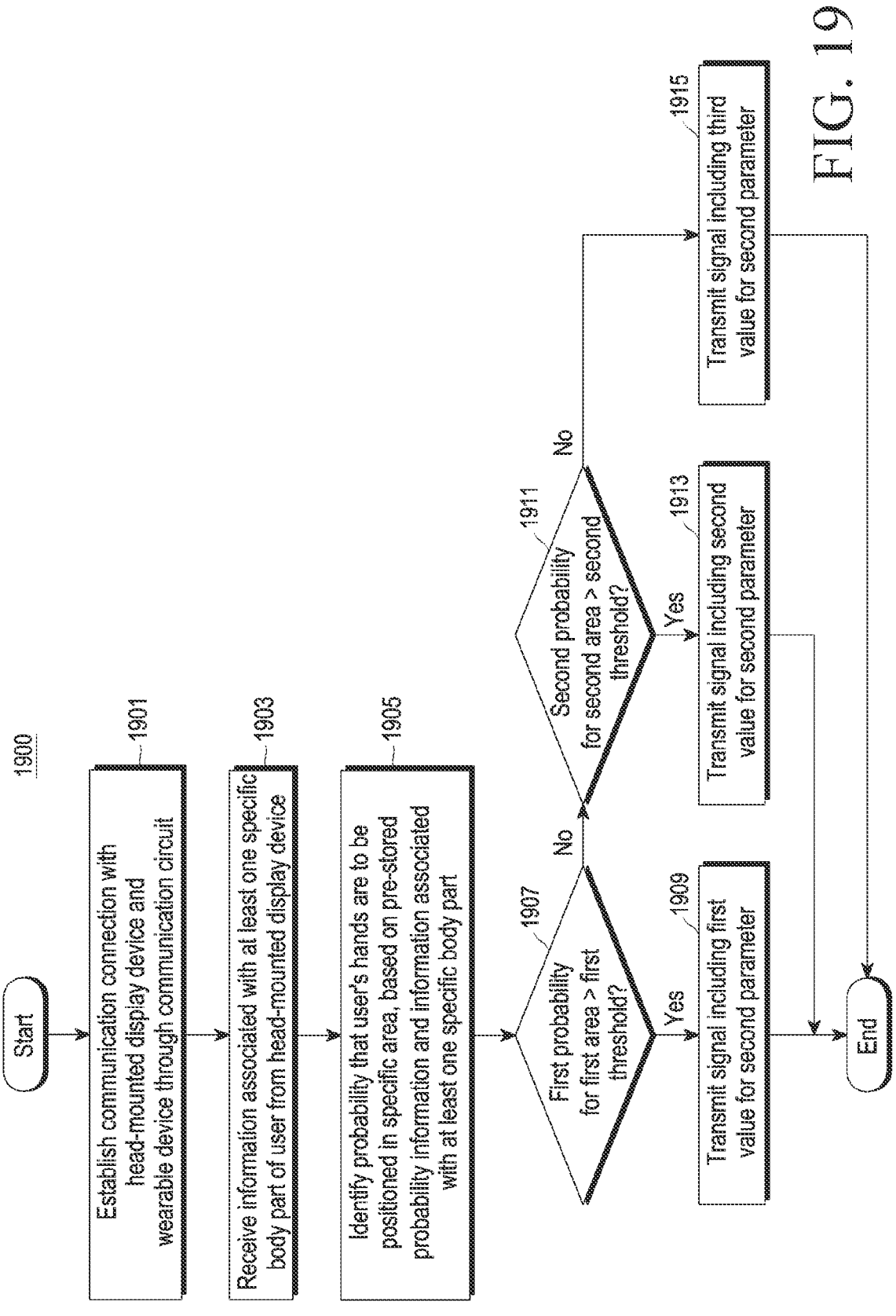
FIG. 19 is a flowchart illustrating an example operation of an electronic device according to various embodiments.

FIG. 19 is a flowchart 1900 illustrating an example operation of an electronic device 210 according to various embodiments. According to various embodiments, the operations shown in FIG. 19 are not limited to the shown order but may rather be performed in other various orders. According to various embodiments, more or less operations than those of FIG. 19 may be performed.

Figure 20:
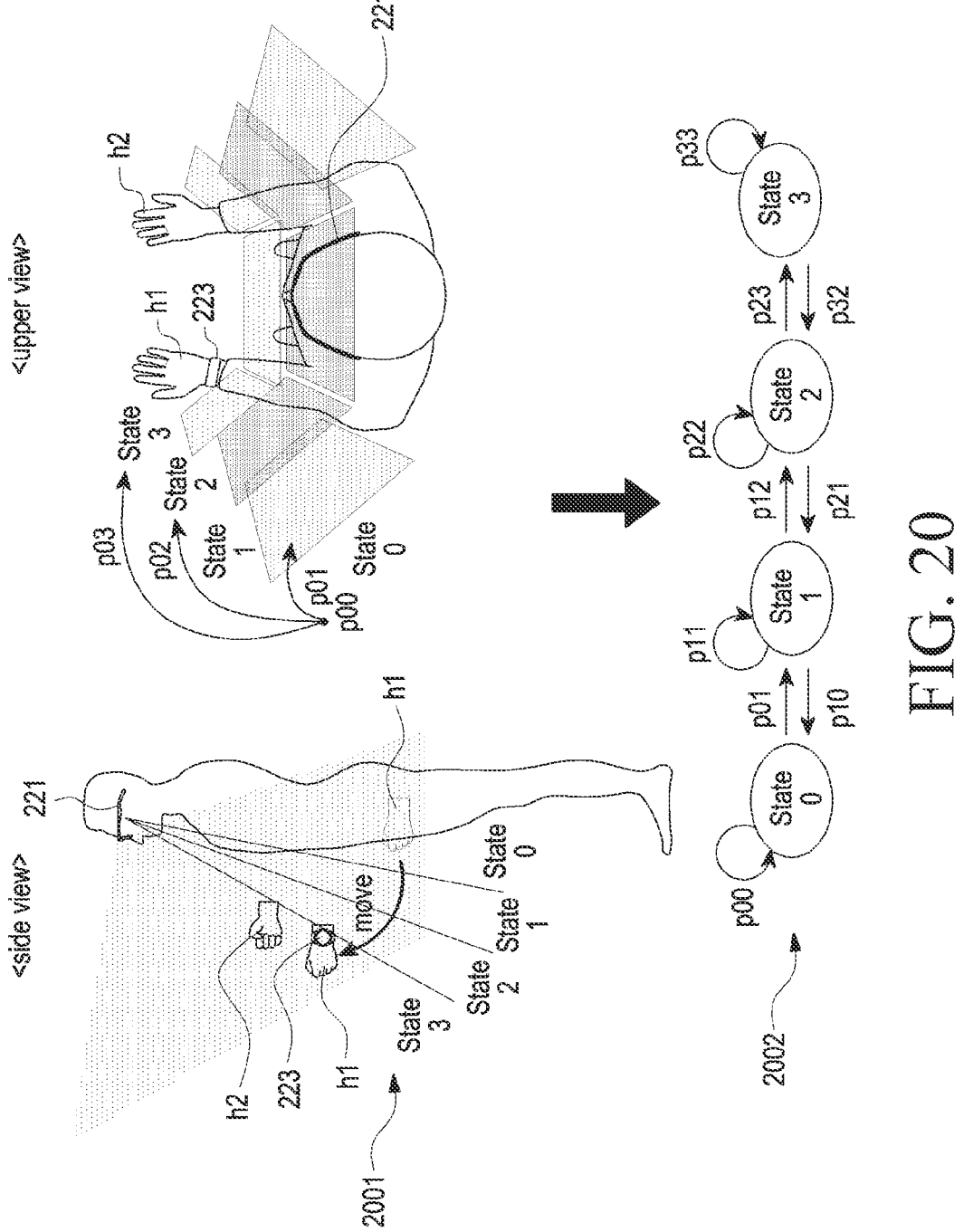
FIG. 20 is a diagram illustrating an example of a plurality of areas and probability information according to various embodiments.

FIG. 20 is a diagram illustrating an example of a plurality of areas and probability information according to various embodiments.

According to various embodiments, in operation 1901, the electronic device 210 may establish a communication connection with the head-mounted display device 221 and the wearable device 223 through the communication circuit 910. According to various embodiments, in operation 1903, the electronic device 210 may receive information associated with at least one specific body part of the user from the head-mounted display device 221. For example, after the wearable device 223 and HMD device 221 are worn by the user and turned on, the electronic device 210 may establish a communication connection with the wearable device 223 and HMD device 221 using a short-range wireless communication scheme, such as Wi-Fi, Bluetooth, or BLE. As described above, based on the communication connection, the electronic device 210 may receive, from the HMD device 221, at least one of information about the 3D coordinates for the surrounding space of the HMD device 221, information about 3D coordinates of the HMD device 221 in the surrounding space, information associated with the position and/or posture of body parts (e.g., the positions of the hands h1 and h2, the rotation angle of the head H, and/or the direction of the gaze), or information associated with the position of the wearable device 223. Operation 1901 of the electronic device 210 may be performed like operations 1001 and 1003 of the electronic device 210 as described above, and operation 1903 of the electronic device 210 may be performed like the operation of receiving information by the electronic device 210 as described in connection with 1009 of the HMD device 221, and a duplicate description thereof may not be given below.

According to various embodiments, in operation 1905, the electronic device 210 may identify the probability that the user's hands h1 and h2 are to be positioned in a plurality of areas based on pre-stored probability information and information associated with the at least one specific body part. For example, the electronic device 210 may identify the probability that the user's hands h1 and h2 are to be positioned in a plurality of areas state 0, state 1, state 2, and state 3, a designated time after each of the user's hands h1 and h2 is positioned in an area (or the time of identifying each position), based on information about the probability that each (e.g., right and left hand) of the hands h1 and h2 is to be moved to a plurality of areas for each rotation angle (e.g., angle in the pitch direction) of the head H previously stored in the electronic device 210, the identified positions of the hands h1 and h2, and the rotation angle of the head H. Referring to 2001 of FIG. 20, the forward area S1 and downward area S2 of the user's head H (or areas capturable by the plurality of cameras 340 of the HMD device 221) may be divided (or identified) into a plurality of areas state 0, state 1, state 2, and state 3. The electronic device 210 may previously store information (e.g., information about 3D coordinates) about the positions of the plurality of divided areas state 0, state 1, state 2, and state 3 and compare the identified positions of the hand h1 or h2 with the positions of the plurality of areas stored, thereby identifying the area where the hand is currently positioned. Meanwhile, without limited to those described and/or shown, the area may be divided into more areas or in various shapes. A first area (e.g., state 3) among the plurality of areas state 0, state 1, state 2, and state 3 may be referred to as an area where the user has an intent to use the wearable device 223 to control immersive content, and a second area (e.g., state 0) may be referred to as an area where there is no such intent, but without limited to those described, other various settings may be possible. Referring to Equation 1 below and 2002 of FIG. 20, each information about a plurality of probabilities (e.g., p00, p01, p10, p11, p12, p21, p22, p23, p32, p33) previously stored in the electronic device 210 may include the probability that the hand positioned in one area is to remain positioned in the area after a designated time (or maintains its position) or it is to move to another area.

$$\sum_{0-0}^{l} \begin{pmatrix} p00 & p01 & p02 & p03 \\ p10 & p11 & p12 & p13 \\ p20 & p21 & p22 & p23 \\ p30 & p31 & p32 & p33 \end{pmatrix}, \qquad \text{[Equation 1]}$$

$$n = 0 \text{ and } 1, 0 < l < 180$$

In Equation 1, pxy may denote the probability, x may denote the current area where the hand is positioned, and y may denote the area where the hand is to be positioned after the designated time. For example, p01 may denote the probability that the hand is to move from state 0 to state 1 after the designated time. n may denote the left or right hand. For example, n=0 ma denote the left hand, and n=1 may denote the right hand. θ may denote the angle in the itch direction of the head H but, without limited to those described, the information about the plurality of probabilities may further include probability information about the angle in the yaw and/or roll direction of the head H.

The sum of the probabilities (e.g., p00, p01, p02, and p03) of being positioned in each of the plurality of areas (e.g., state0, state 1, state2, and state3) after the hand is positioned in the one area (e.g., state0) may be 100%. In other words, the result of summing the values of the probabilities represented by p00, p01, p02, and p03, respectively, may be a value (e.g., 1) for 100%. Each of the probabilities may be calculated according to the result of experiment performed multiple times for the area where the hand is positioned the designated time after the hand is positioned in the one area for each angle θ in the pitch direction of the head H, and information about the calculated probabilities may be provided to the electronic device 210.

Referring to Equation 1, the electronic device 210 may store information about the plurality of probabilities that it is to move from one area to another of each of the left hand (n=0) and right hand (n=1) for each angle θ in the pitch direction of the head H. The electronic device 210 may identify the area where each of the hands h1 and h2 is currently positioned, based on comparison between the 3D coordinates of each of the hands h1 and h2 (e.g., right and left hands) and information about the 3D coordinates of each of the plurality of areas based on the information received from the HMD device 221. The electronic device 210 may identify information about the probability corresponding to the angle in the pitch direction of the head H among the stored information about the plurality of probabilities and identify the probability that the hand is to move the area where the hand is identified to be currently positioned to each of the plurality of areas (e.g., state0, state1, state2, and state3) from the information about the probability.

According to various embodiments, the electronic device 210 may set a specific area, among the plurality of divided areas, to an area where the user has the intent to control immersive content using the wearable device 223 according to the user's selection. For example, the electronic device 210 may provide the plurality of areas (e.g., state0, state1, state2, and state3) in different visual attributes (e.g., different colors) through the HMD device 221 according to execution of the settings application. If the user positions both hands in the specific area among the plurality of areas (or uses the wearable device 223 with both hands positioned) while providing the plurality of areas, the electronic device 210 may identify the user's input and manage the specific area, where both hands are positioned, as an area for controlling immersive content later, based on the identified input. According to an embodiment, the electronic device 210 may identify the user's input based on information received from the HMD device 221. Further, in an embodiment, the electronic device 210 may identify the user's input based on a control signal received from the wearable device 223. In this case, as the settings app is executed, the electronic device 210 may transmit a signal for setting the mode of the wearable device 223 to the controller mode 800c to the wearable device 223 and, based thereupon, receive a control signal from the wearable device 223.

According to various embodiments, in operation 1907, the electronic device 210 may determine whether a first probability for the identified first area is greater than a first threshold and, if the first probability is greater than the first threshold, the electronic device 210 may, in operation 1909, transmit a signal including the first value for the second parameter. For example, if the probability that it is to move to the above-described specific first area (e.g., state3) among the plurality of areas (e.g., state0, state1, state2, and state3) is greater than the threshold based on the operation of identifying the probability, the electronic device 210 may set the value of the second parameter (e.g., checkcontroller) to the first value (e.g., a value indicating yes). The electronic device 210 may transmit, to the wearable device 223, a signal including the first value (e.g., a value indicating yes) of the second parameter (e.g., checkcontroller).

According to various embodiments, if the first probability for the first area is less than the threshold, the electronic device 210 may determine whether a second probability is greater than a second threshold in operation 1911 and, if the second probability is greater than the second threshold, the electronic device 210 may transmit a signal including the second value for the second parameter in operation 1913. For example, if the probability that it is to move to the above-described specific second area (e.g., state 0) among the plurality of areas is greater than the threshold based on the operation of identifying the probability, the electronic device 210 may set the value of the second parameter (e.g., checkcontroller) to the second value (e.g., a value indicating no). The electronic device 210 may transmit, to the wearable device 223, a signal including the second value (e.g., a value indicating no) of the second parameter (e.g., checkcontroller).

According to various embodiments, if the second probability for the second area is less than the threshold, the electronic device 210 may transmit a signal including the third value for the second parameter in operation 1915. For example, if the probability that it is to move to the above-described specific second area (e.g., state 0) among the plurality of areas is less than the threshold based on the operation of identifying the probability, the electronic device 210 may set the value of the second parameter (e.g., checkcontroller) to the third value (e.g., a value indicating stay). The electronic device 210 may transmit, to the wearable device 223, a signal including the third value (e.g., a value indicating stay) of the second parameter (e.g., checkcontroller).

An example of an operation of an electronic device 210 is described below according to various embodiments. Since at least some of the above-described operations of the devices (e.g., the operations of the flowchart 1000 of FIG. 10, the operations of the flowchart 1300 of FIG. 13, the operations of the flowchart 1400 of FIG. 14, the operations of the flowchart 1800 of FIG. 18, and the flowchart 1900 of FIG. 19) may be performed in combination with the operations described below, and thus, a duplicate description may not be provided.

According to various embodiments, the electronic device 210 may update information about a plurality of probabilities for setting the value of the second parameter (e.g., checkcontroller) associated with the user's intent to control hybrid content using the wearable device 223 based on the movement of the positions of the user's hands h1 and h2.

Figure 21:
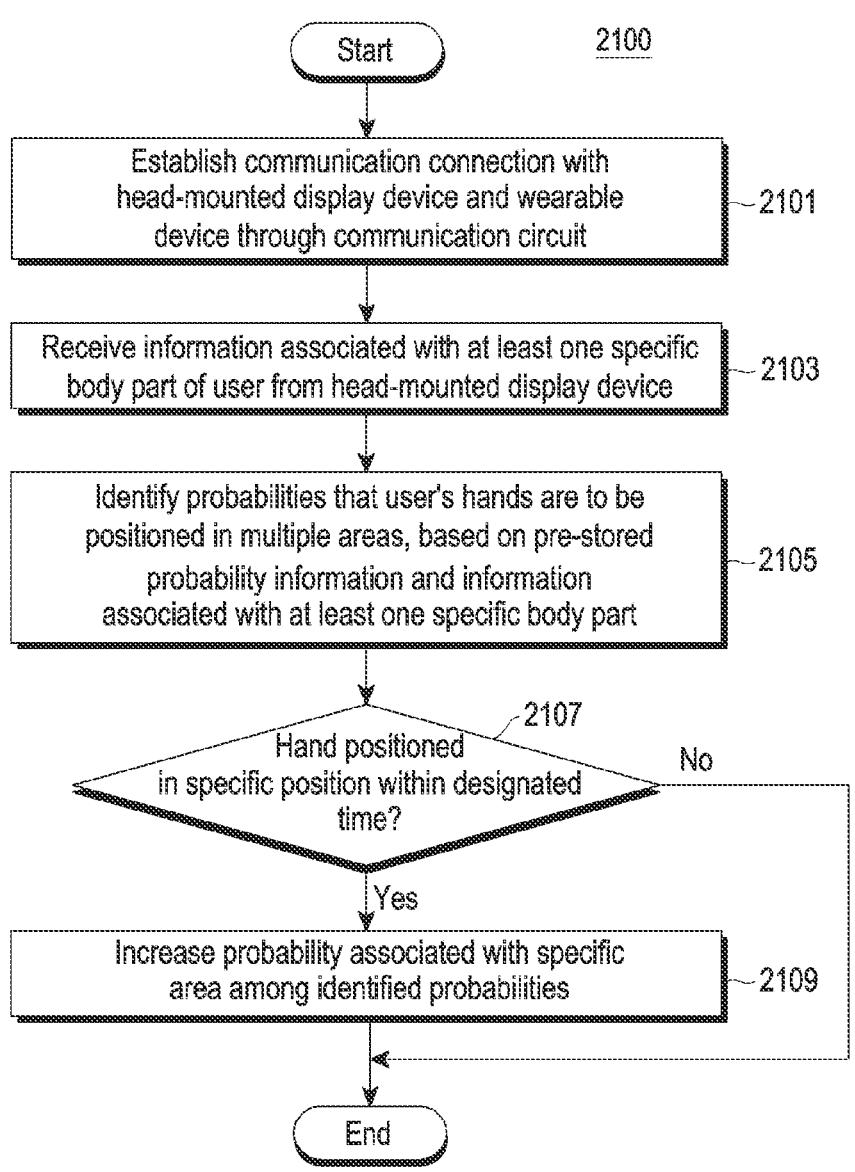
FIG. 21 is a flowchart illustrating an example operation of an electronic device according to various embodiments.

FIG. 21 is a flowchart 2100 illustrating an example operation of an electronic device 210 according to various embodiments. According to various embodiments, the operations shown in FIG. 21 are not limited to the shown order but may rather be performed in other various orders. According to various embodiments, more or less operations than those of FIG. 21 may be performed.

According to various embodiments, in operation 2101, the electronic device 210 may establish a communication connection with the head-mounted display device 221 and the wearable device 223 through the communication circuit 910. According to various embodiments, in operation 2103, the electronic device 210 may receive information associated with at least one specific body part of the user from the head-mounted display device 221. For example, after the wearable device 223 and HMD device 221 are worn by the user and turned on, the electronic device 210 may establish a communication connection with the wearable device 223 and HMD device 221 using a short-range wireless communication scheme, such as Wi-Fi, Bluetooth, or BLE. As described above, based on the communication connection, the electronic device 210 may receive, from the HMD device 221, at least one of information about the 3D coordinates for the surrounding space of the HMD device 221, information about 3D coordinates of the HMD device 221 in the surrounding space, information associated with the position and/or posture of body parts (e.g., the positions of the hands h1 and h2, the rotation angle of the head H, and/or the direction of the gaze), or information associated with the position of the wearable device 223. Operation 2101 of the electronic device 210 may be performed like operations 1001 and 1003 of the electronic device 210 as described above, and operation 2103 of the electronic device 210 may be performed like the operation of receiving information by the electronic device 210 as described in connection with 1009 of the HMD device 221, and a duplicate description thereof may not be given below.

According to various embodiments, in operation 2105, the electronic device 210 may identify the probabilities that the user's hands h1 and h2 are to be positioned in a plurality of areas for controlling immersive content based on pre-stored probability information and information associated with the at least one specific body part. For example, as described above in connection with Equation 1, the electronic device 210 may identify the probability that the user's hands h1 and h2 are to be positioned in a plurality of areas (e.g., state0, state1, state2, and state3), a designated time after the current time of identifying the position of each of the user's hands h1 and h2, based on information about the probability that each (e.g., right and left hand) of the hands h1 and h2 is to be moved to a plurality of areas for each rotation angle (e.g., angle in the pitch direction) of the head H previously stored in the electronic device 210, the identified positions of the hands h1 and h2, and the rotation angle of the head H. Operation 2105 of the electronic device 210 may be performed like operation 1905 of the electronic device 210 as described above, and a duplicate description thereof may not be given below.

According to various embodiments, in operation 2107, the electronic device 210 may determine whether the hand (e.g., right or left hand) is positioned in the specific area within the designated time and, if the hand is positioned in the specific area within the designated time, increase the probability value associated with the specific area among the identified probabilities in operation 2109. For example, the designated time after the time of identifying the area where a specific hand (e.g., left or right hand) is currently positioned, the electronic device 210 may identify the specific area where the specific hand (e.g., left or right hand) is positioned based on information (e.g., information about the positions of the hands h1 and h2) received from the HMD device 221. In this case, the electronic device 210 may increase the probability corresponding to the specific area among the probabilities for the plurality of identified areas. Accordingly, the probabilities for the remaining areas may be reduced. For example, referring to Equation 1, the electronic device 210 may identify that the left hand is currently positioned in state 0 and may identify p01, p02, p03, and p04. Based on identifying that the left hand is positioned in state 2 after the designated time, the electronic device 210 may increase the probability value indicated by p02 and reduce the probability values of the rest, p00, p01, and p03. After the change, the sum of p01, p02, p03, and p04 may be a value (e.g., 1) representing the 100% probability. Without limited to those described, the electronic device 210 may determine whether the specific hand (e.g., left or right hand) moves from the position (e.g., state 1, state 2, or state 3) not corresponding to state 0 to the specific position (e.g., state 0, state 1, state 2, or state 3) and increase the probability corresponding to the movement.

According to various embodiments, the electronic device 210 may accumulate the movement information about the specific hand (e.g., left or right hand) and, if the number of movements for the specific hand (e.g., left or right hand) from one position to another is a preset number or more based on the accumulated movement information, increase the probability corresponding to the movement from the one position to the other position. For example, the electronic device 210 may identify that the specific hand (e.g., left or right hand) moves from the specific position to another position after a designated time and may continuously store the identified information. In this case, upon identifying that the number of times in which the position of the specific hand (e.g., left hand) is moved from one position (e.g., state 0) to another position (e.g., state 2) after the designated time is a preset number of more from the information, the electronic device 210 may increase the probability (e.g., p02) corresponding to the movement of the specific hand. In this case, the electronic device 210 may reduce the remaining probabilities (e.g., p00, p01, and p03) so that the sum of p01, p02, p03, and p04 becomes a value (e.g., 1) representing 100%.

An example of an operation of the wearable device 223 is described below according to various embodiments. Since at least some of the above-described operations of the devices (e.g., the operations of the flowchart 1000 of FIG. 10, the operations of the flowchart 1300 of FIG. 13, the operations of the flowchart 1400 of FIG. 14, the operations of the flowchart 1800 of FIG. 18, the flowchart 1900 of FIG. 19, and the flowchart 2100 of FIG. 21) may be performed in combination with the operations described below, and thus, a duplicate description may not be provided.

According to various embodiments, the wearable device 223 may determine the mode (e.g., the standby mode 800*a*, active mode 800*b*, or controller mode 800*c*) of the wearable device 223 based on the value of the first parameter and/or the second parameter included in the signal received from the electronic device 210. The wearable device 223 may determine whether to transmit, to the electronic device 210, a control signal corresponding to the identified user input depending on the mode of the wearable device 223.

Figure 22:
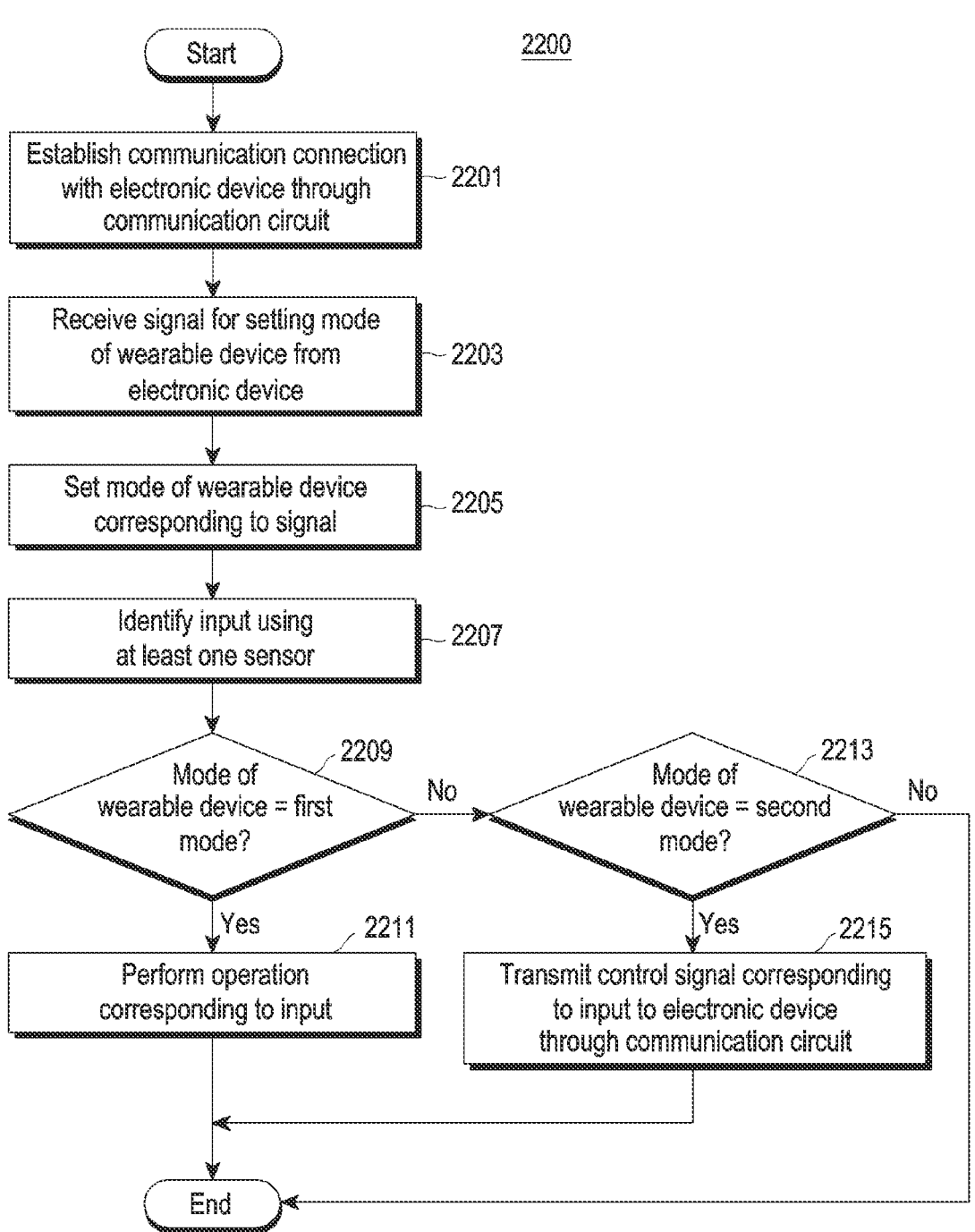
FIG. 22 is a flowchart illustrating an example operation of an electronic device according to various embodiments.

FIG. 22 is a flowchart 2200 illustrating an example operation of a wearable device 223 according to various embodiments. According to various embodiments, the operations shown in FIG. 22 are not limited to the shown order but may rather be performed in other various orders. According to various embodiments, more or less operations than those of FIG. 22 may be performed.

According to various embodiments, in operation 2201, the wearable device 223 may establish a communication connection with the electronic device 210 through the communication circuit 910. For example, after worn and turned on by the user, the wearable device 223 may establish a communication connection with the electronic device 210 (and/or the HMD device 221) using a short-range wireless communication scheme, such as Wi-Fi, Bluetooth, or BLE. The wearable device 223 may detect the user's wearing using a sensor and transmit, to the electronic device 210, a signal including information indicating the wearing of the wearable device 223 based on the communication connection configuration.

According to various embodiments, in operation 2203, the wearable device 223 may receive a signal for setting the mode of the wearable device 223 from the electronic device 210. According to various embodiments, in operation 2205, the wearable device 223 may set the mode of the wearable device 223 corresponding to the signal. For example, the wearable device 223 may receive a signal including the value for the first parameter (e.g., checkglance) or the value for the second parameter (e.g., checkcontroller). As described above in connection with FIG. 15, if the value of the first parameter (e.g., checkglance) included in the signal is the first value (e.g., a value indicating yes), the wearable device 223 may change the mode of the wearable device 223 from the standby mode 800*a* to the active mode 800*b*, maintain the active mode 800*b*, or change from the controller mode 800*c* to the active mode 800*b*. Further, as described above in connection with FIG. 15, if the value of the first parameter (e.g., checkglance) included in the signal is the second value (e.g., a value indicating no), and the value of the second parameter (e.g., checkcontroller) is the first value (e.g., a value indicating yes), the wearable device 223 may change the mode from the standby mode 800*a* or active mode 800*b* to the controller mode 800*c* or maintain the controller mode 800*c*. Further, as described above in connection with FIG. 15, if the value of the first parameter (e.g., checkglance) included in the signal is the second value (e.g., a value indicating no), and the value of the second parameter (e.g., checkcontroller) is the second value (e.g., a value indicating no), the wearable device 223 may maintain the mode of the wearable device 223 as the standby mode 800*a* or change the mode from the active mode 800*b* or controller mode 800*c* to the standby mode 800*a*. Further as described above in connection with FIG. 15, if the value of the first parameter (e.g., checkglance) included in the signal is the second value (e.g., a value indicating no), and the value of the second parameter (e.g., checkcontroller) is the third value (e.g., a value indicating stay), the wearable device 223 may maintain the currently set mode.

According to various embodiments, the wearable device 223 may perform operations associated with display, touchscreen, and unlock, as described above in connection with Table 1 according to the mode setting.

According to various embodiments, in operation 2207, the wearable device 223 may identify an input using at least one sensor 830. For example, if the user's input is received using the key input device 810 of the wearable device 223, the wearable device 223 may identify the input using the sensor 830.

According to various embodiments, in operation 2209, the wearable device 223 may determine whether the mode of the wearable device 223 is a first mode and, if the mode of the wearable device 223 is the first mode, the wearable device 223 may perform the operation corresponding to the obtained control signal in operation 2211. For example, upon identifying the user's input using the sensor 830 in the state of being in the active mode 800*b*, the wearable device 223 may perform the operation corresponding to the user input and may refrain from the operation of transmitting a signal to the electronic device 210 (e.g., a smartphone) (or control not to perform the operation). As an example, if the home key among the key input devices 810 is pressed by the user in a state in which the mode of the wearable device 223 is the active mode 800*b*, the wearable device 223 may display a home screen on the display and refrain from transmitting a signal indicating that the home key is pressed to the electronic device 210.

According to various embodiments, if the mode of the wearable device 223 is not the first mode, the wearable device 223 may determine whether the mode of the wearable device 223 is a second mode in operation 2213. If the mode of the wearable device 223 is the second mode, the wearable device 223 may transmit the obtained control signal to the electronic device 210 through the communication circuit 840 in operation 2215. For example, upon identifying the user's input using the sensor 830 in the state of being in the controller mode 800*c*, the wearable device 223 may refrain from performing the operation corresponding to the user's input and transmit, to the electronic device 210 (e.g., a smartphone), a signal corresponding to the identified input. As an example, if the home key among the key input devices 810 is pressed by the user in a state in which the mode of the wearable device 223 is the controller mode 800*c*, the wearable device 223 may refrain from displaying the home screen on the display and transmit a signal indicating that the home key is pressed to the electronic device 210.

Meanwhile, according to various embodiments, if the mode of the wearable device 223 is not the second mode, the wearable device 223 may set the mode of the wearable device 223 to the mode corresponding to the user input. For example, upon identifying the user input in the state of being in the standby mode 800*a*, the wearable device 223 may set the mode of the wearable device 223, corresponding to the user input. For example, if an input (e.g., a touch on the touchscreen, wheel key rotation, or key button press) using the key input device 810 is identified, the wearable device 223 may change (or switch or set) the mode of the wearable device 223 from the standby mode 800*a* to the active mode 800*b* and/or controller mode 800*c*.

An example of an operation of the HMD device 221 is described below according to various embodiments. Since at least some of the above-described operations of the devices (e.g., the operations of the flowchart 1000 of FIG. 10, the operations of the flowchart 1300 of FIG. 13, the operations of the flowchart 1400 of FIG. 14, the operations of the flowchart 1800 of FIG. 18, the flowchart 1900 of FIG. 19, the flowchart 2100 of FIG. 21, and the flowchart 2200 of FIG. 22) may be performed in combination with the operations described below, and thus, a duplicate description may not be provided.

According to various embodiments, the HMD device 221 may obtain a plurality of images captured using a plurality of cameras 430 and transmit a plurality of information obtained based on the plurality of obtained images to the electronic device 210. The HMD device 221 may receive immersive content generated based on a control signal received by the wearable device 223 from the electronic device 210, based on obtaining at least some of the plurality of images including a body part (e.g., at least one of the right and left hands) using at least some of the plurality of cameras 430.

FIG. 23 is a flowchart 2300 illustrating an example operation of an HMD device 221 according to various embodiments. According to various embodiments, the operations shown in FIG. 23 are not limited to the shown order but may rather be performed in other various orders. According to various embodiments, more or less operations than those of FIG. 23 may be performed.

According to various embodiments, in operation 2301, the HMD device 221 may establish a communication connection with the electronic device 210 through the communication circuit 450. For example, after worn and turned on by the user, the HMD device 221 may establish a communication connection with the electronic device 210 (and/or the wearable device 223) using a short-range wireless communication scheme, such as Wi-Fi, Bluetooth, or BLE. The HMD device 221 may detect the user's wearing using a sensor and transmit, to the electronic device 210, a signal including information indicating the wearing of the HMD device 221 based on the communication connection configuration.

According to various embodiments, the HMD device 221 may obtain a plurality of images using the plurality of cameras 430 in operation 2303. According to various embodiments, in operation 2305, the HMD device 221 may obtain information associated with at least one specific body part of the user based on at least some of the plurality of images. According to various embodiments, in operation 2207, the HMD device 221 may transmit, to the electronic device 210, information associated with the at least one specific body part. For example, the HMD device 221 may capture the forward area and/or downward area using some of the plurality of cameras 430 and capture the user's eyes using some others. As described above, the HMD device 221 may obtain at least one of information about the 3D coordinates for the surrounding space of the HMD device 221, information about the 3D coordinate of the HMD device 221 in the surrounding space, information associated with the position and/or posture of the body parts (e.g., the positions of the hands h1 and h2, the rotation angle of the head H, and/or the direction of the gaze), or information associated with the position of the wearable device 223), based on the plurality of images captured by the plurality of cameras 430. The HMD device 221 may transmit the plurality of information to the electronic device 210 and may receive an image including at least one object from the electronic device 210 based on the transmission of the information about the position and/or posture of the specific body parts (e.g., the positions of the hands h1 and h2, the rotation angle of the head H, and/or the direction of the gaze).

According to various embodiments, in operation 2309, the HMD device 221 may receive, from the electronic device 210, an image including a 3D graphic object from the electronic device 210 through the communication circuit 910 based on the transmission of the information associated with the at least one specific body part. For example, the HMD device 221 may obtain at least some of the plurality of images including the body part (e.g., at least one of the right and left hands) and, based on the transmission of information generated based on at least some of the plurality of obtained images to the electronic device 210, receive, from the electronic device 210, an image including at least one graphic object generated based on the control signal from the wearable device 223 by the electronic device 210. For example, the HMD device 221 may obtain at least some among the plurality of images including the user's body part (e.g., at least one of the right and left hands) and transmit, to the electronic device 210, information about the position of the body part (e.g., at least one of the right and left hands) based on at least some of the plurality of images. As described above, the electronic device 210 may transmit a signal for setting the mode of the wearable device 223 to the controller mode 800c, for the second parameter, based on the received information about the body part, and thus, the electronic device 210 may receive the control signal from the wearable device 223. The electronic device 210 may generate an image including at least one graphic object based on the received control signal and transmit it to the HMD device 221. The HMD device 221 may provide the user with the received image as described above in connection with FIG. 5. Meanwhile, without limited to those described, the HMD device 221 may receive the image from the electronic device 210 although it does not obtain at least some of the plurality of images including the body part (e.g., at least one of the right and left hands). For example, the electronic device 210 may transmit an image obtained based on the execution and/or driving of an application, to the HMD device 221.

According to various example embodiments, there may be provided an electronic device (e.g., the electronic device 210 of FIGS. 2A and 2B) comprising: a communication circuit (e.g., the communication circuit 910 of FIG. 9A), and at least one processor (e.g., the processor 920 of FIG. 9A) operatively connected with the communication circuit (e.g., the communication circuit 910 of FIG. 9A), wherein the at least one processor (e.g., the processor 920 of FIG. 9A) is configured to: establish a communication connection with a head-mounted display device (e.g., the head-mounted display device 221 of FIGS. 2A and 2B) and a wearable device (e.g., the control wearable device 223 of FIGS. 2A and 2B) through the communication circuit (e.g., the communication circuit 910 of FIG. 9A), receive information associated with at least one specific body part from the head-mounted display device (e.g., the head-mounted display device 221 of FIGS. 2A and 2B) through the communication circuit (e.g., the communication circuit 910 of FIG. 9A), and upon receiving a first signal (e.g., the control signal 1223 described in connection with operation 1019 of FIG. 10 and FIG. 12B) from the wearable device (e.g., the control wearable device 223 of FIGS. 2A and 2B) through the communication circuit (e.g., the communication circuit 910 of FIG. 9A), transmit, to the head-mounted display device (e.g., the head-mounted display device 221 of FIGS. 2A and 2B), an image including at least one graphic object associated with the first signal (e.g., the control signal 1223 described in connection with operation 1019 of FIG. 10 and FIG. 12B), generated based on the information associated with the at least one specific body part.

According to various example embodiments, there may be provided the electronic device (e.g., the electronic device 210 of FIGS. 2A and 2B), wherein the at least one processor (e.g., the processor 920 of FIG. 9A) is further configured to: receive a signal including information indicating that the wearable device (e.g., the control wearable device 223 of FIGS. 2A and 2B) is worn, from the wearable device (e.g., the control wearable device 223 of FIGS. 2A and 2B) through the communication circuit (e.g., the communication circuit 910 of FIG. 9A), and transmit, to the head-mounted display device (e.g., the head-mounted display device 221 of FIGS. 2A and 2B), the image including the at least one graphic object associated with the first signal (e.g., the control signal 1223 described in connection with operation 1019 of FIG. 10 and FIG. 12B) received from the wearable device (e.g., the control wearable device 223 of FIGS. 2A and 2B), based on the received signal.

According to various example embodiments, there may be provided the electronic device (e.g., the electronic device 210 of FIGS. 2A and 2B), wherein the at least one processor (e.g., the processor 920 of FIG. 9A) is further configured to, transmit, to the wearable device (e.g., the control wearable device 223 of FIGS. 2A and 2B), a signal associated with setting a mode of the wearable device (e.g., the control wearable device 223 of FIGS. 2A and 2B), based on the received signal, and wherein the mode of the wearable device (e.g., the control wearable device 223 of FIGS. 2A and 2B) includes a first mode associated with control of the image provided through the head-mounted display device (e.g., the head-mounted display device 221 of FIGS. 2A and 2B), and a second mode different from the first mode.

According to various example embodiments, there may be provided the electronic device (e.g., the electronic device 210 of FIGS. 2A and 2B), wherein the information associated with the at least one specific body part includes information associated with positions of a user's hands, and wherein the at least one processor (e.g., the processor 920 of FIG. 9A) is configured to: transmit, to the wearable device (e.g., the control wearable device 223 of FIGS. 2A and 2B), a second signal (e.g., the first signal 1211 of FIG. 12A or the first signal 1221 of FIG. 12B) associated with setting the first mode of the wearable device (e.g., the control wearable device 223 of FIGS. 2A and 2B), based on the information associated with the positions of the user's hands, receive the first signal (e.g., the control signal 1223 described in connection with operation 1019 of FIG. 10 and FIG. 12B) from the wearable device (e.g., the control wearable device 223 of FIGS. 2A and 2B), based on the transmission of the second signal (e.g., the first signal 1211 of FIG. 12A or the first signal 1221 of FIG. 12B), and transmit, to the head-mounted display device (e.g., the head-mounted display device 221 of FIGS. 2A and 2B), the image including the at least one graphic object associated with the first signal (e.g., the control signal 1223 described in connection with operation 1019 of FIG. 10 and FIG. 12B).

According to various example embodiments, there may be provided the electronic device (e.g., the electronic device 210 of FIGS. 2A and 2B), wherein the at least one processor (e.g., the processor 920 of FIG. 9A) is further configured to: determine whether the positions of the hands meet a designated condition, based on the information associated with the positions of the hands, based on the positions of the hands meeting the designated condition, transmit, to the wearable device (e.g., the control wearable device 223 of FIGS. 2A and 2B), a third signal (e.g., a signal including checkcontroller=Yes) including first information for setting the mode of the wearable device (e.g., the control wearable device 223 of FIGS. 2A and 2B) to the first mode, and based on the positions of the hands failing to meet the designated condition, transmit, to the wearable device (e.g., the control wearable device 223 of FIGS. 2A and 2B), a fourth signal (e.g., a signal including checkcontroller=No or Stay) including second information for setting the mode of the wearable device (e.g., the control wearable device 223 of FIGS. 2A and 2B) to the second mode different from the first mode.

According to various example embodiments, there may be provided the electronic device (e.g., the electronic device 210 of FIGS. 2A and 2B), wherein the at least one processor (e.g., the processor 920 of FIG. 9A) is further configured to, as at least part of determining whether the positions of the hands meet the designated condition: determine whether a first probability that the hands are to be positioned in a specific area is greater than a threshold, based on the first probability being greater than the threshold, transmit the third signal (e.g., a signal including checkcontroller=Yes) including the first information to the wearable device (e.g., the control wearable device 223 of FIGS. 2A and 2B), and based on the first probability being less than the threshold, transmit the fourth signal (e.g., a signal including checkcontroller=No or Stay) including the second information.

According to various example embodiments, there may be provided the electronic device (e.g., the electronic device 210 of FIGS. 2A and 2B), further comprising a memory, wherein the at least one processor (e.g., the processor 920 of FIG. 9A) is configured to: receive information associated with a rotation angle of the user's head from the head-mounted display device (e.g., the head-mounted display device 221 of FIGS. 2A and 2B) through the communication circuit (e.g., the communication circuit 910 of FIG. 9A), and identify the first probability corresponding to the rotation angle and the positions of the hands among information about a plurality of probabilities of being positioned in the specific area previously stored in the memory.

According to various example embodiments, there may be provided the electronic device (e.g., the electronic device 210 of FIGS. 2A and 2B), wherein the at least one processor (e.g., the processor 920 of FIG. 9A) is further configured to: based on the positions of the hands being positioned in the specific area within a designated time from a time of identifying the positions of the hands, increase the first probability among the plurality of probabilities stored in the memory.

According to various example embodiments, there may be provided the electronic device (e.g., the electronic device 210 of FIGS. 2A and 2B), further comprising a memory, wherein the at least one processor (e.g., the processor 920 of FIG. 9A) is further configured to: receive information associated with a rotation angle of the user's head from the head-mounted display device (e.g., the head-mounted display device 221 of FIGS. 2A and 2B) through the communication circuit (e.g., the communication circuit 910 of FIG. 9A), and identify the first probability corresponding to the rotation angle and the positions of the hands among information about a plurality of probabilities of being positioned in the specific area previously stored in the memory.

According to various example embodiments, there may be provided the electronic device (e.g., the electronic device 210 of FIGS. 2A and 2B), wherein the information associated with the at least one specific body part includes information associated with a position of a specific hand wearing the wearable device (e.g., the control wearable device 223 of FIGS. 2A and 2B) of the hands, wherein the at least one processor (e.g., the processor 920 of FIG. 9A) is further configured to, identify a gesture by the specific hand, based on the information associated with the position of the specific hand, determine whether the identified gesture corresponds to a specific gesture, based on the identified gesture corresponding to the specific gesture, transmit, to the wearable device (e.g., the control wearable device 223 of FIGS. 2A and 2B), a third signal (e.g., a signal including checkcontroller=Yes) including the first information for setting the mode of the wearable device (e.g., the control wearable device 223 of FIGS. 2A and 2B) to the first mode, and based on the identified gesture not corresponding to the specific gesture, determine whether the positions of the hands meet the designated condition.

According to various example embodiments, there may be provided the electronic device (e.g., the electronic device 210 of FIGS. 2A and 2B), wherein the information associated with the at least one specific body part includes information associated with a direction and/or position of the user's gaze, wherein the at least one processor (e.g., the processor 920 of FIG. 9A) is further configured to: receive information associated with the wearable device (e.g., the control wearable device 223 of FIGS. 2A and 2B) from the head-mounted display device (e.g., the head-mounted display device 221 of FIGS. 2A and 2B) through the communication circuit (e.g., the communication circuit 910 of FIG. 9A), and transmit, to the wearable device (e.g., the control wearable device 223 of FIGS. 2A and 2B), a third signal (e.g., a signal including checkcontroller=Yes) including information associated with setting the second mode of the wearable device (e.g., the control wearable device 223 of FIGS. 2A and 2B), based on the information associated with the direction and/or position of the user's gaze and the information associated with the position of the wearable device (e.g., the control wearable device 223 of FIGS. 2A and 2B).

According to various example embodiments, there may be provided the electronic device (e.g., the electronic device 210 of FIGS. 2A and 2B), wherein the at least one processor (e.g., the processor 920 of FIG. 9A) is further configured to: obtain information about the input received by the wearable device (e.g., the control wearable device 223 of FIGS. 2A and 2B) based on the first signal (e.g., the control signal 1223 described in connection with operation 1019 of FIG. 10 and FIG. 12B), and generate the image including the at least one object corresponding to information about the input identified.

According to various example embodiments, there may be provided a method for operating an electronic device (e.g., the electronic device 210 of FIGS. 2A and 2B), comprising: establishing a communication connection with a head-mounted display device (e.g., the head-mounted display device 221 of FIGS. 2A and 2B) and a wearable device (e.g., the control wearable device 223 of FIGS. 2A and 2B) through a communication circuit (e.g., the communication circuit 910 of FIG. 9A) of the electronic device (e.g., the electronic device 210 of FIGS. 2A and 2B) 210, receiving information associated with at least one specific body part from the head-mounted display device (e.g., the head-mounted display device 221 of FIGS. 2A and 2B) through the communication circuit (e.g., the communication circuit 910 of FIG. 9A), and upon receiving a first signal (e.g., the control signal 1223 described in connection with operation 1019 of FIG. 10 and FIG. 12B) from the wearable device (e.g., the control wearable device 223 of FIGS. 2A and 2B) through the communication circuit (e.g., the communication circuit 910 of FIG. 9A), transmitting, to the head-mounted display device (e.g., the head-mounted display device 221 of FIGS. 2A and 2B), an image including at least one graphic object associated with the first signal (e.g., the control signal 1223 described in connection with operation 1019 of FIG. 10 and FIG. 12B), generated based on the information associated with the at least one specific body part.

According to various example embodiments, there may be provided the method further comprising: receiving a signal including information indicating that the wearable device (e.g., the control wearable device 223 of FIGS. 2A and 2B) is worn, from the wearable device (e.g., the control wearable device 223 of FIGS. 2A and 2B) through the communication circuit (e.g., the communication circuit 910 of FIG. 9A) and transmitting, to the head-mounted display device (e.g., the head-mounted display device 221 of FIGS. 2A and 2B), the image including the at least one graphic object associated with the first signal (e.g., the control signal 1223 described in connection with operation 1019 of FIG. 10 and FIG. 12B) received from the wearable device (e.g., the control wearable device 223 of FIGS. 2A and 2B), based on the received signal.

According to various example embodiments, there may be provided the method further comprising: transmitting, to the wearable device (e.g., the control wearable device 223 of FIGS. 2A and 2B), a signal associated with setting a mode of the wearable device (e.g., the control wearable device 223 of FIGS. 2A and 2B), based on the received signal, wherein the mode of the wearable device (e.g., the control wearable device 223 of FIGS. 2A and 2B) includes a first mode associated with control of the image provided through the head-mounted display device (e.g., the head-mounted display device 221 of FIGS. 2A and 2B), and a second mode different from the first mode.

According to various example embodiments, there may be provided the method, wherein the information associated with the at least one specific body part includes information associated with positions of the user's hands, the method further comprises: transmitting, to the wearable device (e.g., the control wearable device 223 of FIGS. 2A and 2B), a second signal (e.g., the first signal 1211 of FIG. 12A or the first signal 1221 of FIG. 12B) associated with setting the first mode of the wearable device (e.g., the control wearable device 223 of FIGS. 2A and 2B), based on the information associated with the positions of the user's hands, receiving the first signal (e.g., the control signal 1223 described in connection with operation 1019 of FIG. 10 and FIG. 12B) from the wearable device (e.g., the control wearable device 223 of FIGS. 2A and 2B), based on the transmission of the second signal (e.g., the first signal 1211 of FIG. 12A or the first signal 1221 of FIG. 12B), and transmitting, to the head-mounted display device (e.g., the head-mounted display device 221 of FIGS. 2A and 2B), the image including the at least one graphic object associated with the first signal (e.g., the control signal 1223 described in connection with operation 1019 of FIG. 10 and FIG. 12B).

According to various example embodiments, there may be provided a wearable electronic device (e.g., the electronic device 210 of FIGS. 2A and 2B) comprising: at least one sensor (e.g., the sensor 830 of FIG. 8A), and a communication circuit (e.g., the communication circuit 840 of FIG. 8A), and at least one processor (e.g., the processor 850 of FIG. 8A), wherein the at least one processor (e.g., the processor 850 of FIG. 8A) is configured to: establish a communication connection with an electronic device (e.g., the electronic device 210 of FIGS. 2A and 2B) through the communication circuit (e.g., the communication circuit 840 of FIG. 8A), receive a signal (e.g., the first signal 1211 of FIG. 12A or the first signal 1221 of FIG. 12B) for setting a mode of the wearable device (e.g., the control wearable device 223 of FIGS. 2A and 2B) from the electronic device (e.g., the electronic device 210 of FIGS. 2A and 2B) through the communication circuit (e.g., the communication circuit 840 of FIG. 8A), identify an input using the at least one sensor (e.g., the sensor 830 of FIG. 8A), based on the mode of the wearable device (e.g., the control wearable device 223 of FIGS. 2A and 2B) being set to a first mode based on the received signal (e.g., the first signal 1211 of FIG. 12A or the first signal 1221 of FIG. 12B), provide content corresponding to the input identified, and based on the mode of the wearable device (e.g., the control wearable device 223 of FIGS. 2A and 2B) being set to a second mode based on the received signal (e.g., the first signal 1211 of FIG. 12A or the first signal 1221 of FIG. 12B), transmit a first signal (e.g., the control signal 1223 described in connection with operation 1019 of FIG. 10 and FIG. 12B) including information about the input identified, through the communication circuit (e.g., the communication circuit 840 of FIG. 8A) to the electronic device (e.g., the electronic device 210 of FIGS. 2A and 2B).

According to various example embodiments, there may be provided the wearable device (e.g., the control wearable device 223 of FIGS. 2A and 2B), wherein the at least one processor (e.g., the processor 850 of FIG. 8A) is further configured to, upon identifying the input in a state in which the mode of the wearable device (e.g., the control wearable device 223 of FIGS. 2A and 2B) is set to the second mode: refrain from providing the content corresponding to the input and transmit the first signal (e.g., the control signal 1223 described in connection with operation 1019 of FIG. 10 and FIG. 12B) to the electronic device (e.g., the electronic device 210 of FIGS.

According to various example embodiments, there may be provided the wearable device (e.g., the control wearable device 223 of FIGS. 2A and 2B), wherein the at least one processor (e.g., the processor 850 of FIG. 8A) is further configured to: upon identifying the input in the in the state in which the mode of the wearable device (e.g., the control wearable device 223 of FIGS. 2A and 2B) is set to the second mode, based on the input being a first input, transmit, to the electronic device (e.g., the electronic device 210 of FIGS. 2A and 2B), the first signal (e.g., the control signal 1223 described in connection with operation 1019 of FIG. 10 and FIG. 12B) including first information to trigger providing of a specific image through a head-mounted display device (e.g., the head-mounted display device 221 of FIGS. 2A and 2B), and based on the input being a second input, transmit, to the electronic device (e.g., the electronic device 210 of FIGS. 2A and 2B), the first signal (e.g., the control signal 1223 described in connection with operation 1019 of FIG. 10 and FIG. 12B) including second information to trigger control of at least one object displayed through the head-mounted display device (e.g., the head-mounted display device 221 of FIGS. 2A and 2B).

According to various example embodiments, there may be provided a head mounted display (HMD) device (e.g., the HMD device 221 of FIGS. 2A and 2B) comprising: a plurality of cameras (e.g., the plurality of cameras 430 of FIG. 4), a communication circuit (e.g., the communication circuit 450 of FIG. 4), and at least one processor (e.g., the processor 410 of FIG. 4) operatively connected with the plurality of cameras and the communication circuit (e.g., the communication circuit 450 of FIG. 4), wherein the at least one processor (e.g., the processor 410 of FIG. 4) is configured to: establish a communication connection with an electronic device (e.g., the electronic device 210 of FIGS. 2A and 2B) through the communication circuit (e.g., the communication circuit 450 of FIG. 4), obtain a plurality of images using the cameras, obtain information associated with at least one specific body part, based on at least some of the plurality of images, transmit the information associated with the at least one specific body part to the electronic device (e.g., the electronic device 210 of FIGS. 2A and 2B) through the communication circuit (e.g., the communication circuit 450 of FIG. 4), and receive an image including at least one graphic object from the electronic device (e.g., the electronic device 210 of FIGS. 2A and 2B) through the communication circuit (e.g., the communication circuit 450 of FIG. 4), based on the transmission of the information associated with the at least one specific body part.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

a communication circuit; and at least one processor operatively connected with the communication circuit; wherein the at least one processor includes processing circuitry;

memory storing instructions, that when executed by the at least one processor individually or collectively, cause the electronic device to:

establish, through the communication circuit, a communication connection between the electronic device and a head-mounted display device worn by a user, establish, through the communication circuit, a communication connection between the electronic device and a wearable device worn by a user, the wearable device being a separate device that is different from the head-mounted display device, receive, from the head-mounted display device through the communication circuit, a plurality of information including information about 3D coordinates of the head-mounted display device for a surrounding space of the head-mounted display device that further includes 3D coordinates of the wearable device and/or the hands of the user, information including a probability that positions of the hands of the user meet a designated condition, and information corresponding to a position of the head of the user or a direction of a gaze of the user, transmit, through the communication circuit, to the wearable device the signal for mode setting of the wearable device, and based on receiving, through the communication circuit, a first signal from the wearable device operating in the set wearable device mode, transmit, to the head-mounted display device, an image including at least one graphic object associated with the first signal received from the wearable device, wherein the image is generated based on the plurality of information, wherein the wearable device is configured to operate selectively in one of an active mode or a controller mode, in the active mode, the wearable device, when operated by the user to change a function related to a native service of the wearable device, refrains from transmitting a signal to the electronic device, wherein the native service-related function includes at least one of a message checking service, a call reception service, or a watch display service, and in the controller mode, the wearable device, when operated by the user to change an aspect of immersive content provided via the head-mounted display device, refrains from performing a function related to a native service of the wearable device corresponding to the user input at the wearable device, wherein the aspect of the immersive content includes at least one of viewpoint, object position, or interaction properties within the immersive content.

2. The electronic device of claim 1, wherein the instructions, that when executed by the at least one processor individually or collectively, cause the electronic device to:

receive, from the wearable device through the communication circuit, a signal including information indicating that the wearable device is worn on an arm of the user, and transmit, to the head-mounted display device, the image including the at least one graphic object associated with the first signal received from the wearable device, based on the received signal.

3. The electronic device of claim 2, wherein the instructions, that when executed by the at least one processor individually or collectively, cause the electronic device to:

transmit, to the wearable device, a second signal associated with setting the controller mode of the wearable device, based on the information associated with the positions of the user's hands, and receive the first signal from the wearable device, based on the transmission of the second signal.

4. The electronic device of claim 3, wherein the instructions, that when executed by the at least one processor individually or collectively, cause the electronic device to:

identify whether the positions of the hands meet a designated condition, based on the information associated with the positions of the hands, based on the positions of the hands meeting the designated condition, transmit, to the wearable device, a third signal including first information for setting the mode of the wearable device to the controller mode, and based on the positions of the hands failing to meet the designated condition, transmit, to the wearable device, a fourth signal including second information for setting the mode of the wearable device to the active mode.

5. The electronic device of claim 3, wherein the information associated with the at least one specific body part includes information associated with a direction and/or position of the user's gaze, wherein the instructions, that when executed by the at least one processor individually or collectively, cause the electronic device to:

receive information associated with a position of the wearable device from the head-mounted display device through the communication circuit, and transmit, to the wearable device, a third signal including information associated with setting the active mode of the wearable device, based on the information associated with the direction and/or position of the user's gaze and the information associated with the position of the wearable device.

6. The electronic device of claim 4, wherein the instructions, that when executed by the at least one processor individually or collectively, cause the electronic device to, as at least part of identifying whether the positions of the hands meet the designated condition:

identify whether a first probability that the hands are to be positioned in a specific area is greater than a threshold, based on the first probability being greater than the threshold, transmit the third signal including the first information to the wearable device, and based on the first probability being less than the threshold, transmit the fourth signal including the second information.

7. The electronic device of claim 4, wherein the information associated with the at least one specific body part includes information associated with a position of a specific hand wearing the wearable device among the user's hands, wherein the instructions, that when executed by the at least one processor individually or collectively, cause the electronic device to:

identify a gesture by the specific hand, based on the information associated with the position of the specific hand, identify whether the identified gesture corresponds to a specific gesture, based on the identified gesture corresponding to the specific gesture, transmit, to the wearable device, a third signal including the first information for setting the mode of the wearable device to the first mode, and based on the identified gesture not corresponding to the specific gesture, determine whether the positions of the hands meet the designated condition.

8. The electronic device of claim 6, wherein the instructions, that when executed by the at least one processor individually or collectively, cause the electronic device to:

receive information associated with a rotation angle of the user's head from the head-mounted display device through the communication circuit, and identify the first probability corresponding to the rotation angle and the positions of the hands among information about a plurality of probabilities of being positioned in the specific area previously stored in the memory.

9. The electronic device of claim 8, wherein the instructions, that when executed by the at least one processor individually or collectively, cause the electronic device to: based on the positions of the hands being positioned in the specific area within a designated time from a time of identifying the positions of the hands, increase the first probability among the plurality of probabilities stored in the memory.

10. The electronic device of claim 9, wherein the instructions, that when executed by the at least one processor individually or collectively, cause the electronic device to: select the specific area from among a plurality of areas based on an input.

11. A method for operating an electronic device, the method comprising:

establishing, through a communication circuit of the electronic device, a communication connection with a head-mounted display device and a wearable device;

establishing, through the communication circuit, a communication connection between the electronic device and the wearable device;

receiving, from the head-mounted display device through the communication circuit, a plurality of information including information about 3D coordinates of the head-mounted display device for a surrounding space of the head-mounted display device that further includes 3D coordinates of the wearable device and/or the hands of the user, information including a probability that positions of the hands of the user meet a designated condition, and information corresponding to a position of the head of the user or a direction of a gaze of the user;

generating a signal for setting a mode of the wearable device based on the plurality of information;

transmitting, through the communication circuit, to the wearable device the signal for mode setting of the wearable device, and based on receiving, through the communication circuit, a first signal from the wearable device operating in the set wearable device mode, transmitting, to the head-mounted display device, an image including at least one graphic object associated with the first signal, generated based on the plurality of information, wherein the wearable device is configured to operate selectively in one of an active mode or a controller mode, in the active mode, the wearable device, when operated by the user to change a function related to a native service of the wearable device, refrains from transmitting a signal to the electronic device, wherein the native service-related function includes at least one of a message checking service, a call reception service, or a watch display service, and in the controller mode, the wearable device, when operated by the user to change an aspect of immersive content provided via the head-mounted display device, refrains from performing a function related to a native service of the wearable device corresponding to the user input at the wearable device, wherein the aspect of the immersive content includes at least one of viewpoint, object position, or interaction properties within the immersive content.

12. The method of claim 11, further comprising:

receiving, from the wearable device through the communication circuit, a signal including information indicating that the wearable device is worn; and transmitting, to the head-mounted display device, the image including the at least one graphic object associated with the first signal received from the wearable device, based on the received signal.

13. The method of claim 12, wherein the mode of the wearable device includes a first mode associated with control of the image provided through the head-mounted display device, and a second mode different from the first mode.

14. The method of claim 13, wherein the information associated with the at least one specific body part includes information associated with positions of the user's hands, the method further comprises:

transmitting, to the wearable device, a second signal associated with setting the first mode of the wearable device, based on the information associated with the positions of the user's hands;

receiving the first signal from the wearable device, based on the transmission of the second signal; and transmitting, to the head-mounted display device, the image including the at least one graphic object associated with the first signal.

15. A wearable electronic device comprising:

at least one sensor; and a communication circuit; and at least one processor including processing circuitry;

memory storing instructions, that when executed by the at least one processor individually or collectively, cause the wearable electronic device to:

establish a communication connection with an electronic device located outside the wearable electronic device through the communication circuit, receive a signal for setting a mode of the wearable device from the electronic device that has established a communication connection with a head-mounted display device located outside the electronic device through the communication circuit, wherein the head-mounted display device is a separate device that is different from the wearable device and the set mode is one of a plurality of different modes of the wearable device including an active mode and a controller mode, wherein the signal for setting the mode of the wearable device is generated based on a plurality of information including information about 3D coordinates of the head-mounted display device for a surrounding space of the head-mounted display device that further includes 3D coordinates of the wearable device and/or the hands of the user, information including a probability that positions of the hands of the user meet a designated condition, and information corresponding to a position of the head of the user or a direction of a gaze of the user, identify an input using the at least one sensor, based on the mode of the wearable device being set to a first mode based on the received signal, provide content corresponding to the identified input, based on the mode of the wearable device being set to a second mode based on the received signal, transmit a first signal including information about the identified input, through the communication circuit to the electronic device, and transmit, to the electronic device, the first signal to trigger providing to the head-mounted display device an image including at least one graphic object associated with the first signal, wherein the wearable device is configured to operate selectively in one of an active mode or a controller mode, in the active mode, the wearable device, when operated by the user to change a function related to a native service of the wearable device, refrains from transmitting a signal to the electronic device, wherein the native service-related function includes at least one of a message checking service, a call reception service, or a watch display service, and in the controller mode, the wearable device, when operated by the user to change an aspect of immersive content provided via the head-mounted display device, refrains from performing a function related to a native service of the wearable device corresponding to the user input at the wearable device, wherein the aspect of the immersive content includes at least one of viewpoint, object position, or interaction properties within the immersive content.

16. The wearable device of claim 15, wherein the at least one processor is further configured to:

based on identifying the input in a state that the mode of the wearable device is set to the second mode, refrain from providing the content corresponding to the input and transmit the first signal to the electronic device.

17. The wearable device of claim 16, wherein the at least one processor is further configured to, based on identifying the input in the state that the mode of the wearable device is set to the second mode:

based on the input being a first input, transmit, to the electronic device, the first signal including first information to trigger providing of a specific image through a head-mounted display device, and based on the input being a second input, transmit, to the electronic device, the first signal including second information to trigger control of at least one object displayed through the head-mounted display device.

18. A head mounted display (HMD) device wearable by a user comprising:

a plurality of cameras;

a communication circuit; and at least one processor operatively connected with the plurality of cameras and the communication circuit;

wherein the at least one processor includes processing circuitry and is configured to:

establish a communication connection with an electronic device located outside the head mounted display through the communication circuit, obtain a plurality of images using the cameras, obtain a plurality of information including information about 3D coordinates of the head-mounted display device for a surrounding space of the head-mounted display device that further includes 3D coordinates of the wearable device and/or the hands of the user, information including a probability that positions of the hands of the user meet a designated condition, and information corresponding to a position of the head of the user or a direction of a gaze of the user, based on at least some of the plurality of images, transmit the plurality of information to the electronic device through the communication circuit, and receive an image including at least one graphic object associated with a first signal generated by a wearable device worn by the user and different from the head-mounted display device and operating in a set mode of a plurality of different modes of the wearable device including an active mode and a controller mode, from the electronic device that has established a communication connection with the wearable device located outside the electronic device through the communication circuit, based on the transmission of the plurality of information, wherein the wearable device is configured to operate selectively in one of an active mode or a controller mode, in the active mode, the wearable device, when operated by the user to change a function related to a native service of the wearable device, refrains from transmitting a signal to the electronic device, wherein the native service-related function includes at least one of a message checking service, a call reception service, or a watch display service, and in the controller mode, the wearable device, when operated by the user to change an aspect of immersive content provided via the head-mounted display device, refrains from performing a function related to a native service of the wearable device corresponding to the user input at the wearable device, wherein the aspect of the immersive content includes at least one of viewpoint, object position, or interaction properties within the immersive content.

\* \* \* \* \*